United States Patent
Yoshikawa et al.

(10) Patent No.: US 6,332,259 B1
(45) Date of Patent: Dec. 25, 2001

(54) PRODUCTION SYSTEM USING THE DISMOUNTING METHOD FOR FASTENING MEMBER

(75) Inventors: Ryosuke Yoshikawa; Yuichi Jibiki; Mitsuru Yasuda, all of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/636,733

(22) Filed: Aug. 11, 2000

Related U.S. Application Data

(62) Division of application No. 09/385,890, filed on Aug. 30, 1999.

(30) Foreign Application Priority Data

| | | |
|---|---|---|
| Aug. 28, 1998 | (JP) | 10-259410 |
| Aug. 31, 1998 | (JP) | 10-260942 |
| Sep. 30, 1998 | (JP) | 10-277073 |
| Oct. 5, 1998 | (JP) | 10-282249 |
| Oct. 20, 1998 | (JP) | 10-298733 |
| Aug. 17, 1999 | (JP) | 11-230250 |

(51) Int. Cl.[7] .................................................. B23Q 17/00
(52) U.S. Cl. .......................... 29/407.01; 29/426.4; 408/84
(58) Field of Search ........................... 29/407.01, 403.1, 29/426.4, 426.1; 408/84; 83/745, 466.1, 682

(56) References Cited

U.S. PATENT DOCUMENTS 3,620,635 * 11/1971 DalBianco ............................ 408/84

FOREIGN PATENT DOCUMENTS 3-31467   7/1991   (JP).

* cited by examiner

Primary Examiner—S. Thomas Hughes
Assistant Examiner—John C. Hong
(74) Attorney, Agent, or Firm—Oblon, Spivak, McClelland, Maier & Neustadt, P.C.

(57) ABSTRACT

The dismounting device includes, in order that a fastening member is dismounted from a base material, the fastening member comprising a head and a body, the body being inserted into a fastening hole formed in a base material, the head contacting a peripheral edge of the fastening hole into a fastened state with the body, a cutting member for cutting a boundary region between the head and the body from the head toward the body to separate the head from the body, the cutting member removing the fastening member from the base material.

2 Claims, 81 Drawing Sheets

FIG. 40(a)     FIG. 40(b)     FIG. 40(c)
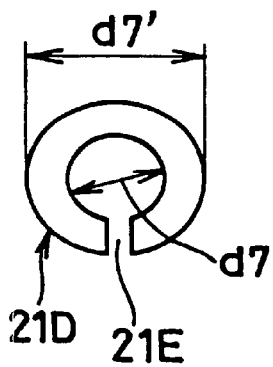
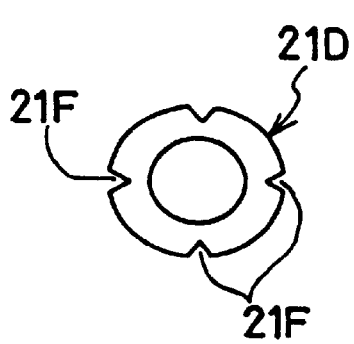
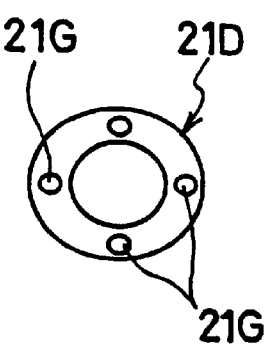
FIG. 41
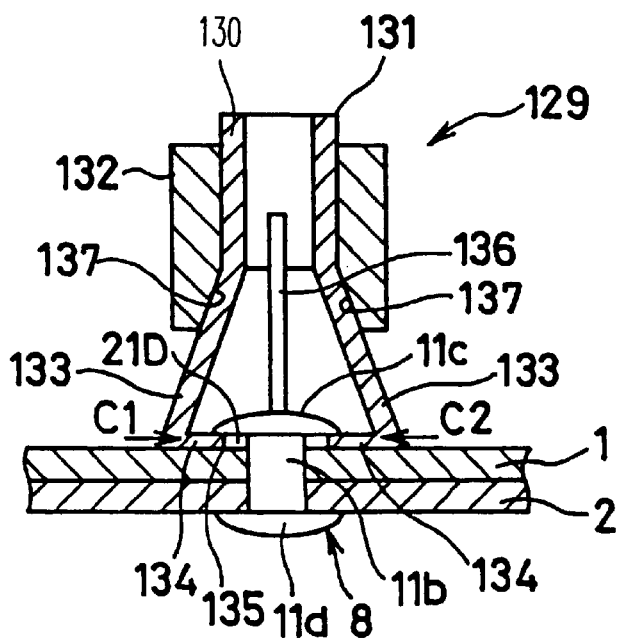

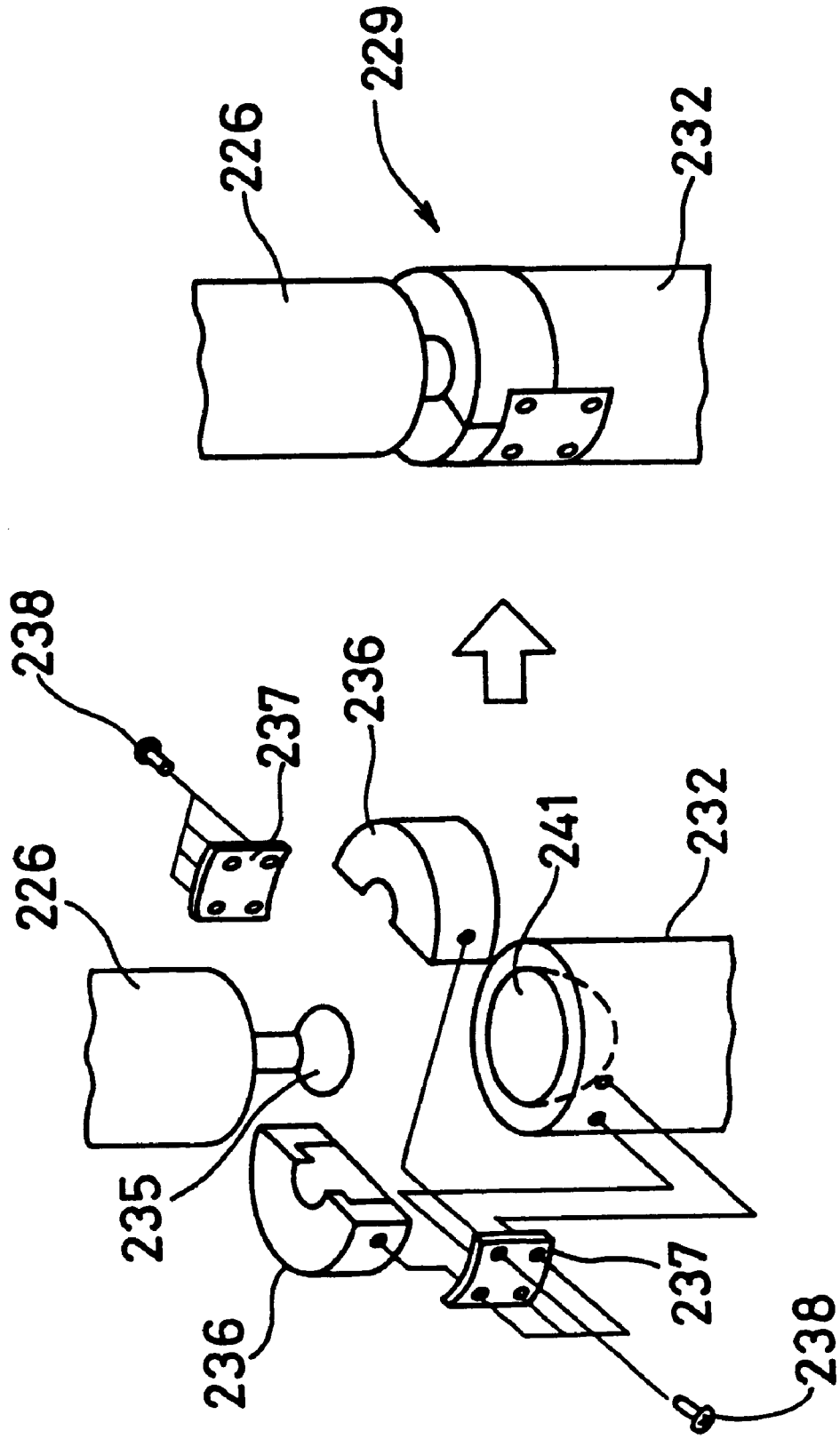

FIG. 74(a)
FIG. 74(b)
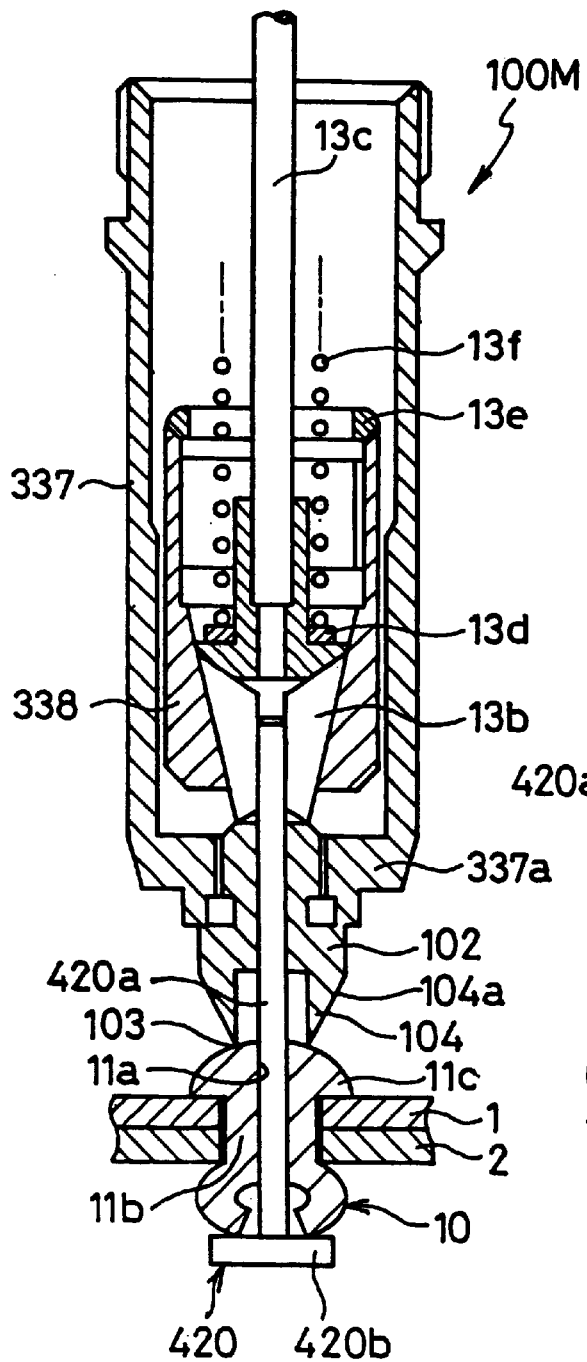
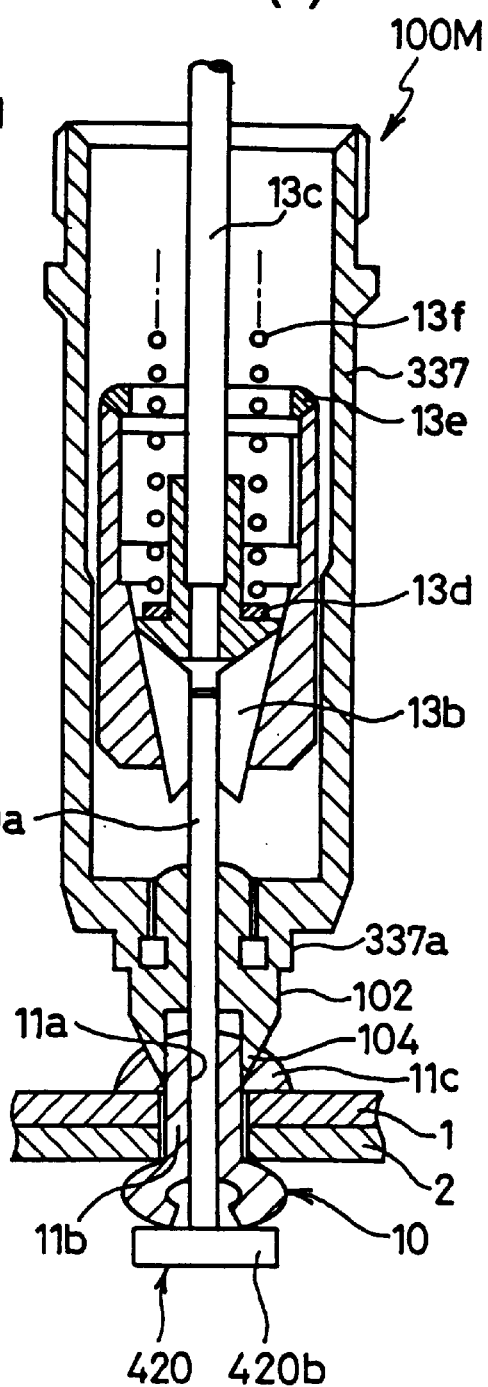

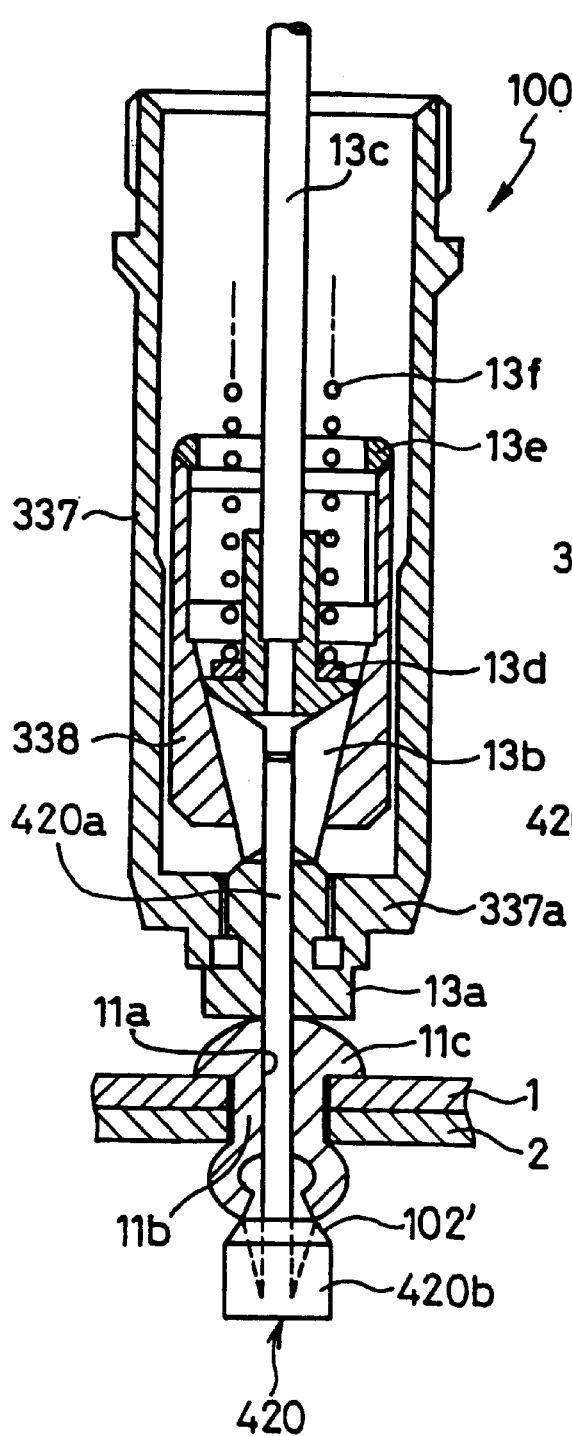
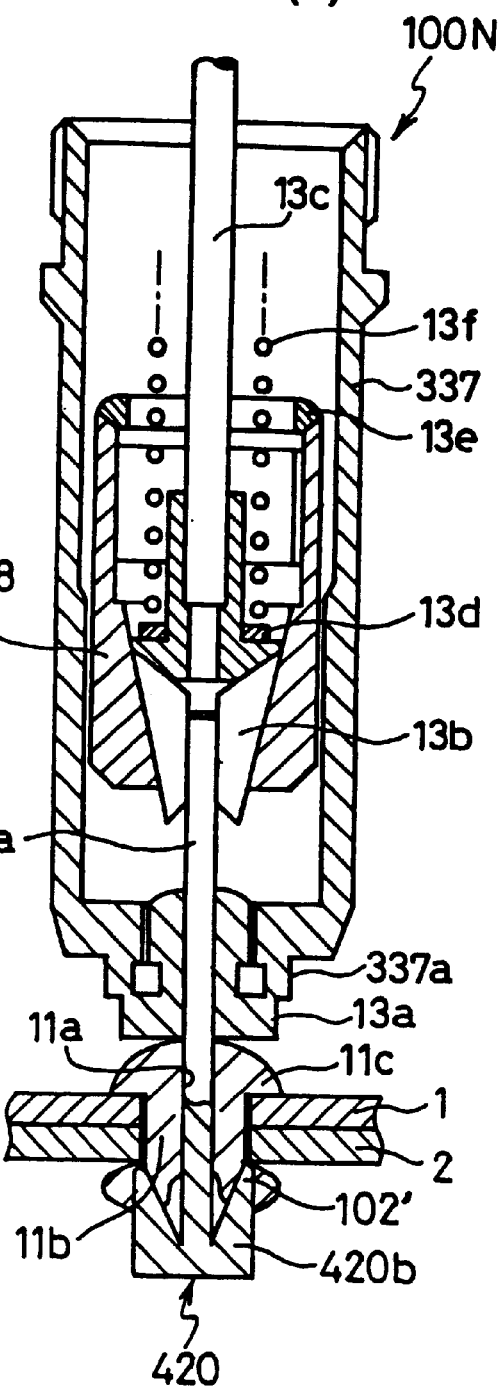

FIG. 81
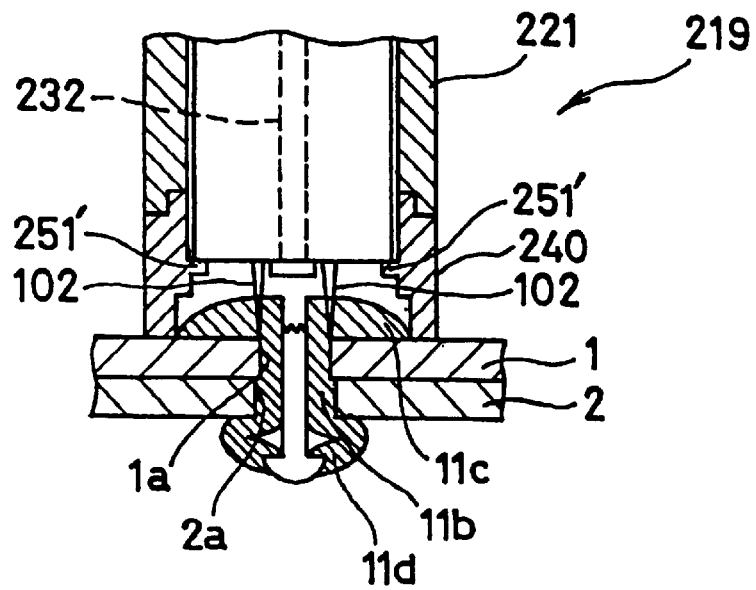
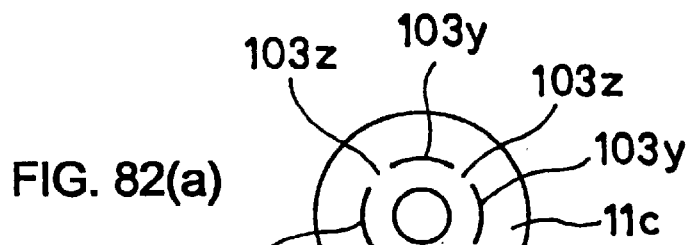
FIG. 82(a)
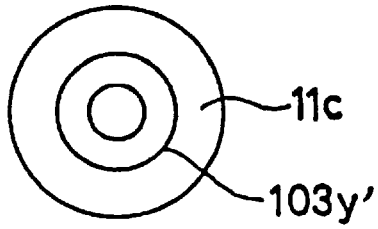
FIG. 82(b)

PRODUCTION SYSTEM USING THE DISMOUNTING METHOD FOR FASTENING MEMBER

CROSS-REFERENCE TO RELATED APPLICATIONS

This application is a Divisional of Ser. No. 09/385,890 filed Aug. 30, 1999.

This application is related and claims priority, under 35 U.S.C. §119, to Japanese Patent Application No. 10-259410, filed on Aug. 28, 1998, Japanese Patent Application No. 10-298733, filed on Oct. 20, 1998, Japanese Patent Application No. 10-277073, filed on Sep. 30, 1998, Japanese Patent Application No. 10-260942, filed on Aug. 31, 1998, Japanese Patent Application No. 10-230250, filed on Aug. 17, 1999, and Japanese Patent Application No. 10-282249, filed on Oct. 5, 1998, the entire contents of which six Japanese Patent Applications are hereby incorporated by reference herein.

BACKGROUND OF THE INVENTION

1. Field of the Invention

The present invention relates to: a dismounting method for a fastening member in which a fastening member is dismounted from a base material, wherein the fastening member includes a head and a body, the body is inserted into a fastening hole formed in the base material, and the head contacts a peripheral edge of the fastening hole when in a fastened state with the body; a dismounting device for a fastening member; an attachment construction of a fastening member; and a production system using the dismounting method for a fastening member.

2. Discussion of Background

Presently known techniques for uniting any one of a steel plate, plastic base materials to each other, or a member to a base material, include welding, bonding, mechanical fastening, etc.

Welding techniques are desirable for joining materials requiring a great uniting strength, but have the drawback that large-scaled, expensive equipment is usually necessary to accomplish the joining and thus, a large amount of space is required in order to perform the joining safely.

Bonding techniques can be carried out inexpensively and in a small space, as compared with the above-mentioned welding techniques, but have the drawback that the attitude of a base material has to be constantly maintained until the bonding agent is set and thus, a lot of time is required to accomplish the uniting.

Further, in both welding and bonding techniques, when the base materials are united and either, inferior uniting occurs so as to require re-uniting, or a base material is desired to be recycled and reused, it is very difficult to dismount the base materials from each other at the united portion without damaging the base materials.

On the other hand, presently know mechanical fastening techniques include screw fastening, pin fastening, and rivet fastening.

Presently known screw fastening techniques include, for example, the following two methods. In a first method, as illustrated in FIG. 92(a), a bolt 3 is the fastening member and is inserted into fastening holes 1a and 2a of base materials 1 and 2, respectively, and then a nut 4 is screwed onto the end of the bolt 3 using a spanner to thereby mechanically unite the base materials 1 and 2 to each other. In a second method, as illustrated in FIG. 92(b), a tapping screw 5 is the fastening member and is threadingly engaged with thread portions formed on the inner surface of fastening holes 1a and 2a in the base materials 1 and 2, respectively, via a screw driver to mechanically unite the base materials 1 and 2 to each other.

Presently known pin fastening techniques include, for example, the following two methods. In a first method, as illustrated in FIG. 93(a), a pin 6 is the fastening member and is inserted into fastening holes 1a and 2a of the base materials 1 and 2, respectively, and opposite ends of the pin 6 are caulked, using a caulking machine or a caulking tool, to thereby mechanically unite base materials 1 and 2 to each other. In a second method, as illustrated in FIG. 93(b), a shaft 7 is the fastening member and is inserted into a fastening hole of base material 1 and then, an end of the shaft 7 is caulked, using a caulking machine or a caulking tool, to thereby mechanically unite the base material 1 and the shaft 7 to each other.

Presently known rivet fastening techniques include, for example, the following two methods. In a first method, the fastening member is either a solid rivet 8, as illustrated in FIG. 94(a), or a tubular rivet 9, as illustrated in FIG. 94(b). Then, either the solid rivet 8 or the tubular rivet 9 is inserted into the fastening holes 1a and 2a of base materials 1 and 2, respectively, and then, the ends of either the solid rivet 8 or the tubular rivet 9 are crushed, as illustrated in FIG. 94(d) and FIG. 94(e), respectively, to thereby mechanically unite the base materials 1 and 2 to each other. In a second method, the fastening member is a blind rivet 10, as illustrated in FIG. 94(c), which is inserted into fastening holes 1a and 2a of base materials 1 and 2, respectively, and then, the end of the blind rivet 10 is crushed using a core shaft, which will be described below, to thereby mechanically unite the base materials 1 and 2 to each other, as shown in FIG. 94(f).

The blind rivet 10, as shown in FIG. 94(c), includes a rivet body 11 and a mandrel (core shaft) 12, wherein the mandrel 12 is inserted into an shaft hole 11a of the rivet body 11. For example, base materials 1 and 2 are mechanically fastened to each other in the following procedure.

In this rivet fastening technique, first, a body 11b of the blind rivet 11 is inserted into fastening holes 1a and 2a of the base materials 1 and 2, respectively, as shown in FIG. 95(a), and a blind rivet fastening device 13 is placed at an end of the mandrel 12, as shown in FIG. 95(b).

Then, as shown in FIG. 95(c), a nose piece 13a of the blind rivet fastening device 13 is brought into close contact with a head 11c of the rivet body 11, and the blind rivet fastening tool 13 is actuated, while the head 11c is pressed against the base material 1 via the nose piece 13a.

Thereby, the mandrel 12 is gripped by a jaw member 13b (i.e., a fastening shaft gripping portion of the blind rivet fastening device 13) and pulled in the direction opposite of the pressing direction. A portion of the rivet body 11b, which extends outwardly past the bottom of the base material 2, is plastically deformed and crushed, thus being caulked and pressed against the base material 2. When in this condition, the jaw member 13b is further pulled in the direction opposite of the pressing direction, the mandrel 12 is ruptured at a diameter-reduced portion 12b, as shown in FIG. 95(d), and the base materials 1 and 2 are fastened to each other via the blind rivet 10.

The blind rivet 10, of FIGS. 95(a)–(d), is fastened by the pulling of the mandrel 12 in the direction opposite the pressing direction so that the base materials 1 and 2 are united without having to support the back sides thereof. This rivet fastening method is suitable for uniting base materials 1 and 2 so that a person's hands are not required to be placed near the back sides of the base materials 1 and 2 in order to unite them.

Note that a conventional mechanical fastening technique known as "burring caulking" is shown in FIG. 96, wherein a shaft 7 (i.e., a rivet body 11b) is formed integrally with one base material 1 and is caulked to a fastening hole 2a of the other base material 2 to mechanically unite the base materials 1 and 2.

The above-described mechanical fastening techniques are desirable because: (1) a large apparatus is not required, as compared with the above-described conventional welding techniques; (2) the fastening can be accomplished easily and safely, even in a narrow space; and (3) the base materials 1 and 2 can be united in a short amount of time, as compared with the above-described bonding techniques.

However, the bodies of the fastening members, such as the pins, rivets, burring caulking, etc., used in mechanical fastening techniques, are plastically deformed and fastened to the base material. This may lead to drawbacks when the fastening member is fastened to the base material and inadequate fastening occurs, because the base material in order to remove the fastening member from the base material to recycle the base material, the fastening member has to be destroyed, a significant amount of time must be expended to dismount the fastening member from the base material, and the base material is often damaged during the dismounting. That is, as the dismounting technique for a fastening member of this kind, a method as shown in FIG. 97 is generally known, and an example of the method will be explained with reference to the dismounting of the blind rivet 10 as the fastening member.

First, a head 11c of the blind rivet 10 is cut using a drill 14, and the head 11c of the blind rivet 10 is removed from a body 11b. Thereafter, the cut portion of the head 11c of the blind rivet 10 is separated from the body 11b and the body 11b slips out of the fastening holes 1a and 2a, so that the blind rivet 10 is pulled out of the base materials 1 and 2.

The above-mentioned dismounting method for a fastening member takes preparation time, such as for selection of a drill 14, and time for performing the cutting, etc. Further, as shown in FIG. 98, when the head 11c is cut using a drill 14, the extreme end of the drill 14 reaches the base material 1 so that the fastening hole 1a of the base material 1 is cut to make the fastening hole 1a larger that it originally was. Then, even if the base material 1 is recycled and re-fastened using the blind rivet 10, it is not possible to secure sufficient fastening force. Generally, if the base materials 1 and 2 are damaged when the dismounting work for a fastening member is carried out, it is difficult to recycle the base materials 1 and 2.

Further, in the case of the dismounting method for a fastening member using the drill 14 of this kind, there is a further problem in that when the head of the fastening member is cut, a free running phenomenon occurs in which the fastening member rotates integrally with the drill 14 as the drill 14 rotates and this may either scratch the base material 1 or fail to cut the head 11c. In particular, in the case where the base material 1 is used for the exterior of products, when the surface of the base material 1 is scratched, the quality of the product is materially lowered, and the base material 1, having such a scratch as described, cannot be reused or recycled. In other words, when the dismounting method uses a drill 14 for dismounting of the fastening member, the chances of the base material becoming of inferior quality, so as to not be recyclable, materially increases.

In view of the foregoing, in order to prevent the free running phenomenon of the fastening member as the drill 14 rotates, as shown in FIG. 97, the head 11c or the body 11b is gripped with a gripping tool 15, such as a plier or a pair of cutting pliers, so that the head 11c may be cut by the drill 14. However, this poses a problem in that, since a danger is involved if this work is carried out by one person, the work must be carried out by two or more persons, resulting in an increase of personnel expenses.

However, when the head 11c of the fastening member is plate-shaped so that it is difficult to grip the head 11c with a gripping tool 15, and when fastening is performed at portions of the base materials 1 and 2 where a person's hands cannot enter the back sides of the base materials 1 and 2, the body 11b cannot be gripped by the gripping tool 15, thus making it difficult to prevent the free running phenomenon from occurring.

In the case of the screw fastening, as shown in FIGS. 92(a) and 92(b), the fastening member, such as the bolt 3 and nut 4 or the tapping screw 52, can often be removed easily from the base materials 1 and 2. However, also in the case of the screw fastening, when either the engaging portion between the bolt 3 and the nut 4 becomes encrusted with rust and adhered, or when the engaging portion between the tapping screw 5 and the fastening holes 1a and 2a becomes adhered, the drawback may occur that the threads are broken and the fastening member, made up of the bolt 3 and nut 4 or the tapping screw 5, cannot be dismounted from to the base materials 1 and 2. Further, if a corner of the head of the bolt 3, a corner of the nut 4, and a head of the tapping screw 5 are damaged, a great difficulty ensues in removal of the bolt 3, the nut 4, and the tapping screw 5 from the base materials 1 and 2.

SUMMARY OF THE INVENTION

An object of the present invention is to provide: a dismounting method for a fastening member, wherein a fastening member is dismounted from base materials easily and quickly without damaging the base materials; a dismounting device for a fastening member; an attachment construction of a fastening member; and a production system using the dismounting method for a fastening member.

For achieving the aforementioned object, according to a first aspect, a dismounting method for a fastening member is provided in which a fastening member is dismounted from a base material, wherein the fastening member includes a head and a body, the body is inserted into a fastening hole formed in a base material, and the head contacts a peripheral edge of the fastening hole to assume a fastened state with the base material. The method includes the steps of: a first cutting step of cutting a boundary region between the head and the body, wherein cutting is started from the head and proceeds toward the body; and a separating step of separating the head from the body, in which the fastening member can be removed from the base material by the separating step.

This provides an effect that the fastening member, fastened to the base material, can be removed from the base material easily and quickly without the fastening member running idle and without damaging the base material.

According to a second aspect, a dismounting method, for dismounting a fastening member from a base material, is provided. The fastening member has a body integral with a head and the fastening member is inserted into a fastening hole formed in the base material. The fastening member has a boundary region which includes a cylindrical region having a side with a smaller diameter than a diameter of the fastening hole. The cylindrical region is substantially parallel to an outer peripheral surface of the body, between the body and the head. The head contacts a peripheral edge of the fastening hole to assume a fastened state with the base material. The method includes the steps of: a pulling step of gripping a shaft of a cutting means including a knife edge, the knife edge having substantially the same diameter as a diameter of the boundary region and the shaft being substantially integral with the knife edge to pull the shaft in the direction apart from the head, wherein the pulling step causes the cutting force to be accumulated in the cutting means; and a rupturing step of rupturing the shaft during the movement of the shaft in the direction apart from the head, the rupturing step releasing the cutting force, and as a result, the knife edge cutting the boundary region.

This provides an effect that the cutting force can be applied to the boundary region at a time when cutting and separating the head from the body can be carried out positively, and a burden on an operator can be reduced.

According to a third aspect, a dismounting device, for dismounting a fastening member from a base material, is provided. The fastening member includes a head and a body, wherein the body is inserted into a fastening hole formed in the base material, and the head contacts a peripheral edge of the fastening hole to assume a fastened state with the base material. The dismounting device includes a cutting means for cutting a boundary region between the body and the head to separate the head from the body, thereby obtaining an effect similar to that of the first aspect.

According to a fourth aspect, a dismounting device for a fastening member is provided. The dismounting device separates the fastening member from a base material to which the fastening member has been fastened by a body inserted into a fastening hole of the base material and a head formed integrally with the body and placed in pressure contact with a peripheral edge of the fastening hole, from the base material. The dismounting device includes: a cutting blade for cutting a boundary region between the body and the head in the axial direction of the body; and a cutting force applying means for applying a cutting force for cutting the boundary region via the cutting blade; the cutting force applying means includes a cutting force urging means for accumulating the cutting force applied by the cutting blade and releasing the accumulated cutting force to thereby apply the cutting force of the cutting blade toward the fastening member; a cutting force accumulating means for accumulating the cutting force applied by the cutting blade in the cutting force urging means; and a cutting force releasing means for releasing the cutting force accumulated in the cutting force urging means when the cutting force accumulated in the cutting force urging means by the cutting force accumulating means reaches a state capable of cutting the body and the head.

This provides an effect that the dismounting of the fastening member can be carried out without imposing a burden on the operator.

According to a fifth aspect, a dismounting device, for dismounting a fastening member from a base material, is provided. The fastening member has a body integral with a head. The head is inserted into a fastening hole formed in the base material. The fastening member has a boundary region including a cylindrical region having a side with a smaller diameter than a diameter of the fastening hole. The cylindrical region is substantially parallel to an outer peripheral surface of the body between the body and the head. The head contacts a peripheral edge of the fastening hole to assume a fastened state with the base material. The dismounting device includes: a cutting blade member being movable in an axial direction of the body with respect to a body cover, and having a knife edge portion, wherein a diameter of a knife edge is smaller than a diameter of the fastening hole and is substantially the same in size as a boundary region on an outer peripheral surface of the head at the extreme end thereof to cut the boundary region; and a cutting force applying member arranged within the body cover to apply the cutting force to the knife edge portion, the cutting blade member separating the body and the head of the fastening member from each other, and as a result, the fastening member, with the head removed, is removed from the base material.

This provides an effect that the boundary region between the head and the body can be cut without using a tool, such as a hammer.

According to a sixth aspect, a dismounting device for a fastening member is provided for dismounting a fastening member, in a fastened state with a base material, using a fastening tool for fastening the fastening member to the base material by raising a fastening shaft inserted into an axial hole of the body while gripping it by a fastening shaft gripping portion in a state of bringing a head integral with the body inserted into a fastening hole of the base material into pressure contact with a peripheral edge of the fastening hole to rupture the fastening shaft from a rupturing portion. The dismounting device includes: a cutting blade for cutting a boundary region between the body and the head in an axial direction of the body; a cutting force urging means for accumulating a cutting force for cutting the boundary region by compression and releasing the accumulated cutting force to thereby apply the cutting force toward the fastening member to the cutting blade; a compression member having an shaft detachably mounted on a fastening shaft gripping portion and compressing the cutting force urging means by raising the shaft by the fastening shaft gripping portion; and a rupturing portion formed in the compression member for releasing the cutting fore and ruptured by the cutting force accumulated in the cutting force urging means when the cutting force reaches a state capable of cutting the boundary region.

This provides an effect similar to that of the second aspect.

According to a seventh aspect, an attachment construction is provided. The attachment construction includes an attachment member in which a body integral with a head is inserted into a fastening hole formed in a base material, the head being placed in contact with a peripheral edge of the fastening hole, and a boundary region between the body and the head has a cylindrical shape substantially parallel to the outer peripheral surface of the body, the boundary region being mounted on a blind rivet fastening device for fastening a blind rivet smaller in diameter than the fastening hole to dismount the blind rivet. The attachment member includes: a hollow body cover having one released in the axial direction of the body, a hollow knife edge portion provided with a dismounting device having an outside diameter smaller than a diameter of the fastening hole and an inside diameter smaller than the outside diameter of the body, being released to one in the axial direction of the body and having a through-hole in the other, a pulling shaft provided with an shaft having the size smaller in diameter of the through-hole and gripped by the blind rivet fastening device and an engaging portion in engagement with the back of the dismounting device body, and an elastic member provided between the body cover and the dismounting device body.

This provides an effect that the dismounting of the fastening member can be carried out using an existing blind rivet device.

According to an eighth aspect, a production system for recovering a base material by removing a fastening member, including a head and a body, is provided. The body is inserted into a fastening hole formed in a base material, the head being placed in contact with a peripheral edge of the fastening hole to assume a fastened state with the base material, wherein the fastened condition of the fastening member with respect to the base material is inspected, and when the fastened condition between the fastening member and the base material is found to be inferior on the basis of inspection, the fastening member is cut from a boundary region between the head and the body to separate the body and the head from each other to remove the fastening member from the base material.

This provides an effect that the recovery of the base material, from which the fastening member is dismounted and removed, is easy.

According to a ninth aspect, a production system for recovering a base material by removing a fastening member, including a head and a body, is provided. The body is inserted into a fastening hole formed in a base material, the head being placed in contact with a peripheral edge of the fastening hole to assume a fastened state with the base material, wherein the fastening member in the fastened state with the base material is cut from a boundary region between the body and the head to separate the body and the head from each other to remove the fastening member form the base material.

This provides an effect similar to that of the eighth aspect.

BRIEF DESCRIPTION OF THE DRAWINGS

The above and other objects, features and advantages of the present invention will become more apparent from the following description taken in connection with the accompanying drawings, in which:

FIGS. 32(a) and 32(b) are cross-sectional views showing the operation of the gripping unit shown in FIG. 29, wherein FIG. 32(a) shows a state immediately before a chuck pawl of the gripping unit is placed in engagement with the body, and FIG. 32(b) shows a state of placing the chuck pawl in engagement with the body.

FIGS. 34(a) to 34(c) are front views showing other embodiments of a fastening member dismounted by the dismounting device according to the present invention, wherein FIG. 34(a) shows a fastening member in which the head has an inclined surface, FIG. 34(b) shows a fastening member in which the head is provided a difference in level, and FIG. 34(c) shows a fastening member in which the head is provided with a thick-wall portion;

FIGS. 39(a) to 39(c) are cross-sectional views of a collar inserted into the fastening member, wherein FIG. 39(a) shows a state immediately before a collar formed with a slitting is inserted into the body of the fastening member, FIG. 39(b) shows a state of inserting a fastening member with a collar into base materials 1 and 2, and FIG. 39(c) shows a state of caulking the body of the fastening member to fasten the base material by the fastening member;

FIGS. 40(a) to 40(c) are plan views of the collar shown in FIGS. 39(a) to 39(c), respectively, wherein FIG. 40(a) shows a collar formed with a slitting, FIG. 40(b) shows a collar formed with a V-groove, and FIG. 40(c) shows a collar formed with a through-hole;

FIG. 41 is a cross-sectional view showing a gripping unit used to break the collar shown in FIGS. 39(a) to 39(c);

FIGS. 44(a) to 44(c) show examples of collars, wherein FIG. 44(a) is a plan view in which a fixing layer is provided on a collar with a slitting, FIG. 44(b) is a side view of the collar shown in FIG. 44(a), and FIG. 44(c) is a side view showing a state of mounting the collar, shown in FIG. 44(b), on the lower surface of the head of the fastening member;

FIGS. 47(a) to 47(c) are partial cross-sectional views for explaining the process of dismounting a boundary region of a blind rivet using the dismounting device shown in FIG. 45, wherein FIG. 47(a) shows a state immediately before a cutting blade is bitten into a boundary region between a head and a body to cut and separate them, FIG. 47(b) shows a state of placing a knife edge of the cutting blade in contact with a caulked portion of the back after separation of the head and the body, and FIG. 47(c) shows a state of extruding the body from a fastening hole by the cutting blade;

FIGS. 49(a) to 49(c) are partial cross-sectional views for explaining the process of cutting a boundary region using the cutting blade shown in FIGS. 48, wherein FIG. 49(a) shows a state immediately after the cutting blade bites into the head, FIG. 49(b) shows a state immediately before the cutting blade bites into the boundary region between the head and the body to cut and separate them, and FIG. 49(c) shows a state of extruding the body from the fastening hole by the cutting blade;

FIGS. 52(a) and 52(b) are cross-sectional views showing the process of cutting a boundary region of a blind rivet using the dismounting device, shown in FIG. 51, wherein FIG. 52(a) shows a state immediately after cutting the boundary region, and FIG. 52(b) shows a state of the extrusion of the body by the body extruding means after cutting the boundary region;

FIGS. 54(a) to (54c) are perspective views of an example of a radial cutting blade used when the dismounting method for a fastening member, according to the present invention, is executed, wherein FIG. 54(a) shows a radial cutting blade having a radial edge comprised of four plates.

FIGS. 61(a) and 61(b) show a detailed constitution of a united portion of the cylindrical construction shown in FIG. 59, wherein FIG. 61(a) is an exploded perspective view, and FIG. 61(b) is a partial perspective view showing an assembly thereof;

FIGS. 62(a) and 62(b) are views of a piston shown in FIG. 60, wherein FIG. 62(a) is a bottom view of the piston, and FIG. 62(b) is a partial perspective view showing an example using a cylindrical cutting blade as the piston;

FIGS. 65(a) and 65(b) are top plan views of the steps of forming a plurality of holes in the head by the needle-like member, wherein FIG. 65(a) shows a row of holes formed in the head by the first step, and FIG. 65(b) shows continuous holes formed in the head by a plurality of steps;

FIGS. 68(a) and 68(b) are cross-sectional views for explaining the process of cutting a boundary region of a blind rivet using the dismounting device shown in FIG. 67, wherein FIG. 68(a) shows a state of having a tapping member threadingly engaged with an axial hole, and FIG. 68(b) shows a state of cutting a boundary region by a cutting blade shown in FIG. 67;

FIGS. 69(a) and 69(b) are cross-sectional views showing a schematic constitution of a dismounting device capable of relieving shocks applied to a cutting blade according to an eighteenth embodiment of the present invention, wherein FIG. 69(a) shows a state of having a tapping member threadingly engaged with an axial hole, and FIG. 69(b) shows a state of cutting a boundary region by a cutting blade;

FIGS. 70(a) and 70(b) are cross-sectional views showing a schematic constitution of a dismounting device capable of relieving shocks applied to a cutting blade according to a nineteenth embodiment of the present invention, wherein FIG. 70(a) shows a state of having a tapping member threadingly engaged with an axial hole, and FIG. 70(b) shows a state of cutting a boundary region by a cutting blade;

FIGS. 73(a) to 73(c) are cross-sectional views of assistance in explaining the process of removing a mandrel, shown in FIG. 71, from an axial hole, wherein FIG. 73(a) shows a state of removing a mandrel by a knock pin, FIG. 73(b) shows a fastening member with a mandrel removed, and FIG. 73(c) shows a state immediately before a pull rod, shown in FIG. 72, is inserted into the axial hole;

FIGS. 74(a) and 74(b) are cross-sectional views for explaining the process of cutting a boundary region of a blind rivet using a dismounting device shown in FIG. 71, wherein FIG. 74(a) shows a state of having a cutting blade placed in contact with a head, and FIG. 74(b) shows a state of having a knife edge of a cutting blade bitten into the head along the boundary region by the pulling of the pull rod;

FIGS. 75(a) and 75(b) are cross-sectional views showing a dismounting device capable of relieving shocks applied to a cutting blade forming a cutting blade in a rivet contact portion of a pull rod according to a twenty-first embodiment of the present invention, wherein FIG. 75(a) shows a state of placing a rivet contact portion of the pull rod in contact with a caulked portion, and FIG. 75(b) shows a state of cutting the caulked portion by means of a cutting blade formed in the rivet contact portion;

FIGS. 76(a) and 76(b) are cross-sectional views showing a dismounting device capable of relieving shocks applied to a cutting blade by cutting both heads of a blind rivet by means of a cutting blade provided on a nose piece and a cutting blade provided in the rivet contact portion according to a twenty-second embodiment of the present invention, wherein FIG. 76(a) shows a state of placing both the cutting blades placed in contact with the heads, and FIG. 76(b) shows a state in which each head is cut by the cutting blade;

FIGS. 78(a) and 78(b) are perspective views showing one example of a cutting blade used in the dismounting device shown in FIG. 77, wherein FIG. 78(a) shows a cutting blade formed with a tapered surface in the outer peripheral surface thereof, and FIG. 78(b) shows a cutting blade formed with a tapered surface in the inner peripheral surface thereof;

FIGS. 79(a) and 79(b) are bottom views of the piston and the cutting blade, shown in FIG. 77, wherein FIG. 79(a) shows the case where cutting blades are formed at intervals of 45 degrees, and FIG. 79(b) shows the case where cutting blades are formed at intervals of 60 degrees.

FIG. 81 is a partial cross-sectional view showing a state of cutting a boundary region using the cylindrical cutting blades shown in FIGS. 78(a) and 78(b);

FIGS. 82(a) and 82(b) show the cut state of the head cut by the cylindrical cutting blades, shown in FIGS. 78(a) and 78(b), wherein FIG. 82(a) shows a cut portion and an uncut portion formed in the head, and FIG. 82(b) shows a state of a cylindrical cut portion in the head accomplished by a number of cutting operations;

FIGS. 85(a) to 85(d) are partial cross-sectional views of assistance in explaining the process of cutting a boundary region using a dismounting device, shown in FIG. 84, wherein FIG. 85(a) shows a state of having a compression member held on a jaw portion, FIG. 85(b) shows a state of having a cutting force accumulated in a cutting force urging means, FIG. 85(c) shows a state of having a rupture portion of the compression member ruptured, and FIG. 85(d) shows a state of having a boundary region cut by the release of the cutting force accumulated;

FIGS. 92(a) and 92(b) are partial cross-sectional views of the conventional screw fastening technique, wherein FIG. 92(a) shows a state of fastening a base material by means of bolt and nut, and FIG. 92(b) shows a state of fastening base materials to each other via a tapping screw;

FIGS. 93(a) and 93(b) are cross-sectional views of the conventional pin fastening technique, wherein FIG. 93(a) shows a state of fastening base materials to each other by caulking opposite ends of a pin using a caulking machine, and FIG. 93(b) shows a state of fastening an end of an shaft and a base material by caulking the shaft as a base material;

FIGS. 94(a) to 94(f) show a conventional rivet fastening technique, wherein FIG. 94(a) is a front view showing a solid rivet, FIG. 94(b) is a cross-sectional view showing a tubular rivet, FIG. 94(c) is a cross-sectional view showing a blind rivet, FIG. 94(d) is a cross-sectional view showing a state of fastening base materials to each other by means of the solid rivet, FIG. 94(e) is a partial cross-sectional view showing a state of fastening base materials to each other by means of the tubular rivet, and FIG. 94(f) is a partial cross-sectional view showing a state of fastening base materials to each other by means of the blind rivet;

FIGS. 95(a) to 95(d) show a conventional fastening step of fastening base materials using a blind rivet, wherein FIG. 95(a) is a partial cross-sectional view showing a state immediately before the blind rivet is inserted into a fastening hole of the base material 1, FIG. 95(b) is a partial cross-sectional view showing a state immediately before the end of a mandrel of the blind rivet is gripped by a jaw member of a blind rivet fastening device, FIG. 95(c) is a partial cross-sectional view showing a state of gripping the shaft of the mandrel by the jaw member, and FIG. 95(d) is a partial cross-sectional view showing a state of having a projecting end of the body caulked by rupturing the mandrel from a ruptured portion by pulling the shaft of the mandrel by the jaw member;

DESCRIPTION OF THE PREFERRED EMBODIMENTS

One mode for carrying out a dismounting method for a fastening member, a dismounting device for a fastening member, an attachment construction of a fastening member, and a production system using the dismounting method for a fastening member, according to the present invention, will be described hereinafter with reference to the drawings.

The dismounting device described below, which is a first embodiment of the present invention, can be used to dismount a fastening member used for mechanical fastenings, such as screws, pins, rivets, burr caulkings, etc. However, for the convenience of description, a blind rivet 10, as the fastening member, will be mainly described as the object to be dismounted. A blind rivet 10 is widely used as a fastening member for office machines, such as copying machines, printers, facsimiles, etc.

Figure 1:
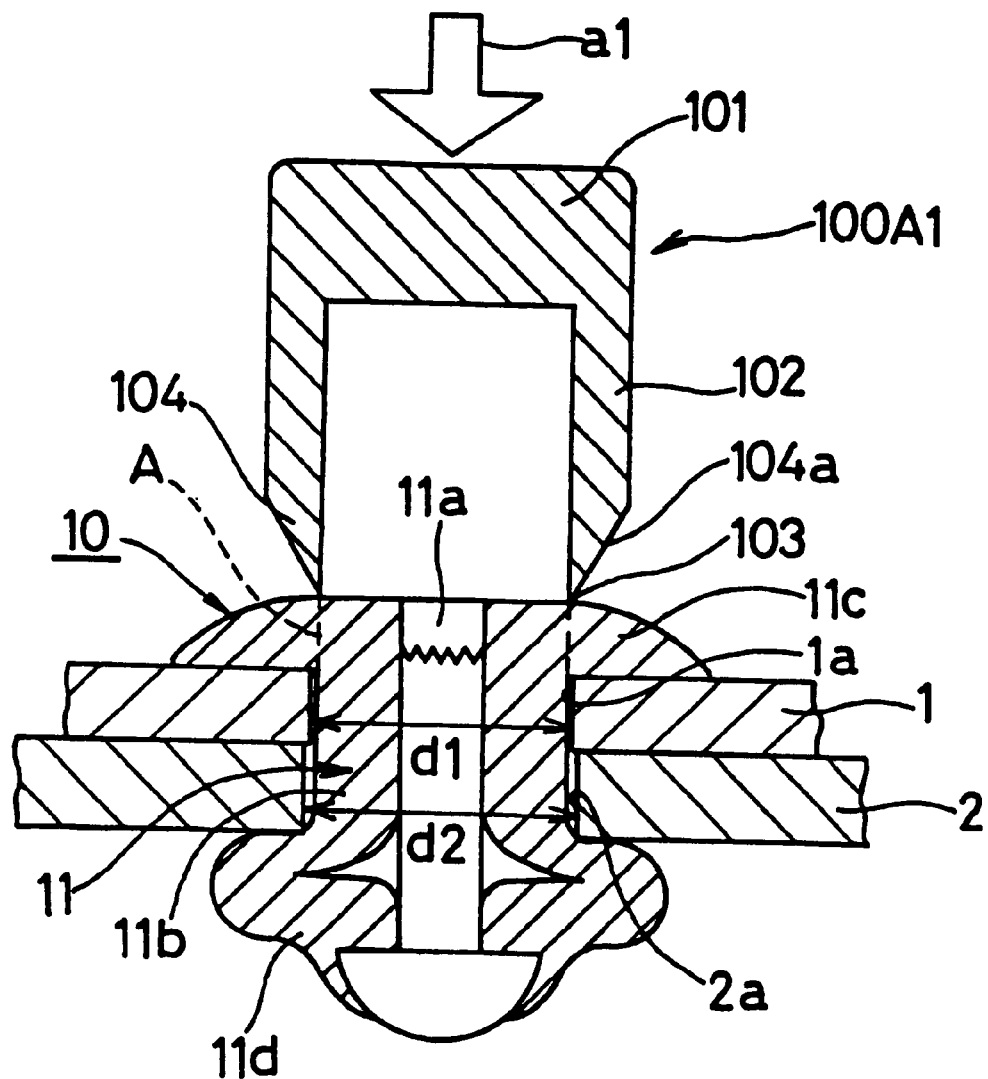
FIG. 1 is a cross-sectional view for explaining the schematic constitution of a dismounting device having a simple constitution according to a first embodiment of the present invention.
Figure 2:
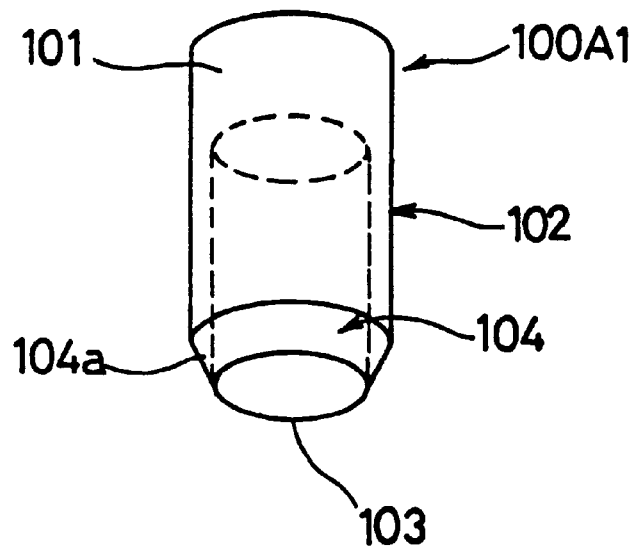
FIG. 2 is a perspective view of the dismounting device shown in FIG. 1.

Referring to FIG. 1, a reference numeral 100A1 designates a simple dismounting device. The dismounting device 100A1 includes a substantially columnar dismounting device body 101 and a substantially cylindrical cutting blade 102, the cutting blade 102 being integral with the dismounting device body 101 and serving as a cutting means. The extreme end (i.e., inclined portion) of the cutting blade 102 includes a knife edge portion 104. The knife edge portion 104 is reduced in diameter toward the extreme end thereof, and the extreme end of the knife edge portion 104 comprises a sharp cylindrical knife edge 103. FIG. 2 shows an external shape of the dismounting device 100A1. The knife edge 103 is uniformly formed in the entire circumferential direction. The knife edge portion 104 has an outer peripheral surface constituting a tapered surface 104a inclined at a fixed angle from the extreme end. The diameter of the knife edge 103 is smaller than a diameter d1 of a fastening hole 1a of a base material 1.

The diameter d2 of a fastening hole 2a of a base material 2 is made larger than the diameter d1. This is so as to avoid deformation of the base material 2 resulting from the fact that when the fastening member is caulked, a caulked portion, which is subjected to plastic deformation caused by caulking, bites into a fastening hole 2a of the base material 2.

The dismounting device 100A1 is used, as follows. The dismounting device 100A1 is placed in contact with a head 11c of the blind rivet 10 opposite the surface of the base material 1 to cut at a boundary region A between a body 11b and the head 11c of a rivet body 11. The boundary region A extends in the axial direction of the body parallel to the inner peripheral surface of the fastening hole 1a to present a cylindrical shape. The diameter of the boundary region A is smaller than the diameter d1 of the fastening hole 1a.

The dismounting of the blind rivet 10 using the dismounting device 100A1 will be carried out in the procedure described hereinafter.

First, the dismounting device 100A1 is applied to the head 11c by positioning the knife edge 103 at a part of the head 11c so as to be substantially concentric with the fastening hole 1a as viewed from the top. Thus, the knife edge 103 is positioned nearly directly above the cylindrical boundary region A.

Figure 3:
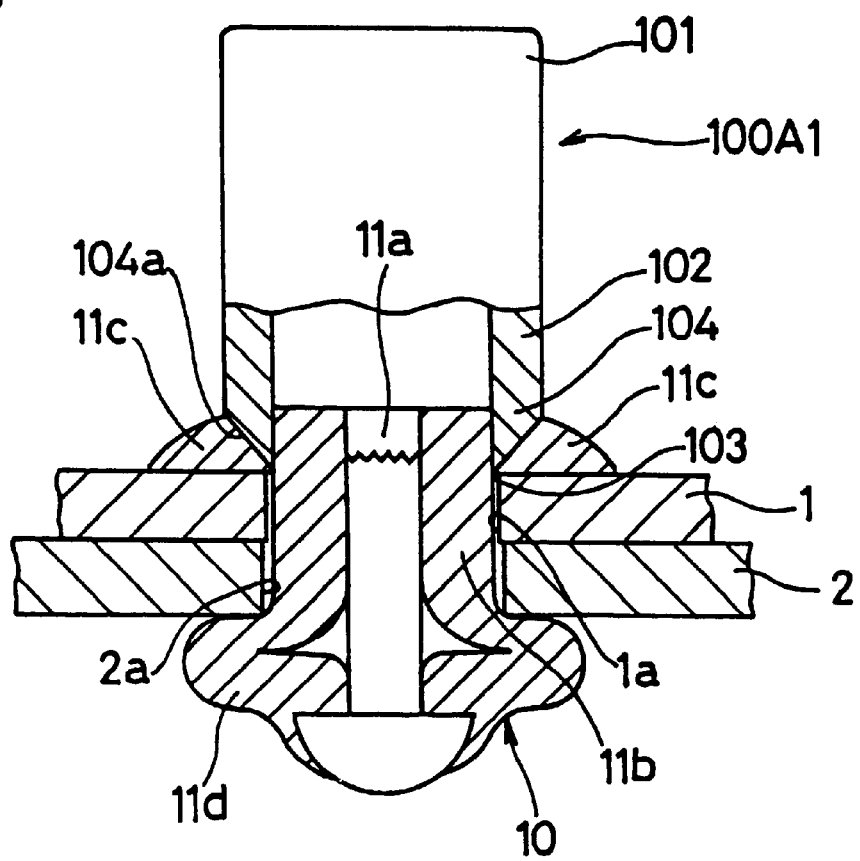
FIG. 3 is a cross-sectional view for explaining the operation for cutting a boundary region of a fastening member using the dismounting device shown in FIG. 1.

Next, the top of the dismounting device body 101 of the dismounting device 100A1 is struck with a hammer or similar to apply a cutting force, in the direction indicated by arrow a1, to the cutting blade 102. Then, the knife edge portion 104 bites into the boundary region A between the head 11c and the body 11b, as shown in FIG. 3, to cut the head 11c and the body 11b of the blind rivet 10 so that the head 11c is separated from the body 11b. At that time, since a force toward the outside is applied to the head 11c by the tapered surface 104a of the cutting blade 102, the head 11c easily separates from the body 11b.

That is, as shown in FIG. 3, the head 11c of the blind rivet 10 is deformed into a shape which does not become entangled with the cutting blade 102 and which is not cut by the presence of the tapered surface 104a formed in the outer peripheral surface of the knife edge portion 104. Therefore, the head 11c separates from the body 11b and does not become entangled with the outer peripheral portion of the cutting blade 102, so that after the head 11c is cut, it is easily separated from the body 11b, and the blind rivet 10, formerly fastened to the base materials 1 and 2, can be removed easily and quickly without damaging the base materials 1 and 2.

According to the dismounting device 100A1, a dismounting method is provided in which the knife edge 103 moves in the direction parallel to the central axis of the fastening holes 1a and 2a of the base materials 1 and 2 to cut the boundary region A between the head 11c and the body 11b. This is in contrast to the conventional dismounting method in which the head 11c is cut by means of a drill to remove the head from the base material. Therefore, in using the present invention's method to dismount the blind rivet 10, it is possible to prevent the blind rivet 10 from running idle or the base materials 1 and 2 from scratching due to the blind rivet's 10 running idle, and it is also possible to remove the blind rivet 10 from the base materials 1 and 2 quickly and easily.

Figure 4:
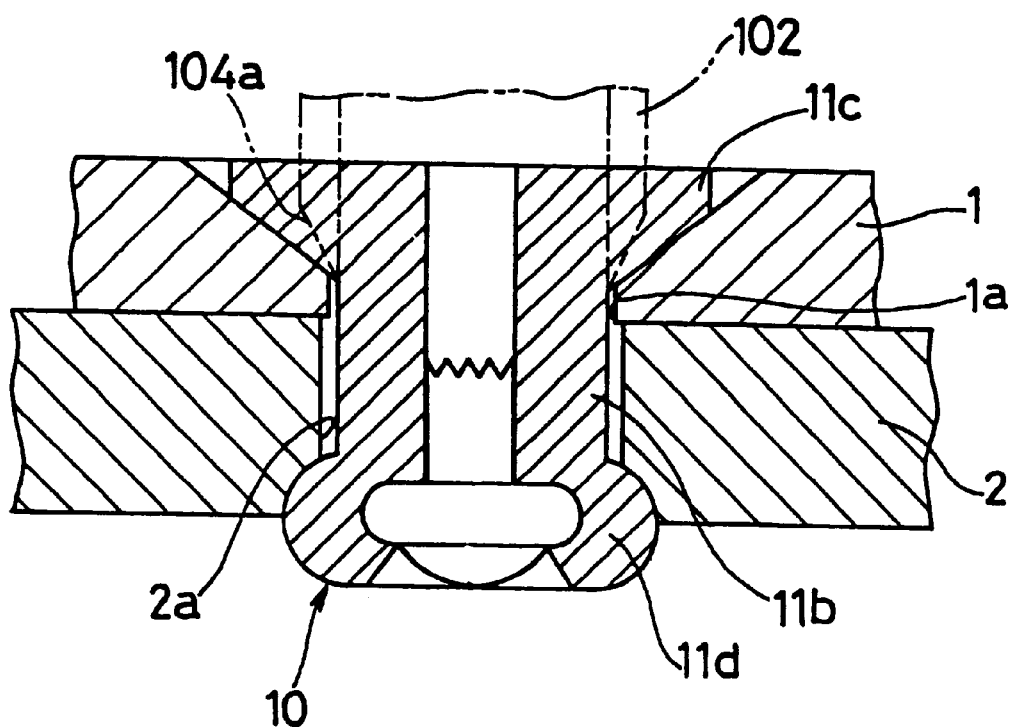
FIG. 4 is a cross-sectional view for explaining the operation for cutting a boundary region of a fastening member, whose head has a plate shape, using the dismounting device shown in FIG. 1.

Further, according to the dismounting method using the dismounting device 100A1, it is not necessary to grip and lock the head 11c and the body 11b of the blind rivet 10 using a gripping tool, such as a plier or a pair of cutting pliers. Accordingly, for example, if the dismounting device 100A1 is used, as shown in FIG. 4, even in the case where the shape of the head 11c of the blind rivet 10 is plate-like, and the head 11c is buried in the base material 1 so that it is difficult to grip the head 11c with a gripping tool, and in the case where the plastically deformed portion (caulked portion) 11d of the body 11b of the blind rivet 10 bites into the base material 2 so that it is difficult to grip the body 11b with a gripping tool, the blind rivet 10 can be removed from the base materials 1 and 2 quickly and easily.

EXAMPLE 1

Dismounting Device Having a Cutting Force Applying Means

In the dismounting of the fastening member using the dismounting device 100A1 shown in FIG. 1, a tool such as a hammer was necessary. It is not desirable to require an extra tool in using the dismounting device 100A1 because it takes time for preparation thereof or similar.

Figure 5:
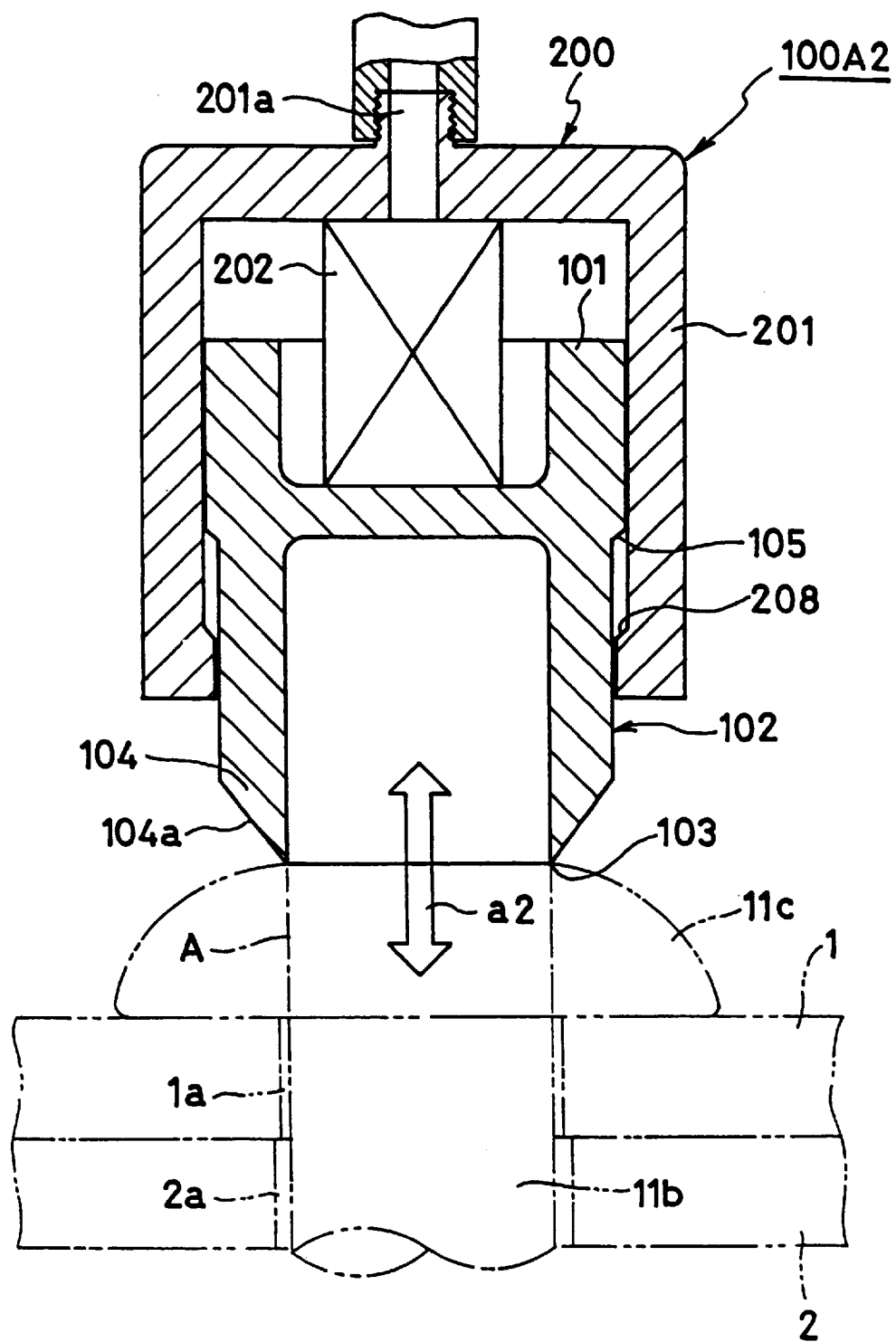
FIG. 5 is a cross-sectional view for explaining a dismounting device having a cutting force applying means according to a second embodiment of the present invention.

FIG. 5 shows a dismounting device 100A2, according to a second embodiment of the present invention, which requires no hammer. The dismounting device 100A2, shown in FIG. 5, has a cutting force applying means 200. The cutting force applying means 200 comprises a cutting blade support 201, as a body cover, and a cutting force applying member 202. The cutting blade support 201 is tubular (not limited to cylindrical) and supports the cutting blade 102 in a manner capable of moving forward and backward in the direction indicated by arrow a2. The cutting force applying member 202 is constituted by a hydraulic cylinder or an air cylinder, for example. The cutting blade support 201 is formed at its top with a pressurizing channel 201a. Oil or air is fed to the hydraulic cylinder or the air cylinder through the pressurizing channel 201a, whereby the hydraulic cylinder or the air cylinder is driven. Thereby, the cutting blade 102 can be moved in the direction indicated by arrow a2.

For a supplying oil or air to the hydraulic cylinder or the air cylinder, respectively, a supply means of oil or air can be used, without modification, as a driving source for a blind rivet fastening device 13 for fastening the blind rivet 10 to the base materials 1 and 2. It is desirable that the cutting blade support 201 is provided with a gripping portion having, for example, a pistol shape so that an operator can operate the dismounting device 100A2 easily using only one hand.

According to the dismounting device 100A2, a tool such as a hammer is unnecessary, and the cutting force can be applied to the cutting blade 102 by a button operation similar to the blind rivet fastening device 13. Therefore, special skill or a skilled technique is unnecessary for handling the dismounting device 100A2, and safety thereof is also improved.

EXAMPLE 2

Dismounting Device Having a Cutting Force Applying Means

Figure 6:
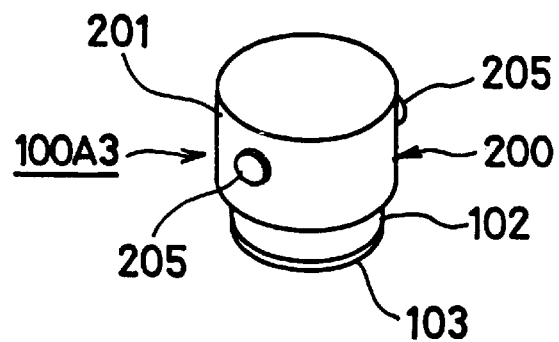
FIG. 6 is a perspective view of a dismounting device having a cutting force applying means according to a third embodiment of the present invention.
Figure 7:
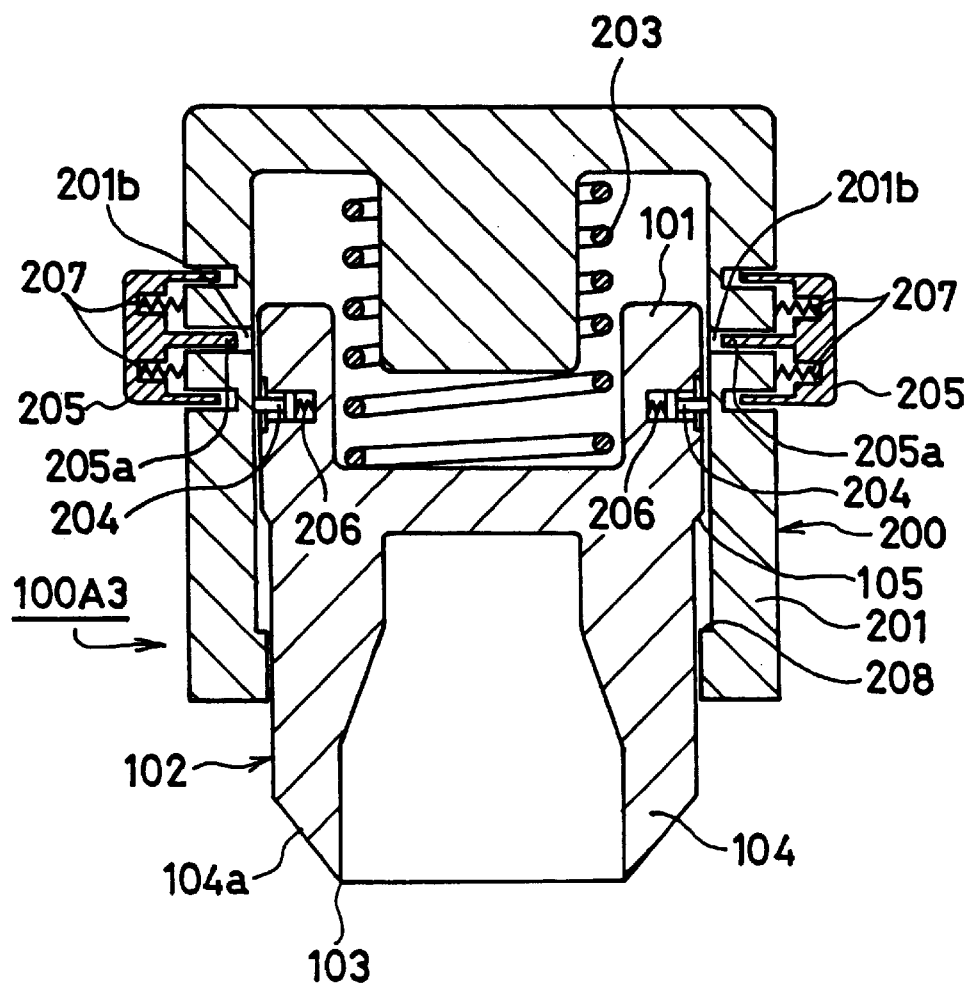
FIG. 7 is a cross-sectional view of the dismounting device shown in FIG. 6.

In the dismounting device 100A2 shown in FIG. 5, an oil or an air supply means was necessary to apply the cutting force to the cutting blade 102. FIGS. 6 and 7 show a dismounting device 100A3, according to a third embodiment of the present invention, capable of applying the cutting force to the cutting blade 102 without using an external driving source, such as an oil or air supply means.

FIG. 6 shows an external view of the dismounting device 100A3, and FIG. 7 shows a cross-sectional view of the same. A cutting force applying means 200 of the dismounting device 100A3 includes: a cylindrical cutting blade support 201, as a body cover for supporting a hollow cylindrical cutting blade 102 in a manner so as to be able to move forward and backward; a coil spring (resilient member) 203, as a cutting force urging means for urging the cutting force in a cutting direction of the cutting blade 102; a stopper (stop member) 204, as a cutting force accumulation means for holding the coil spring 203 in a contracted state for accumulating the urging force of the cutting blade 102 in the coil spring 203; and a release button 205, as a release means (cutting force release means) for releasing the stopping of the cutting blade 102 by the stopper 204.

The stopper 204 is formed in the outer peripheral portion of the dismounting device body 101 and urged in the projecting direction by means of a spring 206. The cutting blade support 201 is formed with a stop hole 201b in engagement with the stopper 204. The release button 205 is undisengageably provided on the cutting blade support 201. The release button 205 has a release pin (release member) 205a and a spring 207. The release pin 205a moves into the stop hole 201b, and the spring 207 urges the release button 205 in the projecting direction.

The dismounting of the blind rivet 10, fastened to the base materials 1 and 2, is carried out using the dismounting device 100A3, in accordance with the procedure described below. First, the knife edge 103 of the cutting blade 102 is positioned adjacent to the boundary region A between the body 11b and the head 11c of the blind rivet 10, in which condition the cutting blade support 201, of the dismounting device 100A3, is pressed against the head 11c of the blind rivet 10. Thereby, the cutting blade 102 is pressed into the cutting blade support 201, while contracting the coil spring 203 against the stretching force of the coil spring 203.

Thereby, the urging force to the cutting blade 102 is accumulated in the coil spring 203. When the stopper 204 reaches a position opposite to the stop hole 201b, the stopper 204 is pushed out by the spring 206 into engagement with the stop hole 201b. Thereby, the coil spring 203 is held in the state of having the urging force accumulated. The cutting blade 102 is also held in the state of being pressed into the cutting blade support 201.

Then, when the release button 205 is pressed into the cutting blade support 201 against the urging force of the spring 207, the stopper 204 is pressed into the dismounting device body 101 against the urging force of the spring 206 by the release pin 205a. Thereby, the engagement between the stopper 204 and the stop hole 201b is released so that the stretching force, as the cutting force being accumulated in the coil spring 203, is released at a time to apply the cutting force of the cutting blade 102.

Thereby, the knife edge portion 104 of the cutting blade 102 bites into the boundary region A to cut the boundary region A, and the body 11b and the head 11c are separated from each other. According to this dismounting device 101A3, the cutting force can be applied by the cutting blade 102, without using an external driving source, such as an oil or air supply means. Therefore, the dismounting device 100A3 is suitable, when the dismounting work is carried out in a place where an external driving source is not present nearby.

In the dismounting device 100A3, a shoulder 105 is formed in the outer peripheral portion of the cutting blade 102. The shoulder 208 is engagement with the shoulder 105 and is formed in the inner peripheral portion of the cutting blade support 201. The shoulder 105 and the shoulder 208 play a role such that, as shown in an enlarged scale in FIG. 8, when the knife edge 103 of the cutting blade 102 reaches a cutting and separating place in the vicinity of the boundary surface between the head 11c and the base material 1 of the blind rivet 10, and when the outer peripheral surface of the knife edge portion 104 of the cutting blade 102 reaches close to the edge of the fastening hole 1a of the base material 1, the cutting blade 102 is prevented from further movement in the cutting direction. Thereby, it is possible to positively avoid damage to the base material 1 which could be caused by the cutting from the cutting blade 102. The shoulder 105 and the shoulder 208 are also provided in the dismounting device 100A2 for the same reason.

Figure 8:
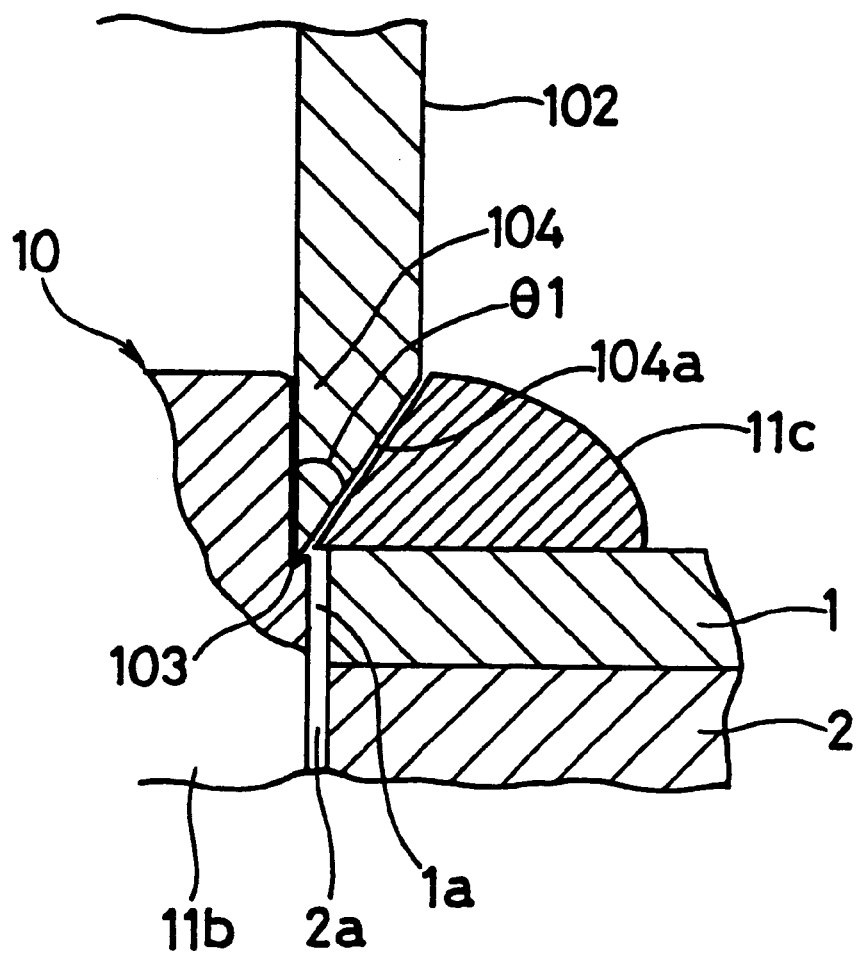
FIG. 8 is a partial cross-sectional view for explaining a positional relationship between a knife edge portion and a separating and rupturing part when a boundary area of a fastening member is cut using the dismounting device shown in FIG. 7.
Figure 9:
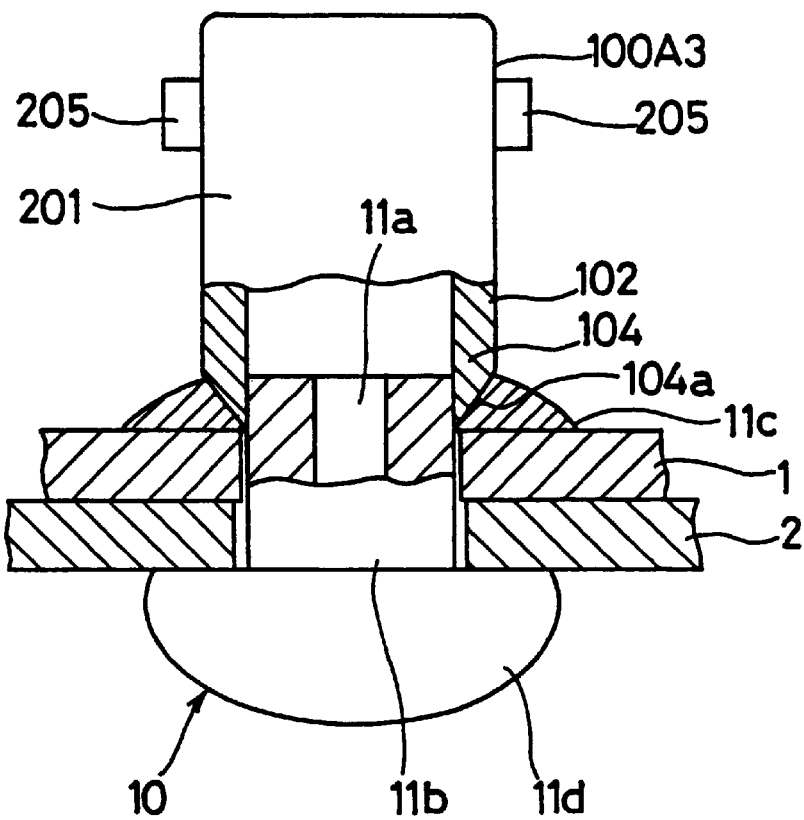
FIG. 9 is a partial cross-sectional view for explaining a relationship between a head of a fastening member cut using the dismounting device shown in FIG. 7 and a knife edge portion.

Also in the dismounting device 100A3, a tapered surface 104a is formed in the knife edge portion 104, as shown in FIG. 9, similarly to the dismounting device 100A1. The tapered surface 104a has a function similar to the tapered surface 104a provided in the knife edge portion 104 of the dismounting device 100A1. An inclination angle θ1 of the tapered surface 104a is preferably designed to be of such a magnitude that, as shown in FIG. 8, when the knife edge portion 104 of the cutting blade 102 reaches a cutting and separating place between the head 11c and the base material 1, the tapered surface 104a of the knife edge portion 104 is positioned near the edge of the fastening hole 1a of the base material 1.

That is, by designing the inclination angle $\theta_1$ of the tapered surface 104a as mentioned above, it is possible to avoid interference between the tapered surface 104a of the knife edge portion 104 and the edge of the fastening hole 1a of the base material 1 to prevent the base material 1 from being damaged when the boundary region A is cut. The same is true for the dismounting devices 100A1 and 100A2.

Figure 10:
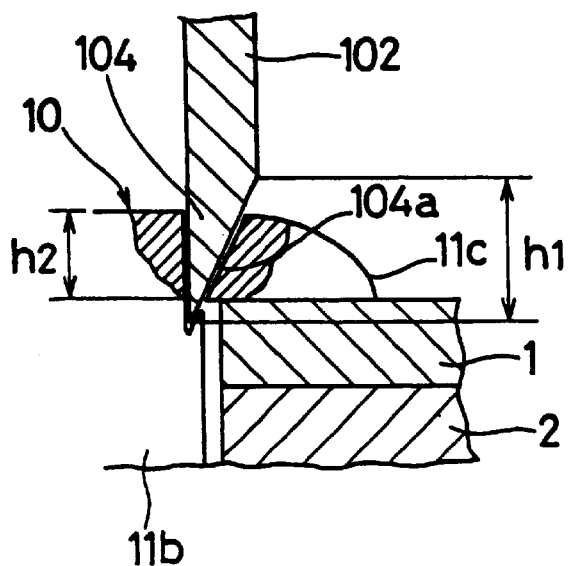
FIG. 10 is a partial cross-sectional view for explaining a relationship between a height of a knife edge portion of the dismounting device shown in FIG. 7 and a separating and rupturing part cut by the knife edge portion.

Preferably, the height h1 of the tapered surface 104a of the knife edge portion 104 is in excess of the height h2 of the boundary region A cut by the cutting blade 102 of the head 11c, as shown in FIG. 10. That is, $h1 \geq h2$.

By setting the height h1 of the tapered surface 104a of the knife edge portion 104 to satisfy the equation $h1 \geq h2$, it is possible to positively prevent the entanglement of the cutting blade 102 and the head 11c separated from the body 11b. The same is true for the dismounting devices 100A1 and 100A2.

In other words, the cutting force applied to the cutting means 102 by the cutting force applying means 200 may be of such a magnitude that the tapered surface (inclined portion) is superposed on the separating place of the boundary region A, where at least the body 11b and the head 11c of the blind rivet 10 are separated from each other.

Alternatively, the diameter of the extreme end of the inclined portion, formed on the outer peripheral surface, is smaller than the outside diameter of the body 11b, and the outside diameter of the cylindrical portion of the cutting blade 102 is larger than the diameter of the body 11b. Therefore, the cutting force applied by the cutting means of the cutting force applying means 200 may be applied to the fastening member so that the inclined portion is superposed on the separating place of the boundary region A, where the body 11b and the head 11c of the blind rivet 10 are separated from each other and the extreme end of the cutting means bites into the body 11b.

Further, alternatively, the cutting means is constituted by a cylindrical portion and a inclined portion, the incline portion being formed continuously in the cylindrical portion. The diameter of the extreme end of the inclined portion is smaller than the diameter of the fastening hole and the boundary region is of the size capable of being cut. The fastening member may be cut using the cutting means with the arrangement that the inclined portion is superposed on the separating place of the boundary region A, where the body 11b and the head 11c of the blind rivet 10 are separated from each other.

Note that the fastening member may be cut using the cutting means with the arrangement that the inclined portion is superposed on the separating place of the boundary region A, where the body 11b and the head 11c of the blind rivet 10 are separated from each other and the extreme end of the cutting means bites into the body 11b.

EXAMPLE

Dismounting Device Provided With a Tapered Surface in the Inner Peripheral Surface of the Knife Edge Portion 104 of the Cutting Blade 102

Figure 11:
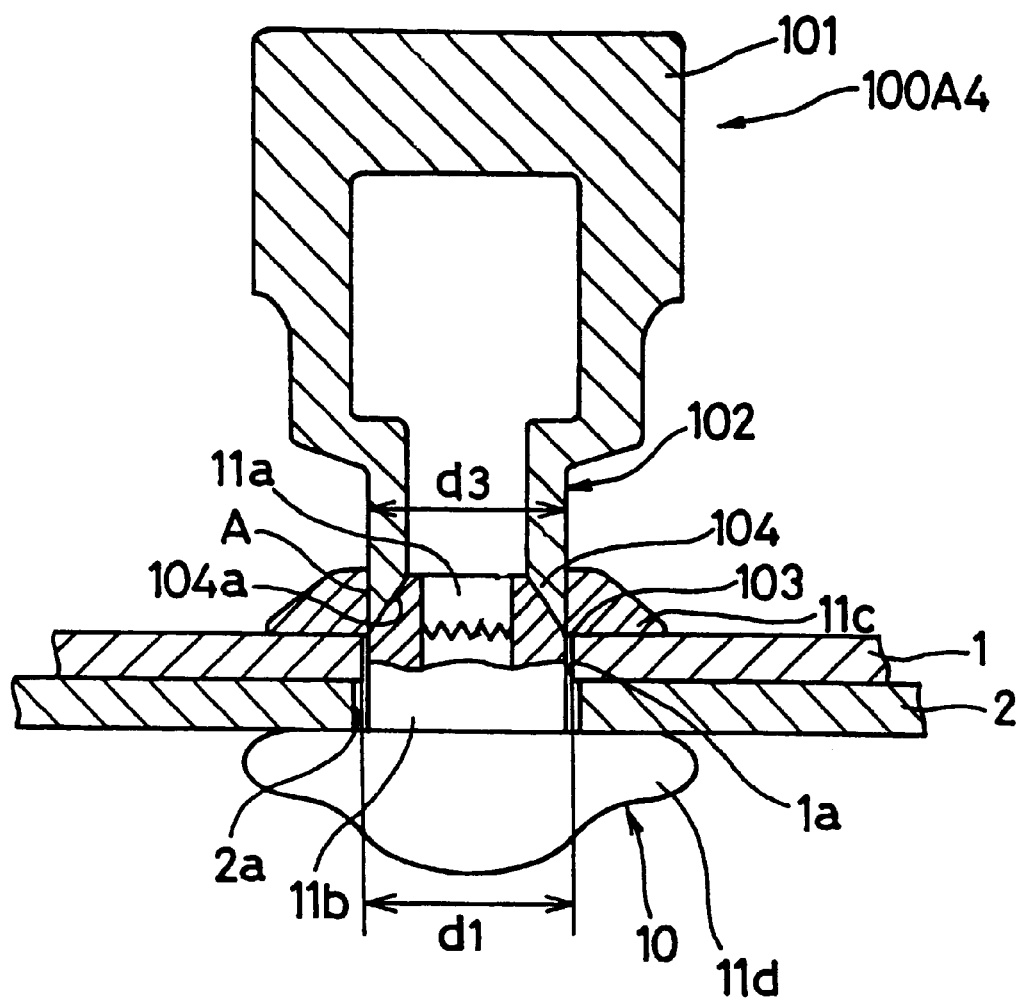
FIG. 11 is a cross-sectional view of a dismounting device in which an inner peripheral surface of a knife edge portion has a tapered surface according to a fourth embodiment of the present invention.

FIG. 11 shows a dismounting device 100A4, according to a fourth embodiment of the present invention, in which a tapered surface is provided in the inner peripheral surface of the knife edge portion 104 of the cutting blade 102. The outside diameter d3 of the cutting blade 102 is formed to be smaller than the diameter d1 of the fastening hole 1a of the base material (d1>d3). According to the dismounting device 100A4, the body 11b is deformed internally into a shape which does not become entangled with the cutting blade 102 and therefore, the body 11b can be removed easily from the cutting blade 102. If the dismounting device 100A4 is used, the pin 6 or the shaft 7, caulked to the base materials 1 and 2 by the pin fastening or the blind rivet 10 having the plate-like head 11c, respectively, can be dismounted.

Figure 12:
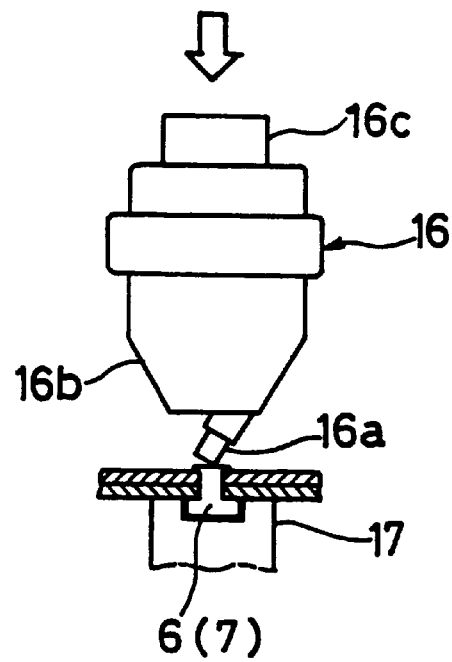
FIG. 12 is a front view for explaining a pin fastening technique using a caulking machine.

That is, the end of the pin 6 is, for example, as shown in FIG. 12, put through the base materials 1 and 2, supported on the caulking jig 17, and beaten by a punch 16a so as to be subjected to plastic deformation and thus, caulked to the base materials 1 and 2. The punch 16a is mounted on the pin head 16b of the caulking machine 16 and actuated by an air pressure piston 16c.

Figure 13:
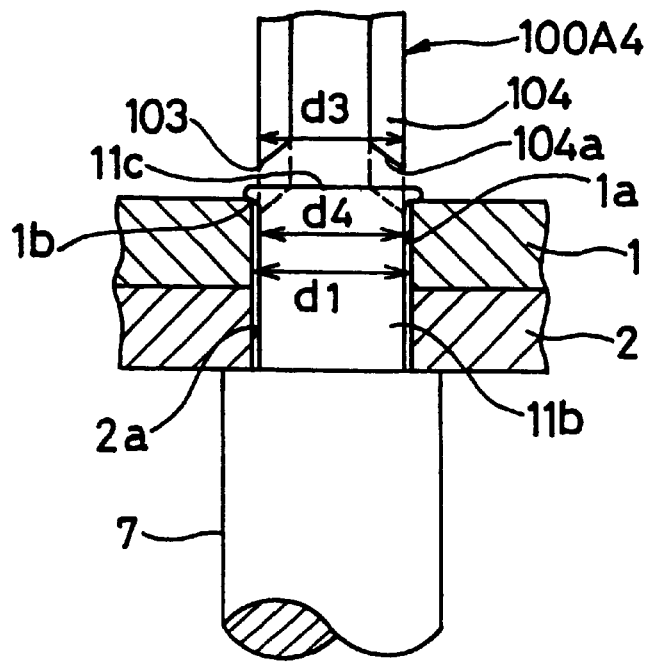
FIG. 13 is a partial cross-sectional view showing a state of cutting an shaft fastened to a base material by a pin fastening technique using the dismounting device shown in FIG. 11.

In the case of the pin fastening of this kind, for improving the fastening force of the pin 6 and the shaft 7 with respect to the base materials 1 and 2, or for lessening the projecting amount of the pin 6 and the head 11c, as the caulking portion of the shaft 7, from the base materials 1 and 2, a type of processing, such as chamfering, counterboring, etc., is applied to the edge 1b of the fastening hole 1a of the base material 1. FIG. 13 shows a state wherein the base materials 1 and 2 are fastened to each other via the shaft 7.

The caulking portion of the pin 6 or the shaft 7 is fastened to the base material 1 by biting into the fastening hole 1a of the base material 1, similarly to the case of the blind rivet 10 having the head 11c formed to be plate-like. In the case where the fastening member is any one of the pin 6, the shaft 7, or the blind rivet 10 with a plate-like head 11c, and the caulked portion of the fastening member bites into the fastening hole 1a of the base material 1, the fastening member may be dismounted using the dismounting devices 100A1 to 100A3 having the inclined surface 104a in the outer peripheral surface of the knife edge portion 104, and since the head 11c is deformed externally, the edge 1b of the fastening hole 1a of the base material 1 may possibly be damaged.

Figure 14:
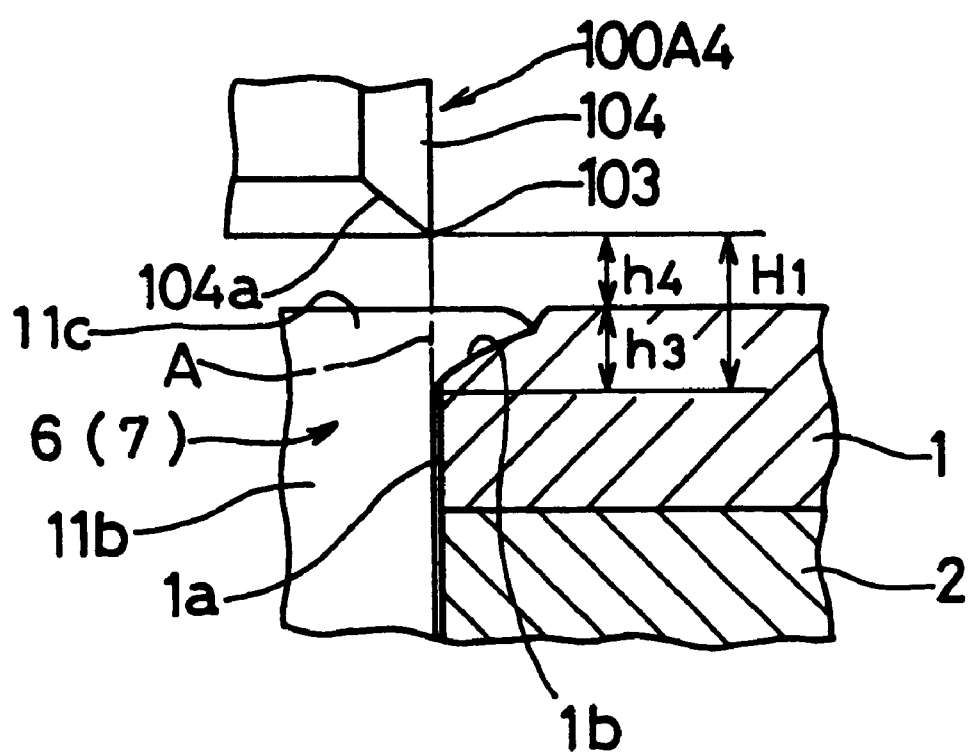
FIG. 14 is a cross-sectional view showing a positional relationship between an shaft fastened to a base material by a pin fastening technique and a knife edge portion of the dismounting device shown in FIG. 11.

On the other hand, in the case where the boundary region A of the pin 6 and the shaft 7 is of a shape in which the head 11c bites into the fastening hole 1a of the base material 1, or the boundary region A between the plate-like head 11c and the body 11b of the blind rivet 10 is dismounted using the dismounting device 100A4 having the tapered surface 104a in the inner peripheral surface of the knife edge portion 104 of the cutting blade 102, as shown in FIGS. 13 and 14, since the head 11c is prevented from being deformed externally by the presence of the tapered surface 104a, it is possible to prevent the edge 1b of the fastening hole 1a of the base material 1 from being damaged.

Preferably, the outside diameter d3 of the cutting blade 102 of the dismounting device 100A4 is smaller than the diameter d1 of the fastening hole 1a of the base material 1 and is larger than the outside diameter d4 of the body 11b of the shaft 7 or pin 6 (i.e., d1>d3≧d4), as shown in FIG. 13. Further, preferably, as shown in FIG. 14, the moving stroke H1, at the time of cutting using the cutting blade 102, is set to the sum of h3+h4, wherein h3 is the thickness of the portion of the head 11c being cut (i.e., the distance the knife edge 103 of the cutting blade 102 bites into the head 11c) and h4 is the parting distance from the surface of the portion of the head 11c being cut to the original point position of the knife edge 103 of the cutting blade 102 (i.e., h4 can equal zero).

Since when the boundary region A is cut, the knife edge 103 of the cutting blade 102 can be positioned between the fastening hole 1a of the base material 1 and the body 11b of the shaft 7 or pin 6 at the boundary region A between the body 11b and the head 11c, the load applied by the knife edge portion 104 when the boundary region A is cut can be reduced, and the head 11c can be separated from the body 11b without generating burrs.

Example 1

Dismounting Device Provided With a Cutting Blade Positioning Member

Figure 15:
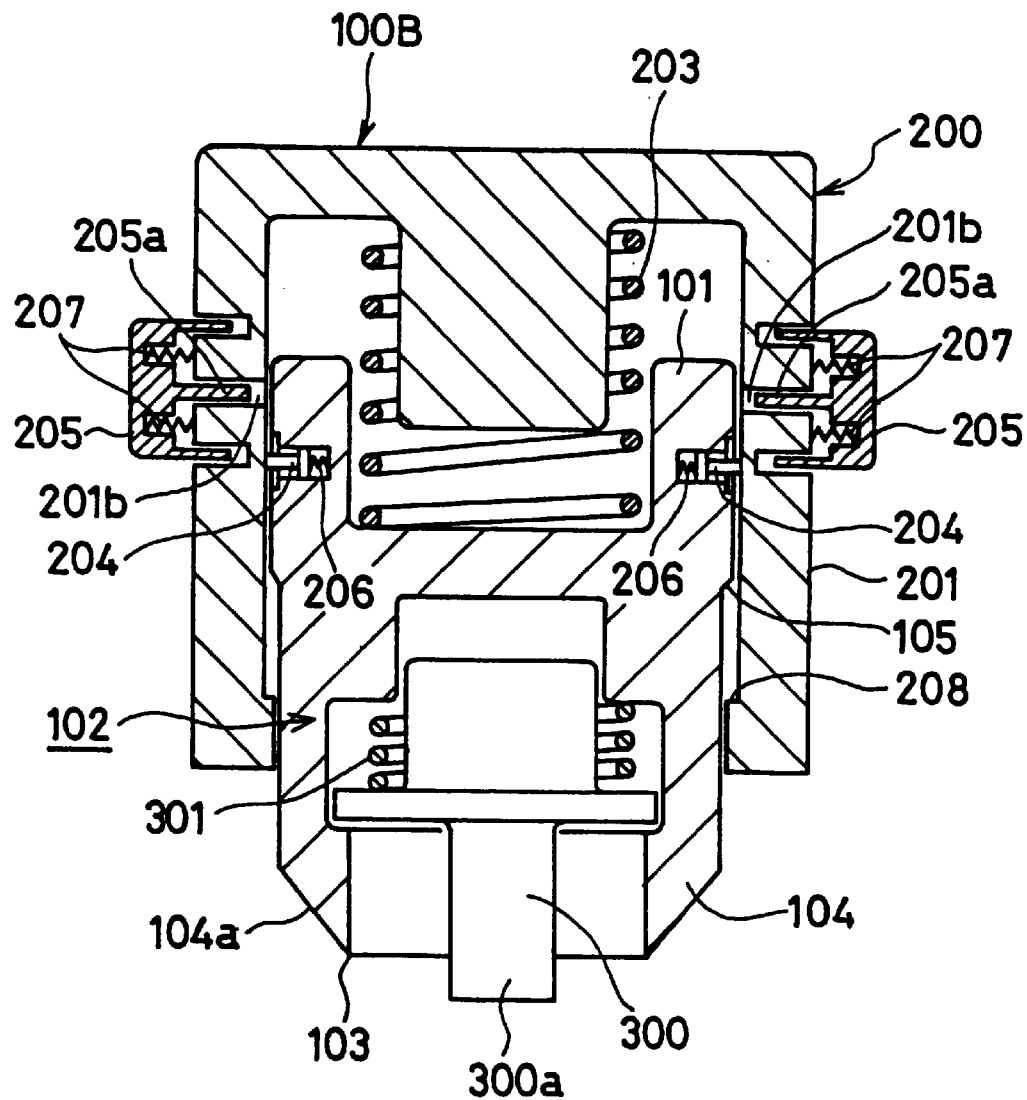
FIG. 15 is a cross-sectional view showing a schematic constitution of a dismounting device having a cutting force applying means according to a fifth embodiment of the present invention.

FIG. 15 shows a dismounting device 100B provided with a cutting blade positioning member 300, according to a fifth embodiment of the present invention. This embodiment is an improved article over the dismounting device 100A3, as shown in FIG. 7.

Figure 16:
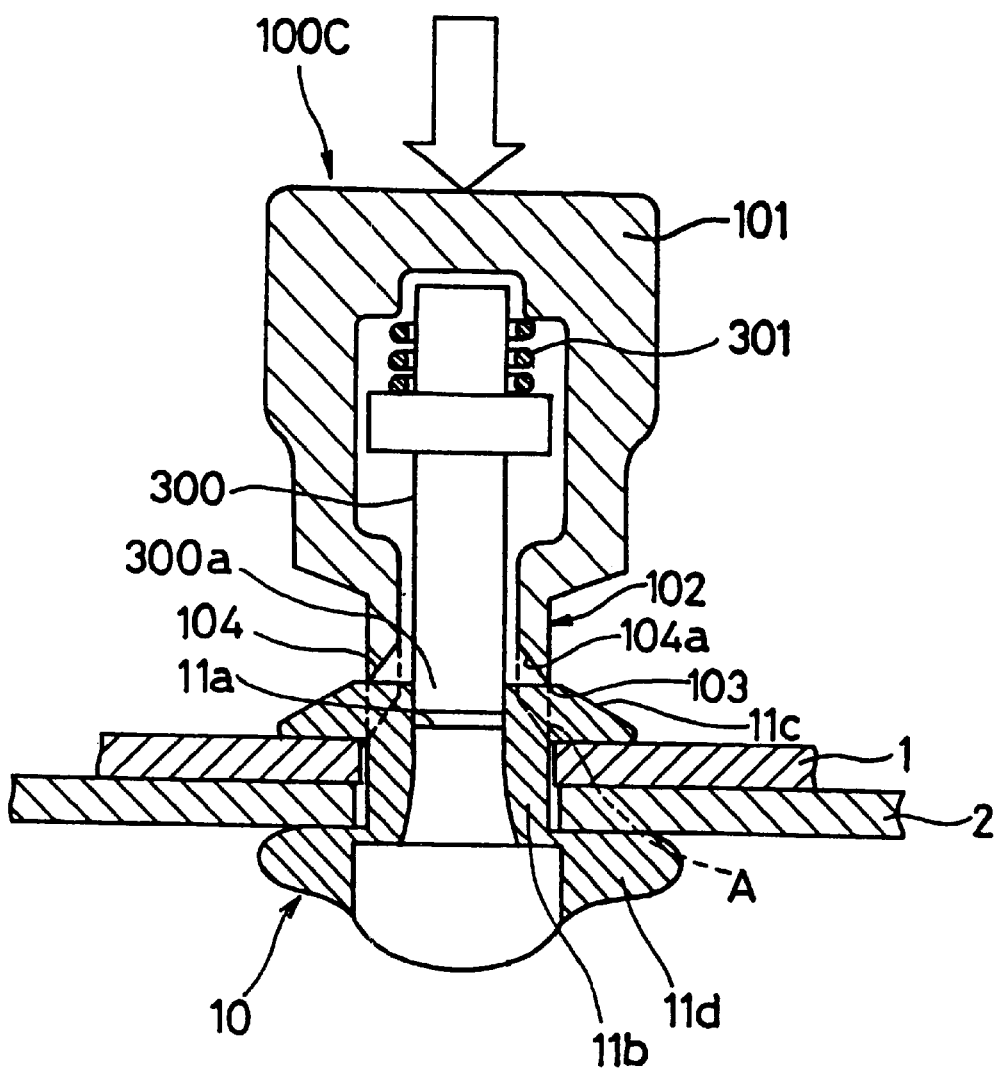
FIG. 16 is a schematic cross-sectional view showing a dismounting device having a cutting force applying means according to a sixth embodiment of the present invention.

FIG. 16 shows a dismounting device 100C provided with a cutting blade positioning member 300, according to a sixth embodiment of the present invention. This embodiment is an improved article over the dismounting device 100A4, as shown in FIG. 11. The cutting blade positioning member 300 performs a positioning of a cutting blade 102 when fitted into an axial hole 11a of the blind rivet 10 to cut the boundary region A. The cutting blade positioning member 300 is disposed in the center of the cutting blade 102 and is supported so as to be capable of being moved forward and backward in the axial direction of the axial hole 11a. A coil spring 301, for urging the cutting blade positioning member 300 in the projecting direction, is disposed between the cutting blade positioning member 300 and the cutting blade 102. An extreme end (fitting portion) 300a of the cutting blade positioning member 300 is normally projected from a knife edge portion 104 by the coil spring 301.

Since the positioning operation using the dismounting device 100B is the same as the positioning operation using the dismounting device 100C, only the positioning using the dismounting device 100C will be explained.

First, as shown in FIG. 16, the extreme end (fitting portion) 300a of the cutting blade positioning member 300 is fitted into the axial hole 11a so that the cutting position of the cutting blade 102 is positioned. The axial hole 11a serves as a cutting reference positioning portion. When the boundary region A of the blind rivet 10 is cut using the dismounting device 100C, it is possible to prevent the cutting position of the cutting blade 102 from being deviated. Therefore, the head 11c can be separated from the body 11c of the blind rivet 10 positively, and burrs are less often generated. Further, since the cutting blade positioning member 300 is capable of being moved forward and backward in the extending direction of the axial hole 11a with respect to the cutting blade 102, the movement of the cutting blade 102, in the cutting direction, is not impaired, and accordingly, the cutting of the boundary region A is done positively and easily.

In addition, since the cutting blade positioning member 300 is urged in the fitting direction of the axial hole 11a by the coil spring 301, the operation of fitting the cutting blade positioning member 300 in the axial hole 11a is also done easily. The coil spring 301 may be used to apply the shaft removing force to the cutting blade positioning member 300.

Example 2

Dismounting Device Provided With a Cutting Blade Positioning Member

Figure 17:
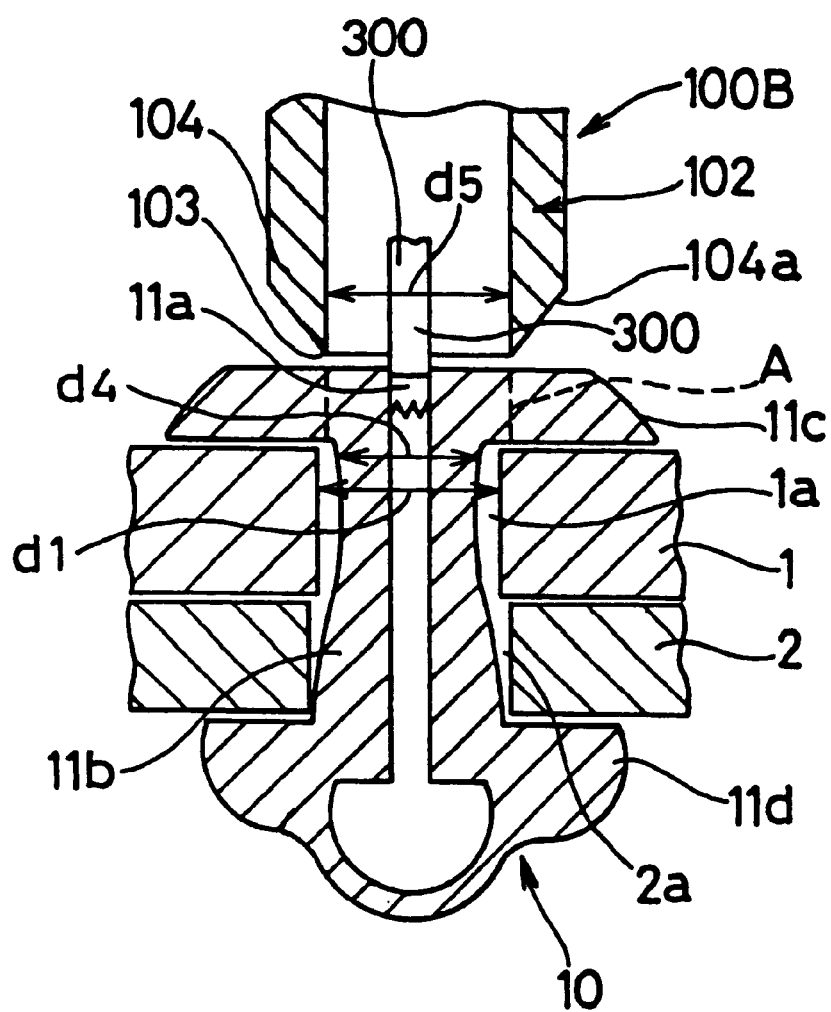
FIG. 17 is a cross-sectional view showing a dimensional relationship between a fastening member fastened to a base material and a dismounting device shown in FIG. 15.
Figure 18:
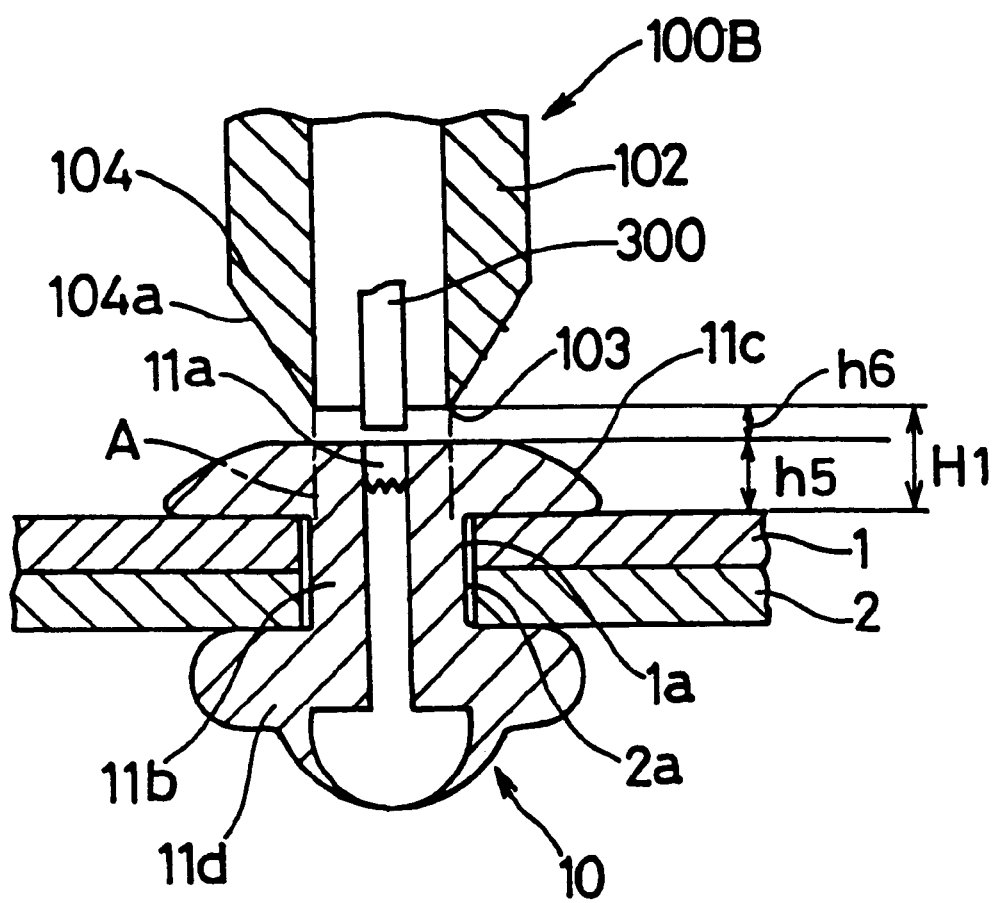
FIG. 18 is a cross-sectional view showing a height relationship between a fastening member fastened to a base material and a dismounting device shown in FIG. 15.

FIG. 17 shows a further improved article over the dismounting device 100B shown in FIG. 15. The outside diameter d5 of a knife edge 103 of the cutting blade 102 of the dismounting device 100B is formed to be smaller than the diameter d1 of the fastening hole 1a of the base material 1 and larger than the outside diameter d4 of the body 11b of the blind rivet 10 (i.e., d1>d5≧d4). Further, preferably, as shown in FIG. 18, the moving stroke H1, at the time of cutting by the dismounting device 100B, is set to the sum of h5+h6, wherein h5 is the thickness of the cutting portion of the head 11c (i.e., the distance the knife edge 103 of the cutting blade 102 bites into the head 11c) and h6 is the parting distance from the surface of the cutting portion to the original point position of the knife edge 103 thereof (i.e., h6 can be zero).

When the boundary region A is cut, the knife edge 103 of the cutting blade 102 can be positioned between the fastening hole 1a and the body 11b at the boundary region A between the body 11b and the head 11c, and the load, applied by the knife edge portion 104 when the boundary region A is cut, can be reduced. Thus, the head 11c can be separated from the body 11b without generating burrs.

Example of a Dismounting Device Provided With a Detachable Cutting Blade

Figure 19:
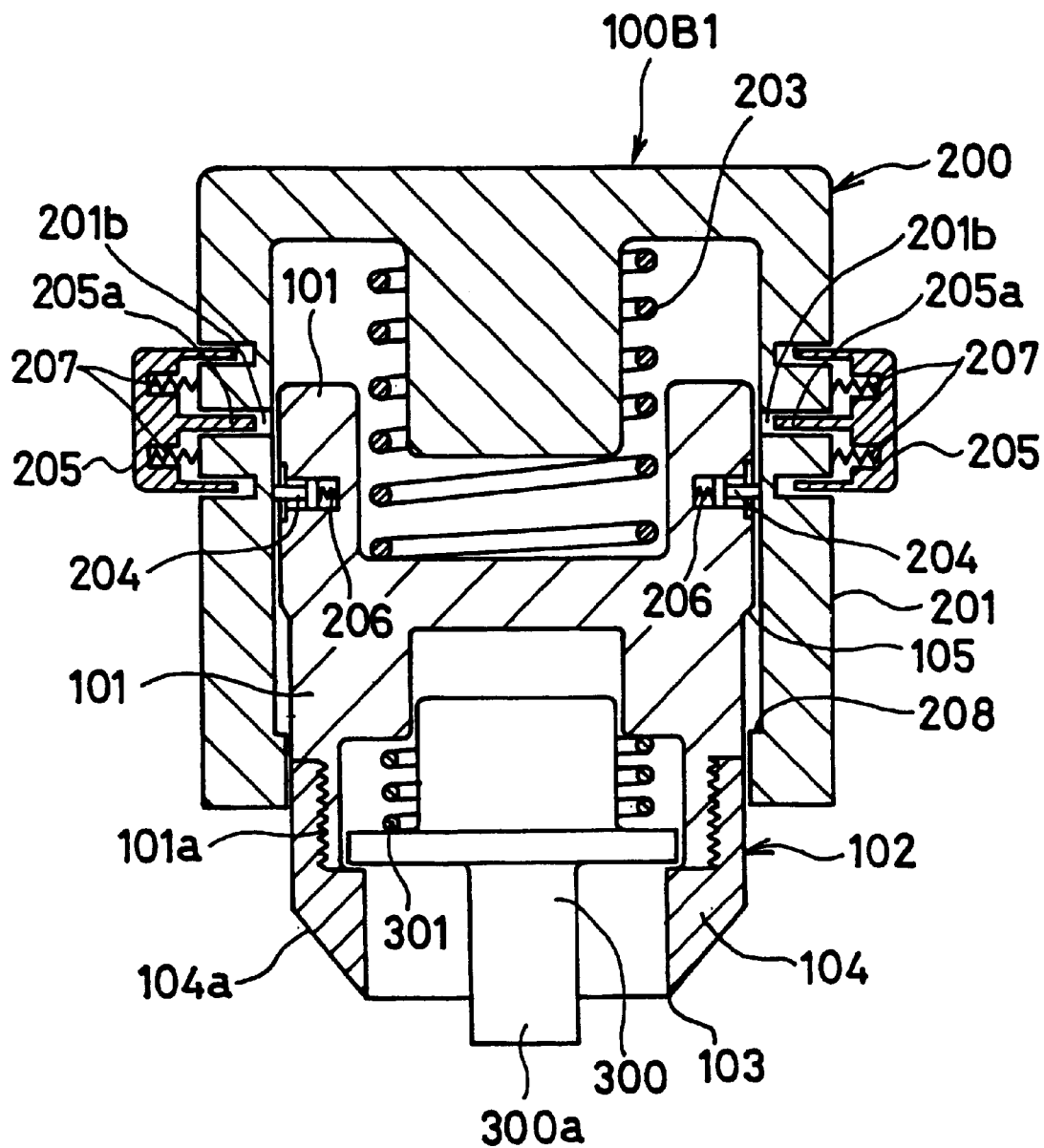
FIG. 19 is a schematic cross-sectional view showing the constitution of a dismounting device having a detachable cutting blade according to a seventh embodiment of the present invention.

FIG. 19 shows a dismounting device 100B1 provided with a detachable cutting blade 102, according to a seventh embodiment of the present invention. The dismounting device 100B1 is an improved article over the dismounting device 100B.

Figure 20:
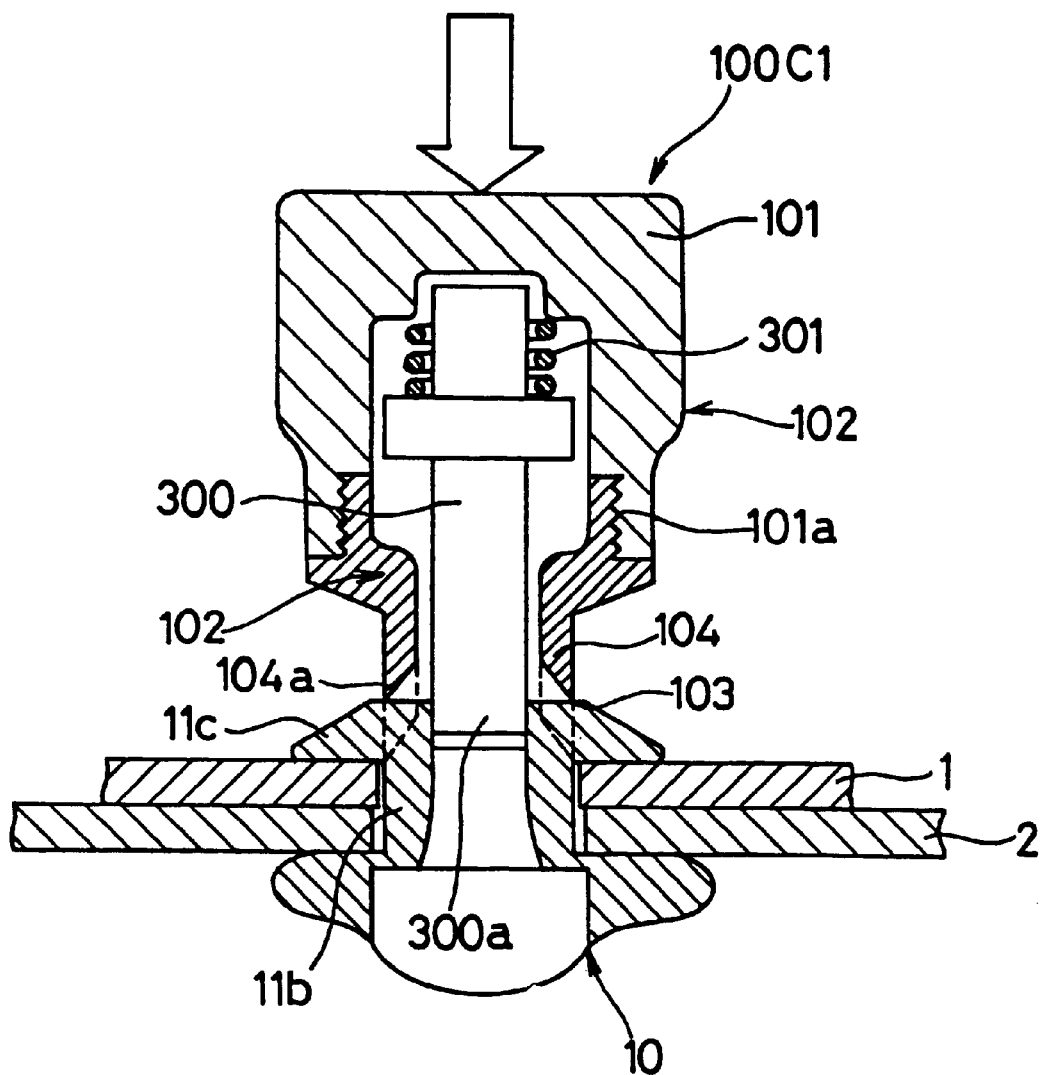
FIG. 20 is a schematic cross-sectional view showing the constitution of a dismounting device having a detachable cutting blade according to an eighth embodiment of the present invention.

FIG. 20 shows a dismounting device 100C1 provided with a detachable cutting blade 102, according to an eighth embodiment of the present invention. The dismounting device 100C1 is an improved article over the dismounting device 100C. In the dismounting device 100B1, shown in FIG. 19, threads 101a are formed in the outer peripheral portion of the dismounting device body 101. In addition, threads, which are engaged with the threads 101a, are formed in the inner peripheral portion of the cutting blade 102, and the cutting blade 102 is detachably threadingly fixed to the dismounting device body 101. In the dismounting device 100C1, shown in FIG. 20, threads 101a are formed in the inner peripheral portion of the dismounting device body 101, and threads, engaged with the threads 101a, are formed in the outer peripheral portion of the cutting blade 102. In the dismounting devices 100B1 and 100C1, the cutting blade 102 can be removed from the dismounting device 101 by turning the cutting blade 102 in the direction opposite to the direction of being threadingly engaged with the dismounting device body 101.

According to the dismounting devices 100B1 and 100C1, it is convenient that only the knife edge portion 104 of the cutting blade 102 which is suitable for the fastening member can be exchanged according to the dimension, shape, and size of the fastening member as the dismounting object, so that a number of dismounting devices, which are different in specifics, such as dimension, shape, and size of the fastening member, need not be prepared. Further, even when the knife edge 103 of the cutting blade 102 needs to be polished (or sharpened), only the knife edge portion 104 is removed from the dismounting device body 101 for polishing (or sharpening), thus facilitating the polishing (or sharpening) work.

In addition, even if the cutting direction dimension of the knife edge portion 104 is shortened because of the polishing (or sharpening) work, the knife edge 103 can always be positioned at a fixed position by adjusting the axial engaging position between the dismounting device body 101 and the cutting blade 102.

Example 1

Dismounting Device for Relieving the Shock When a Fastening Member is Dismounted When the boundary region A between the body and the head of the fastening member is dismounted, a shock is applied to the fastening member, and it is possible that the fastening parts around the fastening holes of the bases 1 and 2 may be deformed depending on the degree of the shock, and the thickness and the type of materials of the base materials 1 and 2.

In view of the foregoing, in the case of pin fastening, as shown in FIG. 12, when the pin 6 or shaft 7 is caulked to the base materials using the caulking machine 16, a caulking jig 17 for supporting the pin 6 or shaft 7 is used as a support member or carrying means at the time of cutting the boundary region A of the pin 6 or shaft 7, whereby the shock caused by the cutting of the boundary region A can be received by the support member to prevent the fastening part from being adversely affected by the shock applied to the base materials 1 and 2. Further, also in the case of rivet fastening using either a solid rivet 8 or a tubular rivet 9, the caulking jig can be used similar to the pin fastening. Therefore, the caulking jig can be used as the support member at the time of cutting the boundary region A to receive the shock at the time of cutting, and deformation of the fastening part of the base materials 1 and 2 can be avoided.

Figure 21:
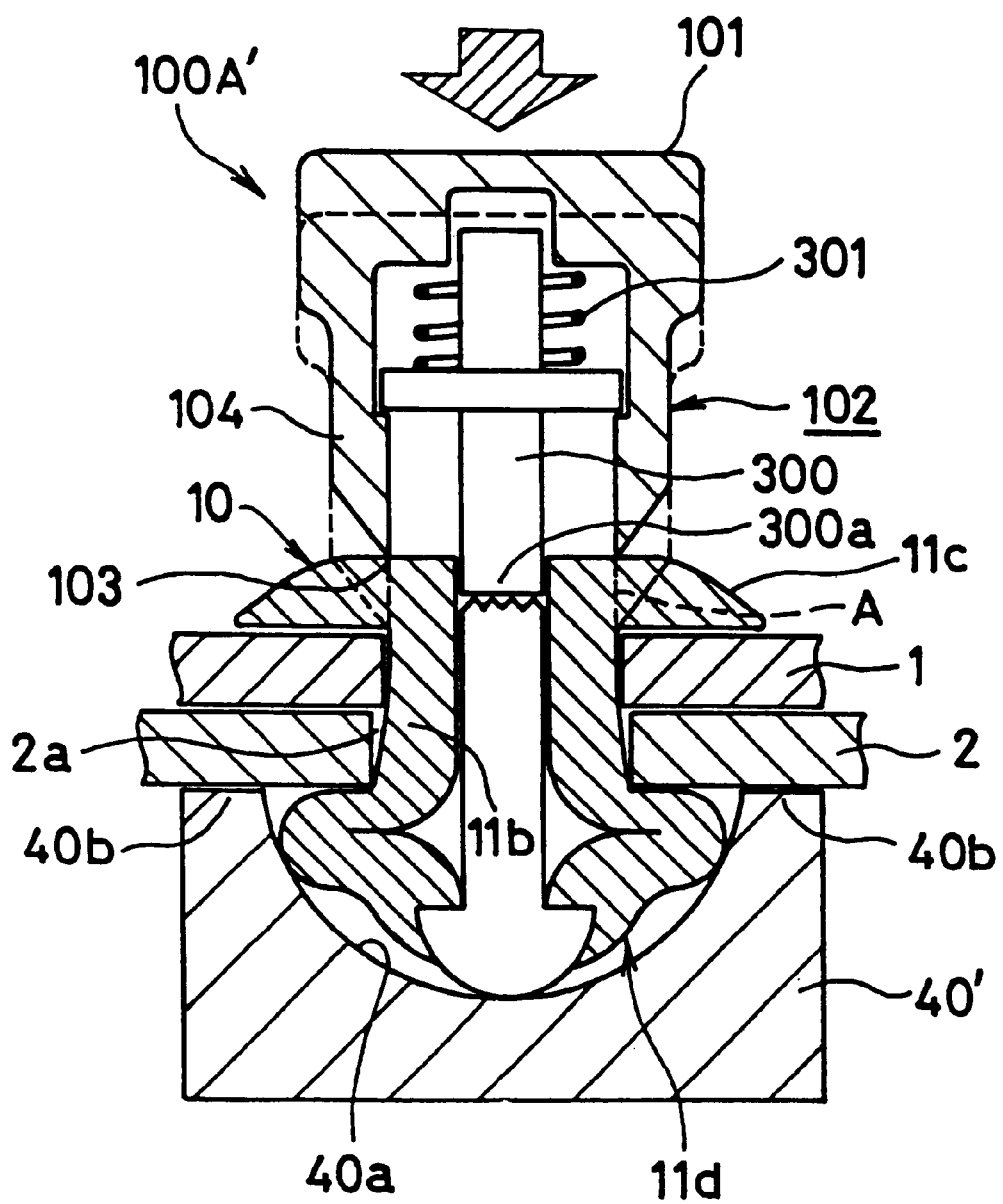
FIG. 21 is a cross-sectional view of a support member for carrying a caulking member of a fastening member when a boundary region of the fastening member is cut.

However, in the case of a fastening member, such as the blind rivet 10, wherein a support member, like the caulking jig, is not used at the time of fastening the fastening member to the base materials 1 and 2, there is the high possibility that the fastening part of the base materials 1 and 2 will be adversely affected by the shock at the time of cutting. So, preferably, a support member or carrying means 40', constituted as shown in FIG. 21, for supporting or carrying a fastening member, is used. By using the support member 40', it is possible to prevent the base materials 1 and 2 from being adversely affected at the time of cutting the boundary region A of the fastening member.

Figure 22:
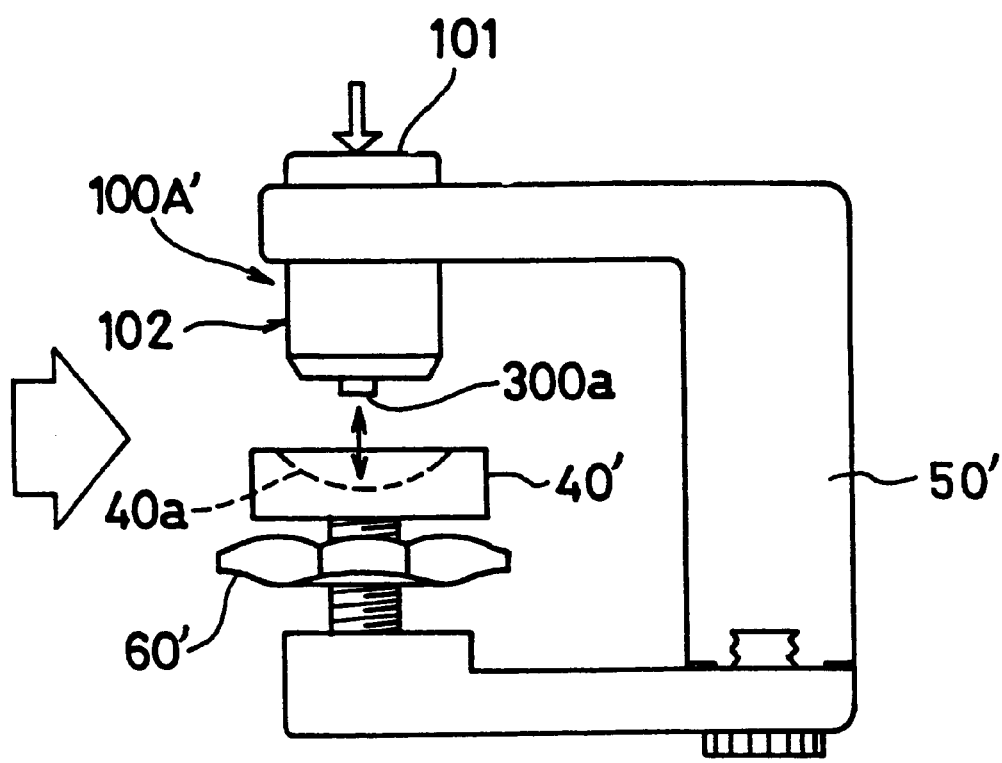
FIG. 22 is a side elevational view showing another constitution of the support member.

The support member 40', shown in FIG. 21, is disposed, for example, on a frame 50', shown in FIG. 22. A dismounting device 100A' is supported on the frame 50' so as to face upwardly with respect to the support member 40', and the support member 40' can be adjusted in height by a height adjusting screw 60'. When the height adjusting screw 60' is turned, the support member 40' can be moved away from and close to the cutting blade 102, so that the carrying height position of the fastening member, carried on the support member 40' relative to the cutting blade 102 of the fastening member, can be adjusted.

Preferably, the support member 40' is provided with a recess 40a. A caulking portion 17 of the body 11b of the blind rivet 10, for example, as shown in FIG. 21, is fitted to the recess 40a. In the case of using the support member 40' having the recess 40a, the caulking portion 11d of the blind rivet 10 is fitted in the recess 40a as shown, whereby when the boundary region A of the blind rivet 10 is cut, it is possible to prevent the blind rivet 10 from swinging and moving blindly, thus enabling further positive execution of the cutting of the boundary region A.

More preferably, the support member 40' is designed to have an adsorption or attracting portion 40b. In the case where the base material 2 comprises a magnetic body, such as an iron plate, the adsorption or attracting portion 40b is preferably formed from a magnetic body, such as a permanent magnet. By employment of the constitution in which the adsorption or attracting portion 40b is provided on the support member 40', since the base material 2 can be adsorbed or attracted to the support member 40' by means of the magnetic force, it is easy to set the base material 2 on the support member 40'. Further, by the adsorption or attraction of the base material 2 to the support member 40', when the boundary region A of the blind rivet 10 is cut, it is possible to prevent the swinging of the blind rivet 10 more positively, and cut the boundary region A more positively.

Example 2

Figure 23:
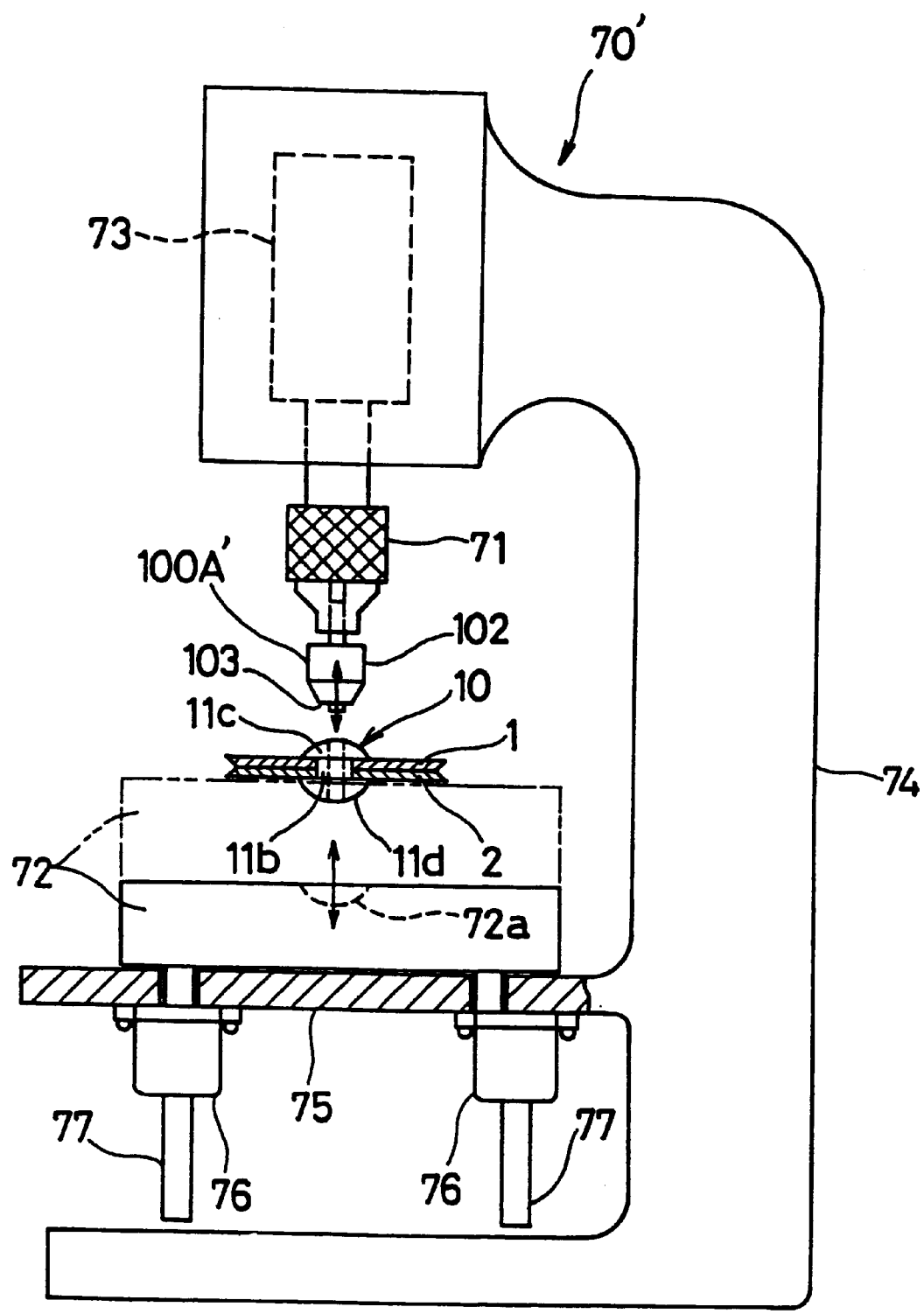
FIG. 23 is a side elevational view showing a fastening member dismounting construction using the dismounting device according to the present invention.

Dismounting Device for Relieving the Shock When a Fastening Member is Dismounted FIG. 23 shows a dismounting device construction provided with a dismounting device 100A' and a support member of a fastening member. A reference numeral 70' designates the dismounting device construction. The dismounting device construction 70' comprises a cutting blade holding member 71 for holding the cutting blade 102, a support member (i.e., a fastening member place bed) 72 for carrying the fastening member against the cutting force applied to the fastening member by the cutting blade 102, and a cutting force applying means 73 for applying the cutting force to the cutting blade 102 by vertically moving the cutting blade holding member 71. For the cutting force applying means 73, a hydraulic cylinder or an air cylinder is used. The cutting blade holding member 71, the support member 72, and the cutting force applying means 73 are secured to a body frame 74 of the dismounting device construction 70'. The blind rivet 10 is placed on the support member 72 as a fastening member for fastening the base materials 1 and 2.

Preferably, the cutting blade holding member 71 is formed from a chuck member for detachably replacing the cutting blade 102, for example, a collet chuck member. By using the chuck member, when the cutting blade 102 is replaced so as to adapt to the specification of the fastening member as the fastening object, the cutting blade 102 can be detachably operated easily.

The support member 72 is moved vertically by means of an air cylinder 76 disposed on the lower surface of a horizontal table 75 integral with the body frame 74 and a cylinder shaft 77 is moved forward and backward vertically by the air cylinder 76 so as to move away from and close to the cutting blade 102, respectively. By the vertical movement of the support member 72 as described above, it is possible to suitably adjust the height of the blind rivet 10 relative to the knife edge 103. A recess 72a is provided in the support member 72. The recess 72a is shaped to fit in the caulking portion 11d of the fastening member. The construction and function of the recess 72a are similar to those of the recess 40a of the support member 40', explanation of which is omitted.

In this arrangement, the cutting force applying means 73 is driven to move the cutting blade 102 vertically so that the cutting force is applied to the cutting blade 102. Thereby, the boundary region A of the blind rivet 10 is cut, the head 11c is separated from the body 11b of the blind rivet 10, and the blind rivet 10 is removed from the base materials 1 and 2.

Example 1

Dismounting Device Provided With a Positioning Member to the Base Material

Figure 24:
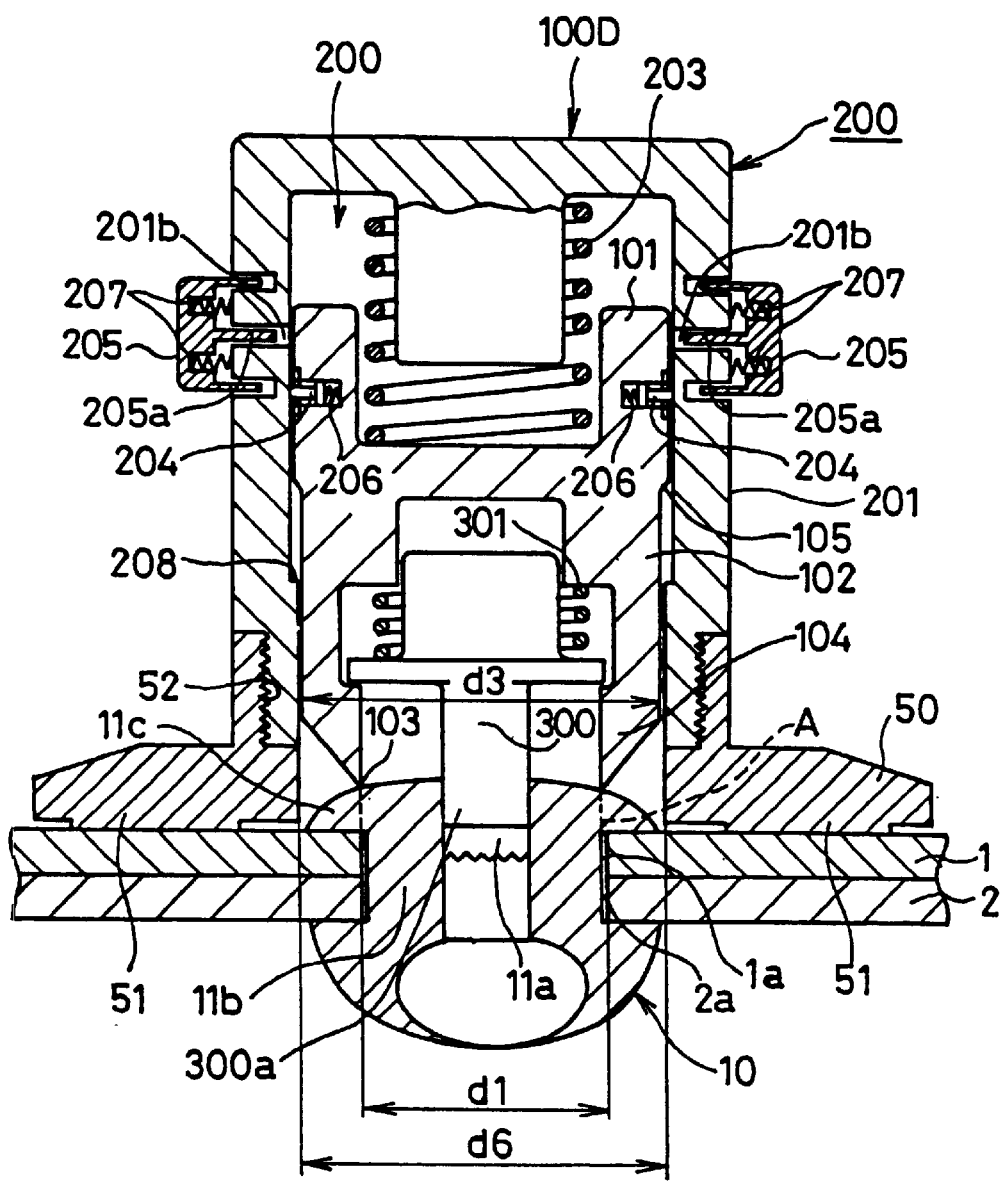
FIG. 24 is a cross-sectional view showing the constitution of a dismounting device having a positioning member for a base material according to a ninth embodiment of the present invention.

FIG. 24 is a cross-sectional view of a dismounting device 100D provided with a positioning member on the base material, according to a ninth embodiment of the present invention. The dismounting device 100D is an improved article over the dismounting device 100B. In FIG. 24, the constitutional elements of the dismounting device 100D are designated by the same reference numerals as those used in the dismounting device 100B.

In the dismounting device 100D, a cutting blade support 201 is provided with a contact member 50. The contact member 50 has a contact portion 51 in contact with the base material 1. The contact portion 51 is placed in contact with the base material 1 when the head 11c of the blind rivet 10 is cut. The inside diameter d6 of the contact member 50 is larger than at least the outside diameter d3 of the knife edge portion 104. In the case where the base material 1 is made from an iron plate, the contact portion 51 is preferably formed from a permanent magnet for attracting the base material 1. The contact portion 51 is constituted by burying a permanent magnet in the contact member 50, or mixing a magnetic powder in the material of the contact portion 51 so that the contact portion 51 functions as a permanent magnet.

According to the dismounting device 100D, when the body 11b and the head 11c of the blind rivet 10 are cut along the boundary region A between the body 11b and the head 11c of the blind rivet 10, the contact portion 51 is placed in contact with the base material 1 to hold a positional relationship between the cutting blade support 201 and the base material 1 (i.e., a positional relationship between the base material 1 and the cutting blade 102).

Accordingly, it is possible to prevent the position of the cutting blade support 201 from deviating due to the reaction of the cutting force applied to the cutting blade 102, depending on the way the operator holds the cutting blade support 201, at the time of cutting, which changes the moving stroke of the cutting blade 102. It is also possible to prevent the center of the cutting blade 102 from deviating, or the moving direction of the cutting blade 102 from being inclined with respect to the axial direction of the fastening hole 1a of base material 1.

Moreover, when the dismounting device 100D is used, the blind rivet 10 fastened to the base materials 1 and 2 can be removed from the base materials 1 and 2 smoothly and positively by one operation without damaging the base materials 1 and 2.

When the attractive force was applied to the contact portion 51, the close-contact force between the base material 1 and the contact portion 51 is increased, whereby the positional accuracy between the cutting blade support 201 and the base material 1 is improved at the time of cutting. Further, since the contact portion 51 can be placed in close contact with the base material 1 without strongly pressing the cutting blade support 201 against the base material 1 by an operator at the time of cutting, the burden imposed on the operator at the time cutting can be reduced. Preferably, the contact portion 51 has the force necessary to maintain the close-contact state between the contact portion 51 and the base material 1 against the reaction of the cutting force applied to the cutting blade 102. By doing so, when the reaction of the cutting force is applied, at the time of cutting, to the boundary region A of the blind rivet 10, the dismounting device 100D can be maintained in close contact with the base material 1 by the magnetic force of the contact portion 51, even if the operator does not grip the cutting blade support 201, thus drastically reducing the burden on the operator.

Here, the threads 52 are formed in the outer peripheral portion of the contact member 50, and the threads, which engage with the threads 52, are formed in the inner peripheral portion of the cutting blade support 201. By constituting the cutting blade support 201 and the contact member 50 as described above, a contact member 50 can be detachably replaced with the cutting blade support 201. For example, the contact member 50 is replaced according to the dimension of the fastening member as the dismounting object, whereby the moving stroke of the cutting blade 102 can be changed so as to adjust to the dimension of the fastening member, and accordingly, a number of exclusive-use dismounting devices, which are different in the moving stroke of the cutting blade 102, need not be prepared for every different dimension of the fastening member.

Further, by adjusting the engaging position between the contact member 50 and the cutting blade support 201, the positional relationship of the contact member 50, with respect to the cutting direction of the cutting blade 102, can be adjusted. By doing so, even if the dimension of the knife edge portion 104 in the cutting direction is changed by polishing the knife edge 103 of the cutting blade 102, the contact portion 51 is moved forward and backward in the cutting direction with respect to the cutting blade support 201, whereby the position of the knife edge 103 can be adjusted so that the knife edge 103 of the cutting blade 102 always faces the base material 1 at a fixed position. Further, the moving stroke of the cutting blade 102 can be changed so as to adjust to the dimension of the fastening member, depending upon the dimension of the fastening member as the object to be dismounted, without replacing the contact member 50.

Example 2

Dismounting Device Provided With a Positioning Member to the Base Material

Figure 25:
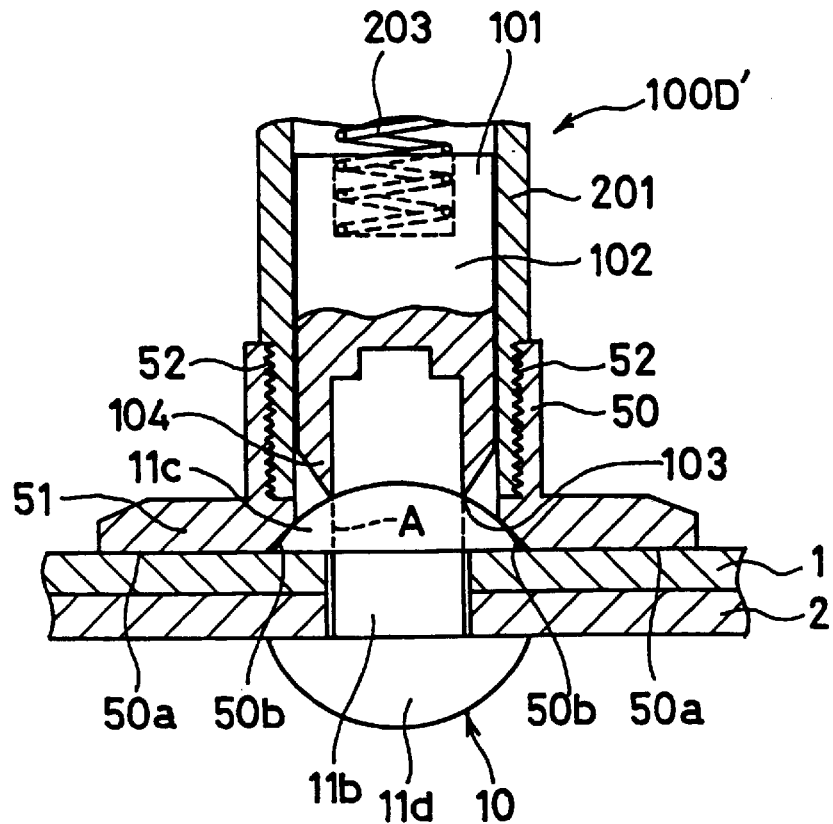
FIG. 25 is a cross-sectional view showing the constitution of a dismounting device having a positioning member for a base material according to a tenth embodiment of the present invention.

FIG. 25 is a partial cross-sectional view of a dismounting device 100D' having a positioning member provided on the base material, according to a tenth embodiment of the present invention. The dismounting device 100D' is an variation of the dismounting device 100D. Although the dismounting device 100D' is shown as not including a cutting blade positioning member 300, a cutting blade positioning member 300 may be provided.

In FIG. 25, the contact portion 51 of the contact member 50 has a contact surface 50a, which is in contact with the base material 1, and a contact surface 50b, which is in contact with the head 11c. According to the dismounting device 100D', for example, even in the case where there is some "play" between the base materials 1, 2 and the blind rivet 10 due to inadequate fastening or similar, the contact surface 50a can hold down the base material 1 and the contact surface 50b can hold down the head 11c to lock the positional relationship between the base materials 1, 2 and the head 11c at the time of cutting, and therefore, it is possible to cut the boundary region A of the blind rivet 10 smoothly and quickly. Also when the cutting blade 102 is returned to its original position after the head 11c has been cut using the cutting blade 102, since the head 11c is held down by the contact surface 50b, it is possible to prevent the cut head 11c from becoming entangled with the cutting blade 102, thus improving the efficiency of the cutting.

Figure 26:
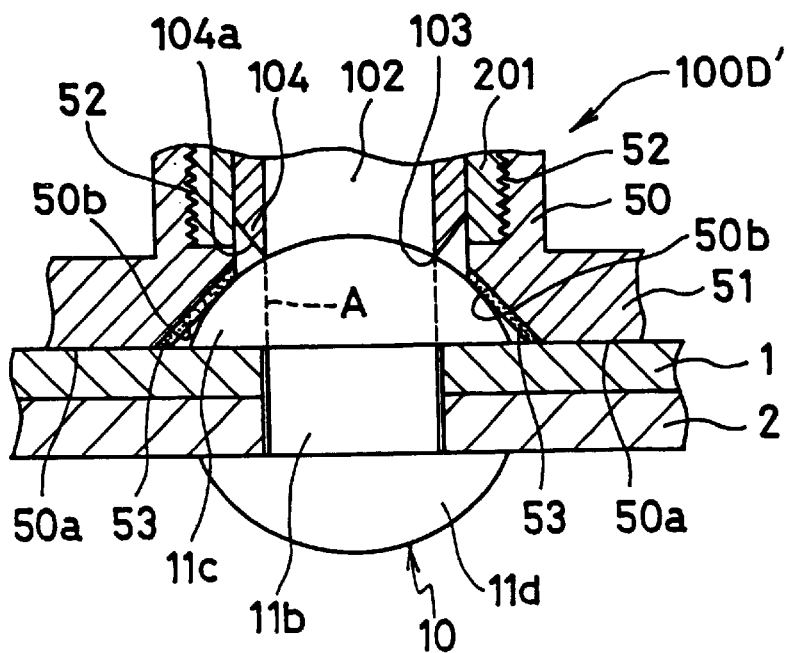
FIG. 26 is a cross-sectional view showing a first modification of the dismounting device shown in FIG. 25.

FIG. 26 shows a first modification of an improvement over the dismounting device 100D' having a positioning member provided on the base material. In the dismounting device 100D' shown in FIG. 26, the contact surface 50b is provided with an elastic member 53, such as sponge or rubber. By the provision of the elastic member 53, the contact between the contact surface 50b and the head 11c is improved, and at the time of cutting, a deviation in the position of the head 11c with respect to the cutting blade 102 is overcome more positively.

Preferably, the contact surface 50b has a tapered surface shape in contact with the outer peripheral portion of the head 11c. When the contact surface 50b in the tapered surface shape is used, the contact surface 50b comes in contact with an outer peripheral portion of the head 11c to hold the head 11c at the time of cutting, and it is therefore possible to prevent a positional deviation of the cutting blade support 201 in a direction perpendicular to the cutting direction with respect to the head 11c to cut the boundary region A between the body 11b and the head 11c positively and accurately.

Figure 27:
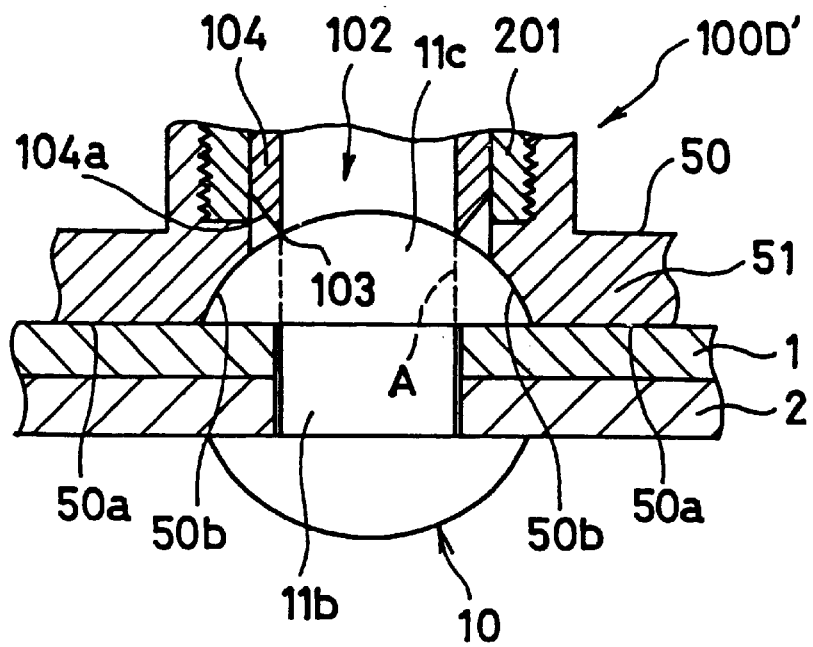
FIG. 27 is a cross-sectional view showing a second modification of the dismounting device shown in FIG. 25.

FIG. 27 shows a second modification of an improvement over the dismounting device 100D' having a positioning member provided on the base material. In the dismounting device 100D' shown in FIG. 27, the contact surface 50b presents a recessed shape, which is substantially placed in close contact with and fitted in an outer peripheral portion of the head 11c. When the contact surface 50b has a recessed shape, which is substantially placed in close contact with and fitted in the outer peripheral portion of the head 11c, as described above, the contact surface 50b is placed in close contact with and fitted in the outer peripheral portion of the head 11c at the time of cutting, to overcome more positively, a positional deviation of the cutting blade support 201 in a direction perpendicular to the cutting direction with respect to the head 11c, thus enabling positive and accurate cutting of the boundary region A.

Figure 28:
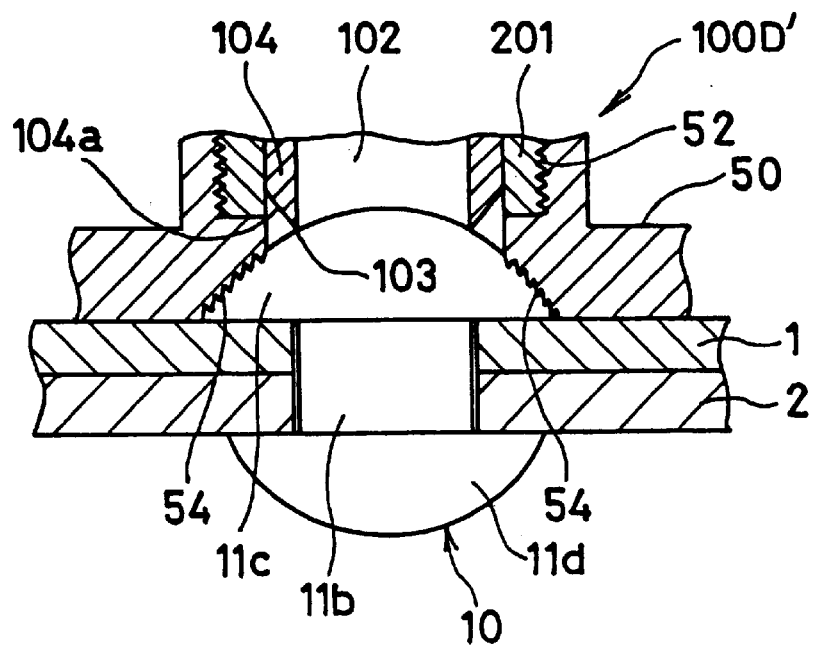
FIG. 28 is a cross-sectional view showing a third modification of the dismounting device shown in FIG. 25.

FIG. 28 shows a third modification of an improvement over the dismounting device 100D' having a positioning member provided on the base material. In the dismounting device 100D' shown in FIG. 28, the contact surface 50b is provided with a holding member (i.e., a biting projection) 54, which bites into the head 11c to hold the head 11c. In this arrangement, similarly to an above-described embodiment, even in the case where there is a play between the base materials 1, 2 and the blind rivet 10 due to the inadequate fastening, the head 11c can be held by the holding member 54. Accordingly, the cutting of the boundary region A of the blind rivet 10 can be carried out smoothly and quickly. Further, even when the cutting blade 102 returns to its original position after the head 11c has been cut by the cutting blade 102, since the head 11c is held down by the holding member 54, the portions cut from the head 11c can be prevented form becoming entangled with the cutting blade 102.

Example

Dismounting Device for Gripping a Fastening Member

Figure 33:
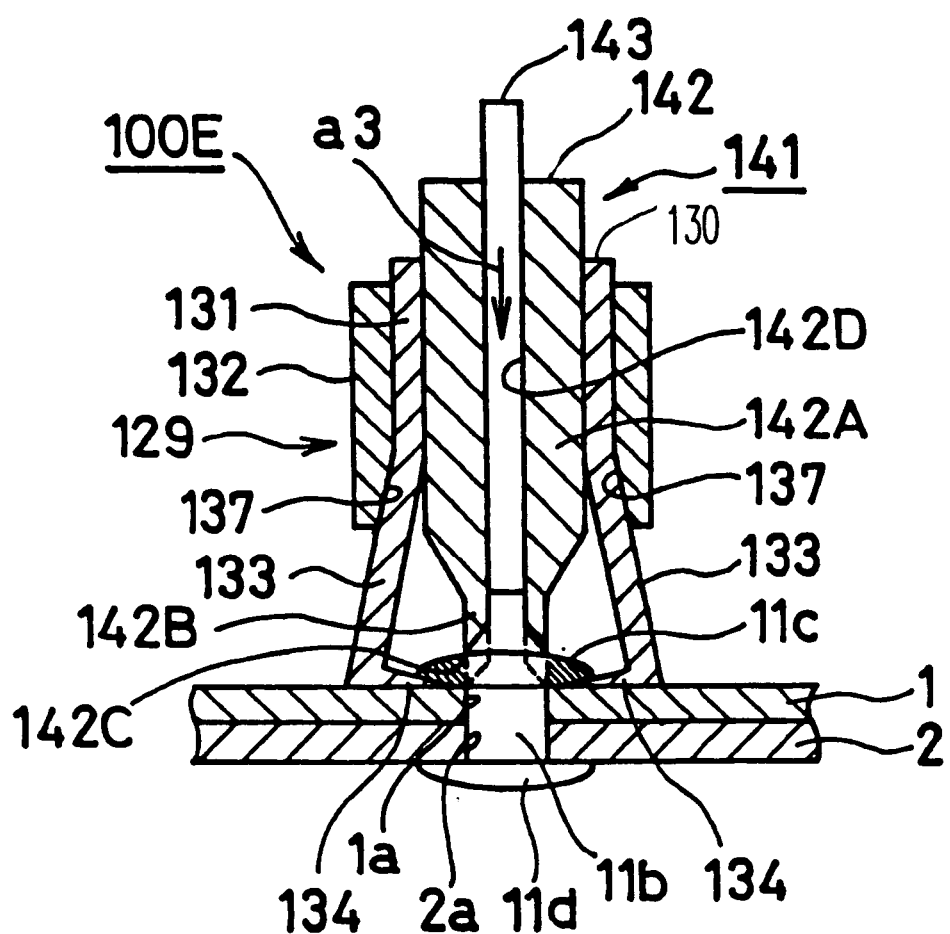
FIG. 33 is a cross-sectional view of a dismounting device having the gripping unit shown in FIG. 29.

FIG. 33 shows a cross-sectional view of a dismounting device 100E for gripping a fastening member. The dismounting device 100E can be applied to a fastening member used for a pin fastening technique, such as spin caulking, rivet fastening, burring caulking, etc. However, a solid rivet 8 will be described here as the object to be dismounted for the sake of convenience.

Figure 29:
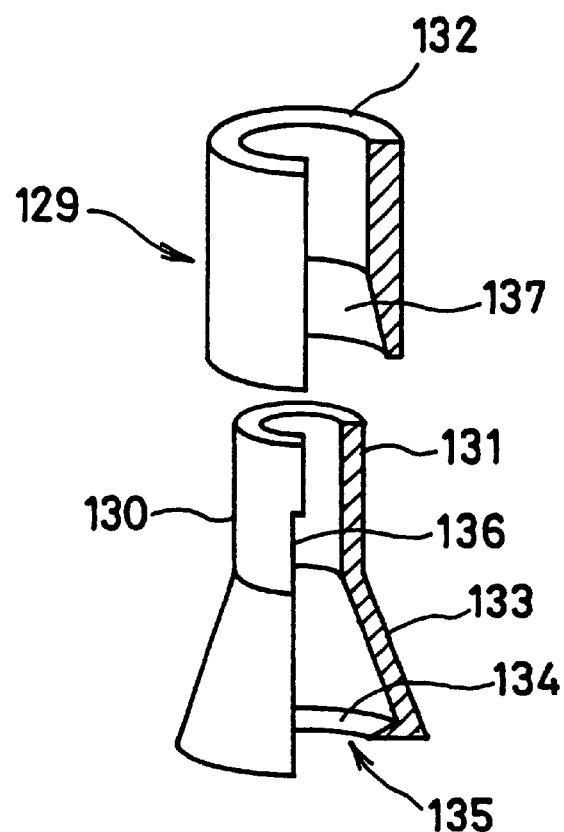
FIG. 29 is an exploded perspective view of a gripping unit constituting a dismounting device according to an eleventh embodiment of the present invention shown in FIG. 33.

The dismounting device 100E comprises a gripping unit 129 and a cutting blade unit 141. The gripping unit 129 comprises a holder 130 for gripping the head 11c, and a fastening member 132 for fastening the holder 130, as shown in FIG. 29, which is a so-called collet chuck construction.

The holder 130 has a cylindrical portion 131 and a tapered portion 133. The tapered portion 133 has a chuck pawl 134 at a lower portion thereof, and the chuck pawl 134 is concentric with the cylindrical portion 131 and gradually inclined internally in the radial direction. An extreme end 135 of the chuck pawl 134 is sharp.

Figure 30:
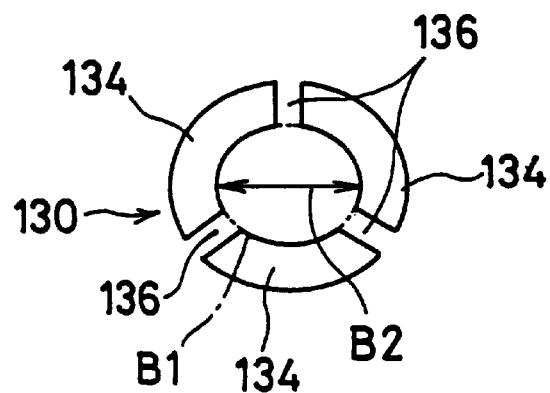
FIG. 30 is a plan view of a holder for a gripping unit, shown in FIG. 29, as viewed from the bottom.

As shown in FIG. 30, the holder 130 is formed with a cut groove 136 for causing the tapered portion 133 to be elastically deformable so as to move the chuck pawl 134 in the direction of the tapered portion 133 so that the tapered portion 133 and chuck pawl are close to each other. The fastening member 132 is formed from a fitting tube fitted over the cylindrical portion 131, and the fitting tube is formed in its inner peripheral surface with a tapered portion 137 corresponding to the tapered portion 133.

Figure 31:
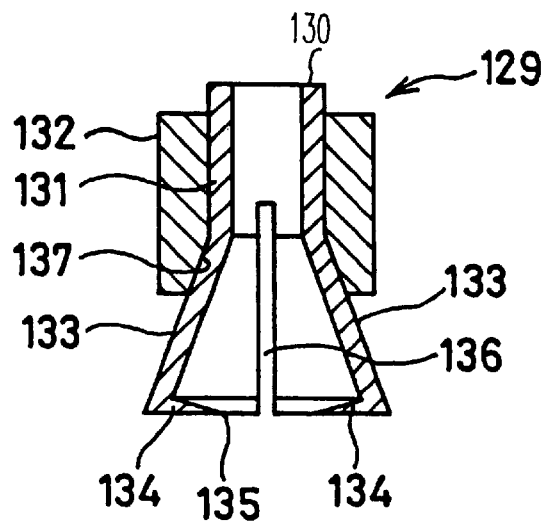
FIG. 31 is a cross-sectional view showing a state of mounting the holder for a gripping unit, shown in FIG. 29, to a fastening member.

FIG. 31 shows the state of having the fastening member 132 fitted on the holder 130. When the fastening member 132 is pressed down, the tapered portion 133 is elastically deformed so as to become reduced in diameter so as to fasten the chuck pawl 134 using the tapered portion 137, as shown in FIGS. 32(a) and (b), so that a diameter B2 of an imaginary circle B1, formed by the extreme end 135 of the chuck pawl 134, is reduced.

Figure 32A:
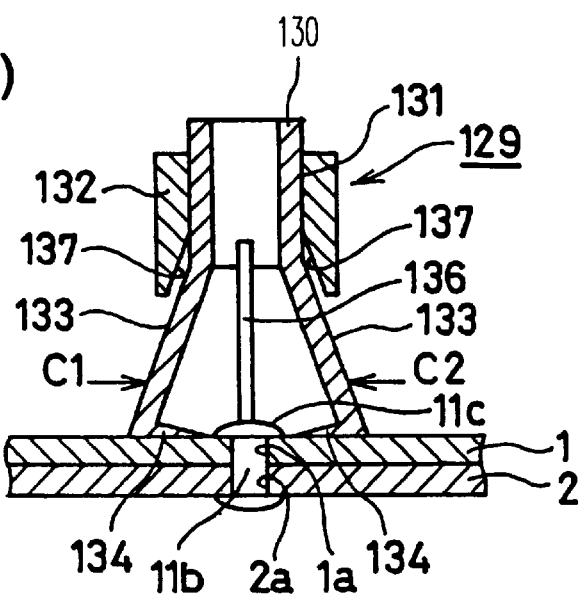
Figure 32B:
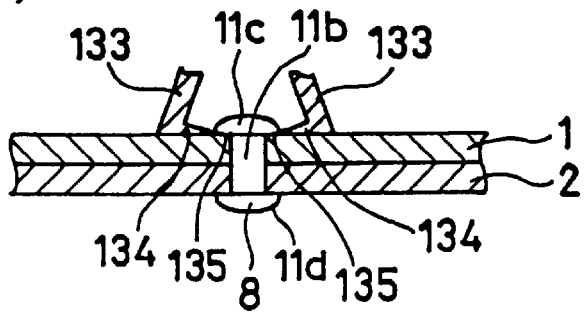

More particularly, FIG. 32(a) shows the state immediately before the gripping unit 129 is placed in engagement with the head 11c of the solid rivet 8. When the fastening member 132 is pressed down, the forces in the directions of arrows C1 and C2 are applied to the tapered portion 133 so that the chuck pawl 134 moves in between the head 11c and the base material 1, as shown in FIG. 32(a), and the gripping unit 129 is placed in engagement with the head 11c, as shown in FIG. 32(b), so that the gripping unit 129 is locked onto the solid rivet 8 and the base material 1. Thereby, the central axis of the holder 130 coincides with the diametrically central part of the body 11b. This gripping unit 129 also serves as the cutting blade support.

As shown in FIG. 33, the cutting blade unit 141 comprises a cylindrical or columnar dismounting device body 142, a cylindrical cutting blade 142A, which is continuous to the device body 142 and integral therewith, and an extending member 143. The cutting blade 142A has a knife edge portion 142B at the extreme end thereof. The knife edge portion 142B is inclined from the extreme end thereof, and the knife edge portion 142B is provided at the extreme end thereof with a knife edge 142C smaller in diameter than inside diameters d1 and d2 of the fastening holes 1a and 2a of the base materials 1 and 2, respectively. The knife edge portion 142B presents a substantially cylindrical shape, along the boundary region A in the axial direction of the body 11b and the head 11c of the solid rivet 8, which is substantially parallel to the inner peripheral surface of the fastening holes 1a and 2a of the base materials 1 and 2, respectively. The dismounting device 100E is formed with an insert hole 142D extending axially thereof. The extending member 143 is inserted into the insert hole 142D The cutting blade unit 141 is disposed on the cylindrical portion 131 of the holder 130 so as to be capable of being moved forward and backward in the axial direction thereof. The cutting blade unit 141 is either driven manually or by an air cylinder or a hydraulic cylinder. The extending member 143 can be moved forward and backward vertically with respect to the cutting blade unit 141. It is also contemplated that means for pressing down the fastening member 132 has threads provided in the outer peripheral portion of the cylindrical portion 131 and in the inner peripheral portion of the fastening member 132 so that the holder 130 can be rotated with respect to the fastening member 132 and moved forward and backward in the axial direction.

The operation of the dismounting device 100E will be explained hereinafter. It is assumed that the extreme end 135 of the chuck pawl 134 of the gripping unit 129 is moved into a position between the head 11c and the base material 1 and then engaged. Thus, the diametrically central part of the head 11c, the central axis of the gripping unit 129, and the central axis of the cutting blade unit 141, all coincide with each other so that the gripping unit 129 is locked. When the cutting blade 142A of the cutting blade unit 141 is moved in the direction of arrow a3 by the air cylinder as the cutting force applying means (not shown), the body 11b and the head 11c are separated along the boundary region A. After the boundary region A is cut, the cutting blade unit 141 is returned to its original position by the air cylinder.

Since at the time that the cutting is being performed, the diametrically central part of the body 11b coincides with the central axis of the cutting blade unit 141, the boundary region A can be cut accurately by the cutting blade 142A. Further, since the chuck pawl 134 of the gripping unit 129 engages the head 11c, the shock at the time that the cutting is being performed (i.e., reaction when the cutting blade 142A collides with the head 11c) can be absorbed by both the gripping unit 129 and the cutting blade unit 141 to prevent the shock from being applied to the base materials 1 and 2 so that the base materials 1 and 2 do not become damaged.

In this dismounting device 100E, it is possible that when the body 11b and the head 11c are separated, the body 11b remains pressed against the fastening holes 1a and 2a of the base materials 1 and 2, respectively. Therefore, the extending member 143, as the pressing force applying means, is driven in the direction of arrow a3 by the air cylinder for forcibly removing the body portion 11b from the fastening holes 1a and 2a of the base materials 1 and 2, respectively. Thereby, the body 11b, remaining in the fastening holes 1a and 2a of the base materials 1 and 2, respectively, can be removed from the fastening holes 1a and 2a. The extending member 143 is returned to its original position after removal of the body 11b. Thereby, the solid rivet 8 can be removed from the base materials 1 and 2 to separate the base materials 1 and 2 from being fastened to each other.

Method 1

Figure 34A:
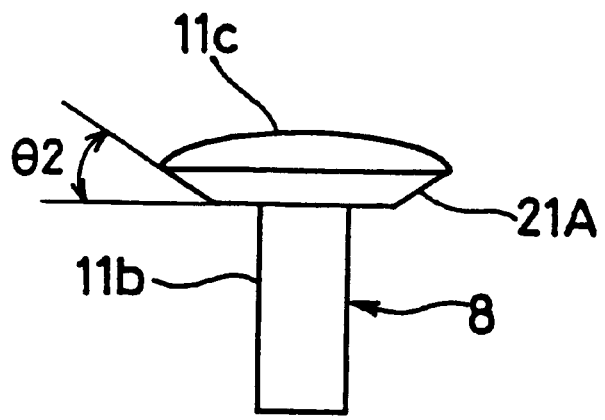
Figure 35:
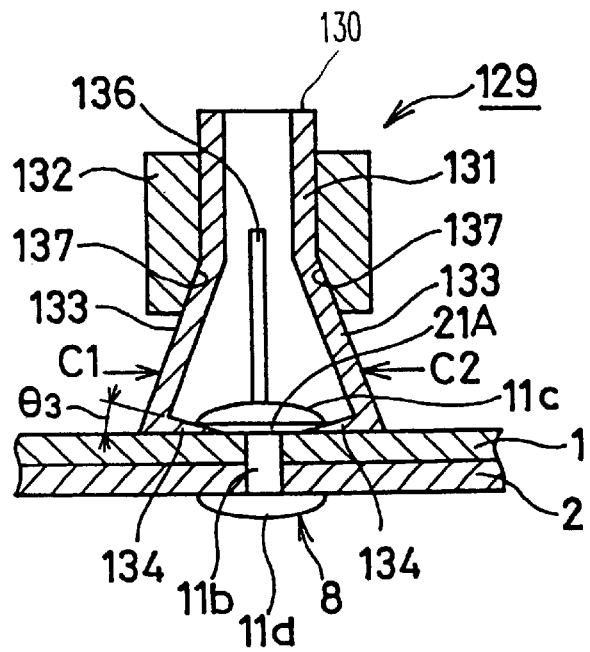
FIG. 35 is a cross-sectional view showing a state of gripping the body of the fastening member shown in FIG. 34(a) by the gripping unit shown in FIG. 31.
Figure 36:
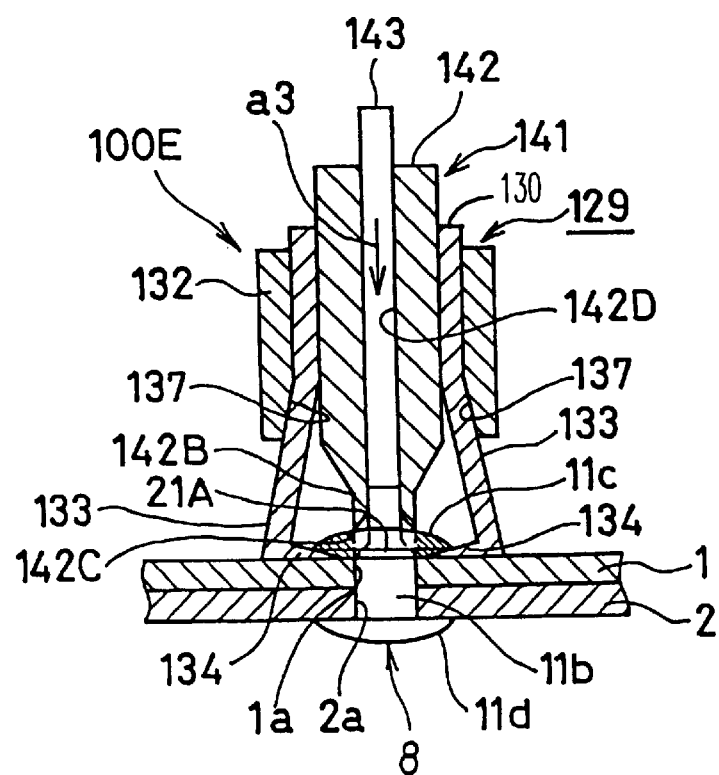
FIG. 36 is a cross-sectional view showing a state of dismounting the fastening member shown in FIG. 34(a) by the dismounting device shown in FIG. 33.

For Facilitating The Chuck Pawl 134 of the Dismounting Device 100E Biting into the Head 11c The chuck pawl 134 of the dismounting device 100E cannot easily bite into the material of the solid rivet 8 at the position between the head 11c and the body 11b of the solid rivet 8, unless a clearance is present between the head 11c and the base material 1. So, an inclined portion 21A, as shown in FIG. 34(a), is formed in a lower portion of the head 11c of the solid rivet 8 where the head 11c faces the base material 1. The inclination angle $\theta_2$ of the inclined portion 21A is formed to be the same as or somewhat larger than the inclination angle $\theta_3$ of the chuck pawl 134, shown in FIG. 35. The inclined portion 21A is more preferably provided in an iron rivet, rather than an aluminum rivet, because iron is harder material and thus, it will be more difficult to bite into the chuck pawl 134, if the inclining portion 21A is not provided. When the solid rivet 8 is dismounted, the chuck pawl 134 of the dismounting device 100E has already bitten into the material of the solid rivet 8 between the head 11c and the base material 1.

Figure 34B:
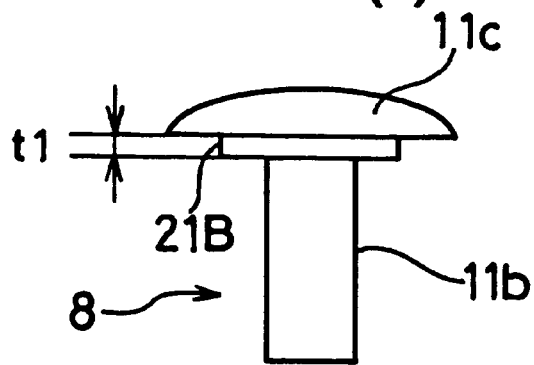
Figure 34C:
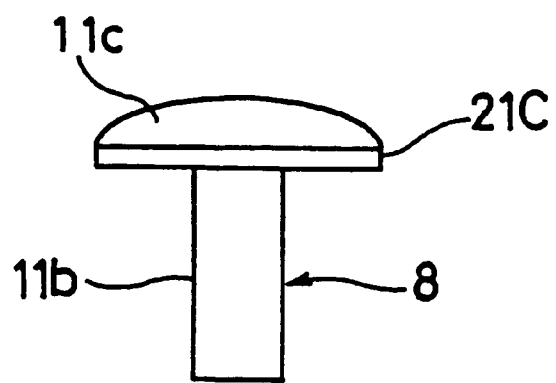
Figure 37:
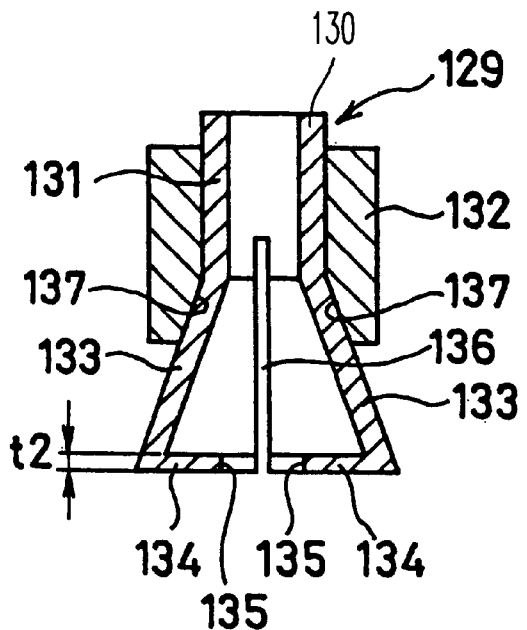
FIG. 37 is a cross-sectional view showing another example of the gripping unit of the dismounting device according to the present invention.
Figure 38:
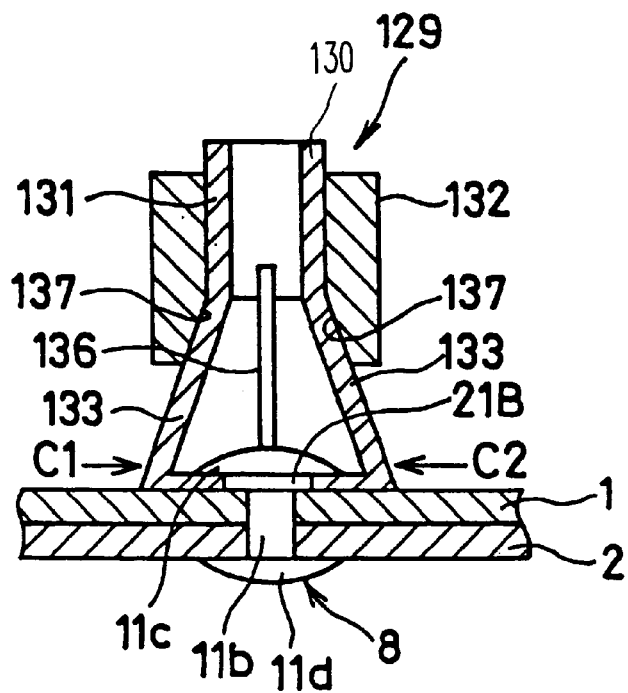
FIG. 38 is a cross-sectional view showing a state of gripping the fastening member, shown in FIG. 34(b), using the gripping unit shown in FIG. 37.

The solid rivet 8 may have a head 11c may be configured so as to have a reduced diameter portion 21B in the lower part of head 11c, as shown in FIG. 34(b), or the solid rivet 8 may have a lower portion 21C wherein the edge thereof is not at an acute angle as shown in FIG. 34(c), but instead the edge of the lower portion 21C is parallel with the outer periphery of the rounded top portion of the head 11c. The extreme end 135 of the chuck pawl 134 of the gripping unit 129 may be formed from a thick element having the thickness t2 as shown in FIG. 37, in which case, the thickness t2 is somewhat smaller than the height t1 of the reduced diameter portion 21B shown in FIG. 34(b). With the gripping unit 129, shown in FIG. 37, the reduced diameter portion 21B formed in the head 11c of the solid rivet 8, as shown in FIGS. 34(b) and 38, is gripped by the extreme end 135 of the chuck 134. Preferably, the reduced diameter portion 21B, as shown in FIGS. 34(b) and 38, is provided in a solid rivet 8 made of iron and not aluminum since iron is much harder than aluminum.

Example for Locking the Locking Unit Without the Chuck Pawl of the Dismounting Device 100E Biting into Between the Head and the Base Material 1

As shown in FIG. 34 (c), the head 11c of the solid rivet 8 is formed to be thicker (i.e., has a thick lower portion 21C) than a head in a normal solid rivet. The thick lower portion 21C has its outer peripheral portion gripped, as shown in FIG. 38, by the chuck pawl 134 formed from a thick element, shown in FIG. 37. In the case where the solid rivet 8, shown in FIG. 34(c), is used, the gripping force is somewhat inferior to that of either of the solid rivets 8, shown in FIGS. 34(a) and 34(b), but the solid rivet 8, shown in FIG. 34(c), has a reduced manufacturing cost, as compared with the solid rivets 8, shown in FIGS. 34(a) and 34(b).

Method 2

Figure 39A:
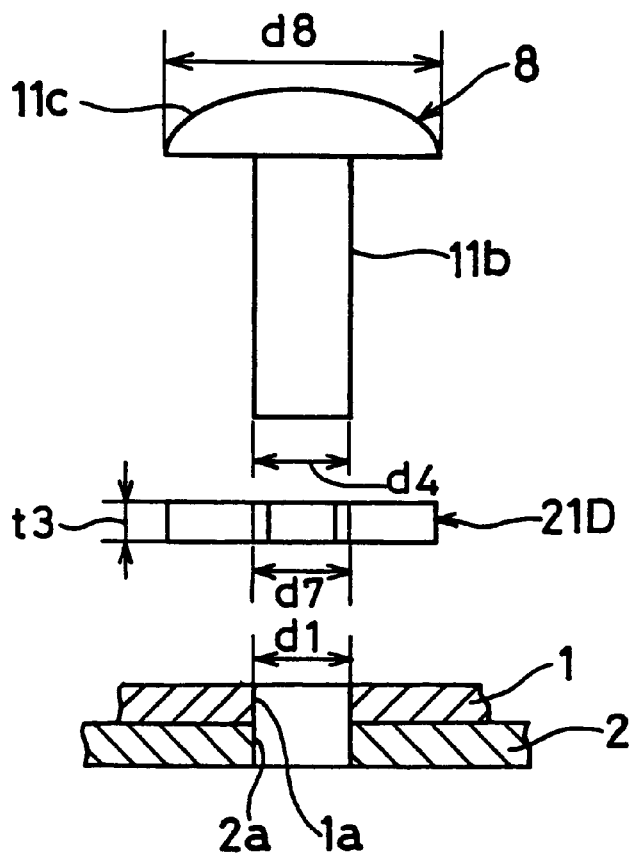
Figure 39B:
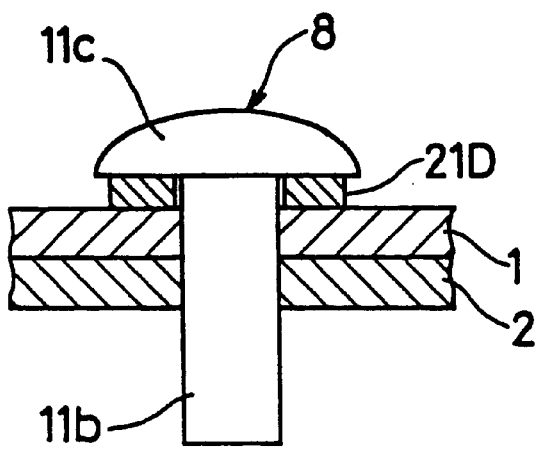
Figure 39C:
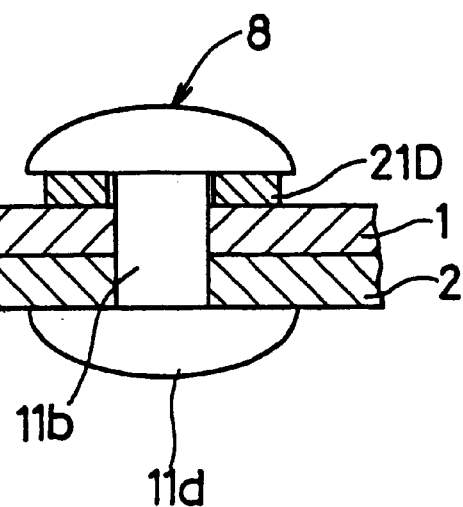

For Facilitating the Chuck Pawl of the Dismounting Device 100E Biting into the Head In an example of carrying out the present invention, as shown in FIGS. 39(a) to 39(c), a collar 21D, as a spacer or auxiliary member, is interposed between the head 11c of the solid rivet 8 and the base material 1. Then, the base materials 1 and 2 are fastened by the collar 21D and the solid rivet 8.

That is, the collar 21D is inserted into the body 11b of the solid rivet 8, as shown in FIG. 39(a), the body 11b is inserted into the fastening holes 1a and 2a, as shown in FIG. 39(b), and the projecting end of the body 11b is caulked to thereby fasten the base materials 1 and 2, as shown in FIG. 39(c).

The collar 21D presents a planar shape, as shown in any one of FIGS. 40(a)–(c), and the inside diameter d7 thereof is larger than the outside diameter d4 of the body 11b. The outside diameter d7' of the collar 21D is smaller than the outside diameter d8 of the head 11c. The collar 21D is broken when the solid rivet 8 is dismounted. For facilitating the breakage of the collar 21D, the collar 21D is formed with a slit 21E therein. Preferably, the collar 21D is formed of a material, which is strong in compression force in the caulking direction and which is weak in compression force toward the center, internally of the radial direction. For example, a less-viscous iron sintered alloy is used for the collar 21D.

Here, the thickness t2 of the extreme end 135 of the chuck pawl 134 is formed to be somewhat smaller than the thickness t3 of the collar 21D, as shown in FIG. 39(a). Thereby, the chuck pawl 134 is easily inserted into a clearance between the head 11c and the base material 1.

Figure 42:
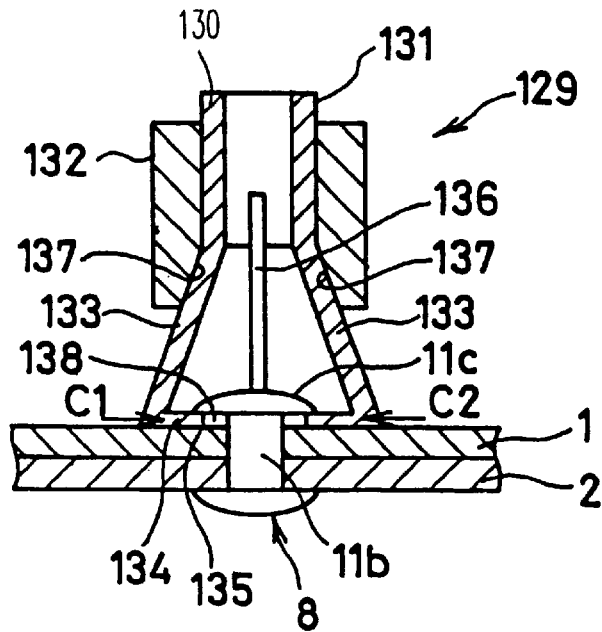
FIG. 42 is a cross-sectional view showing a state immediately before the body of the fastening member is gripped by the gripping unit after the breakage of the collar shown in FIGS. 39(a) to 39(c)

The extreme ends 135 of the chuck pawl 134 of the gripping unit 129 are brought into frictional engagement with the outer peripheral surface of the collar 21D, as shown in FIG. 41. The fastening member 132 is gradually moved down. Then, the extreme ends 135 of the chuck pawl 134 move in a direction towards to each other to compress the outer peripheral surface of the collar 21D. Further, when the extreme end 135 of the chuck pawl 134 is narrowed, the collar 21D is broken. When the collar 21D is broken, the gripping unit 129 is removed from the base material 1 to remove the collar 21D. Next, the extreme end 135 of the chuck pawl 134 is again inserted into a clearance 138 formed by removal of the collar 21D (see FIG. 42) to lock the gripping unit 129. At that time, the fastening member 132 is forced upwardly, until the extreme end 135 of the chuck pawl 134 comes in contact with the outer peripheral surface of the body 11b. Thereby, the gripping unit 129 is positively locked on the body 11b of the solid rivet 8.

Figure 43:
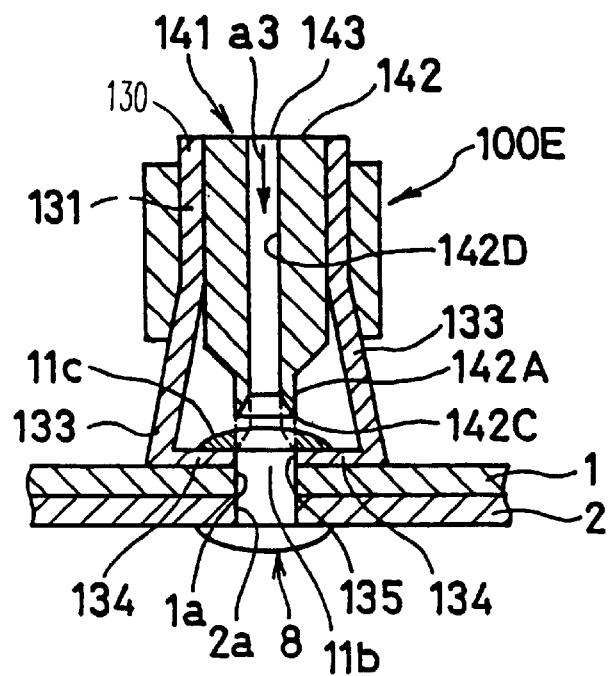
FIG. 43 is a cross-sectional view showing a state immediately before the fastening member is cut by a cutting blade unit while gripping the body of the fastening member by the gripping unit shown in FIG. 41.

Next, as shown in FIG. 43, the cutting blade unit 141 is driven in the direction of arrow a3 by an air cylinder (not shown) to cut the body 11b and the head 11c along the boundary region A. After the cutting has been performed, the extending member 143 is driven in the direction of arrow a3 to remove the body 11b from the fastening holes 1a and 2a of the base materials 1 and 2, respectively. Even with this configuration, the shock created at the time that the cutting is performed can be absorbed by both the gripping unit 129 and the cutting blade unit 141, thus preventing the base materials 1 and 2 from receiving the force of the shock and being damaged.

While the collar 21D is described above as being broken prior to the dismounting of the solid rivet 8, it is possible to dismount the solid rivet 8 without breaking the collar 21D.

Since the outside diameter d7' of the collar 21D is smaller than the outside diameter d8 of the head 11c, the extreme end 135 of the chuck pawl 134 may be brought into engagement with the lower part of the head 11c rather than the outer peripheral surface of the collar 21D. Then, the axial gripping force of the gripping unit 129, with respect to the solid rivet 8, is somewhat inferior to than the case in which the collar 21D is gripped and broken to remove the collar 21D. Thus, the dismounting device 100E can be held from the top and thereby, prevented from being disengaged from the solid rivet 8 due to the shock when the boundary region A between the body 11b and the head 11c is cut. According to this method, since the collar 21D need not be broken, the dismounting work of the solid rivet 8 can be done quickly.

The collar 21D may be formed with V-grooves 21F around the collar 21D, as shown in FIG. 40(b), for example, where the number of the V-grooves 21F is four. When the collar 21D is compressed by the gripping unit 129, since stress is concentrated on the V-grooves 21F, the collar 21D is broken in the vicinity of the V-grooves 21F. The collar 21D may be formed with U-grooves instead of the V-grooves 21F. These grooves may be formed in the inner peripheral portion of the collar 21D.

Further, as shown in FIG. 40(c), through-holes 21G may be formed at equal intervals in the collar 21D. The number of the through-holes 21G shown in FIG. 40(c) is four, but other numbers of through-holes 21G are possible. Since the points provided with the through-holes 21G are weaker in strength relative to a compression force acting inwardly in the radial direction than that of other points, even if the collar 21D shown in FIG. 40(c) is used, the breaking thereof is easy. Note that while the configuration of the collar 21D as shown in FIG. 40(b) and (c) has the grooves 21F and through-holes 21G which extend through the thickness of the collar 21D, a configuration may be employed in which a closed-end hole or a closed-end groove may be provided in the upper surface or the bottom surface of the collar 21D (i.e., the grooves or holes do not extend all the way through the thickness of the collar 21D).

Figure 44A:
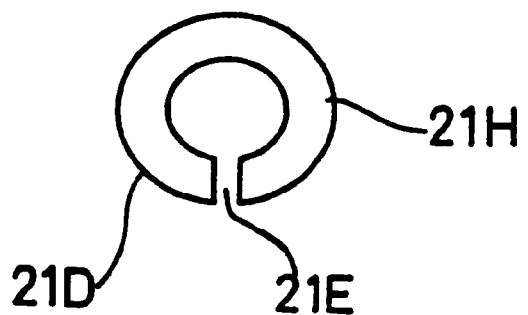
Figure 44B:
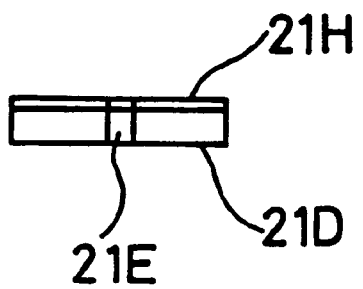
Figure 44C:
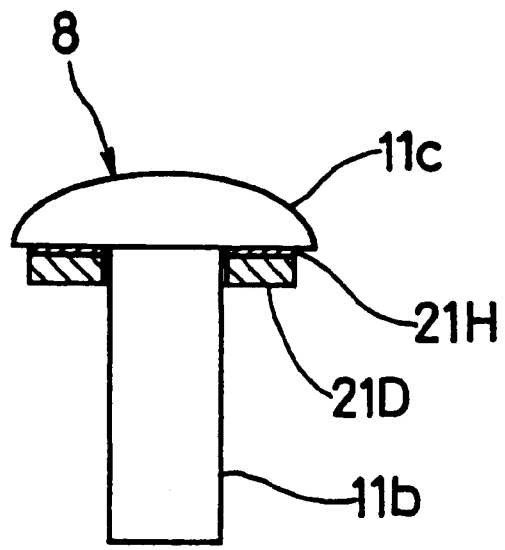

FIGS. 44(a)–(c) show the collar 21D formed on the upper end surface with an interlocking layer 21H. The interlocking layer 21H comprises, for example, a double-side tape or an adhesive. If the collar 21D having the interlocking layer 21H is used, the collar 21D can be interlocked in advance to the bottom of the head 11c of the solid rivet 18, as shown in FIG. 44(c). If the solid rivet 8 with the collar 21D as shown in FIG. 44(c) is used, the collar 21D need not be inserted into the body 11b every time the solid rivet 8 is caulked to the base materials 1 and 2. Accordingly, it is possible to achieve a reduction in caulking operation time and to prevent the insertion of the collar 21D from being forgotten.

Example 1

Dismounting Device Capable of Removing the Body 11b of the Fastening Member Cut From the Base Materials 1 and 2

Figure 45:
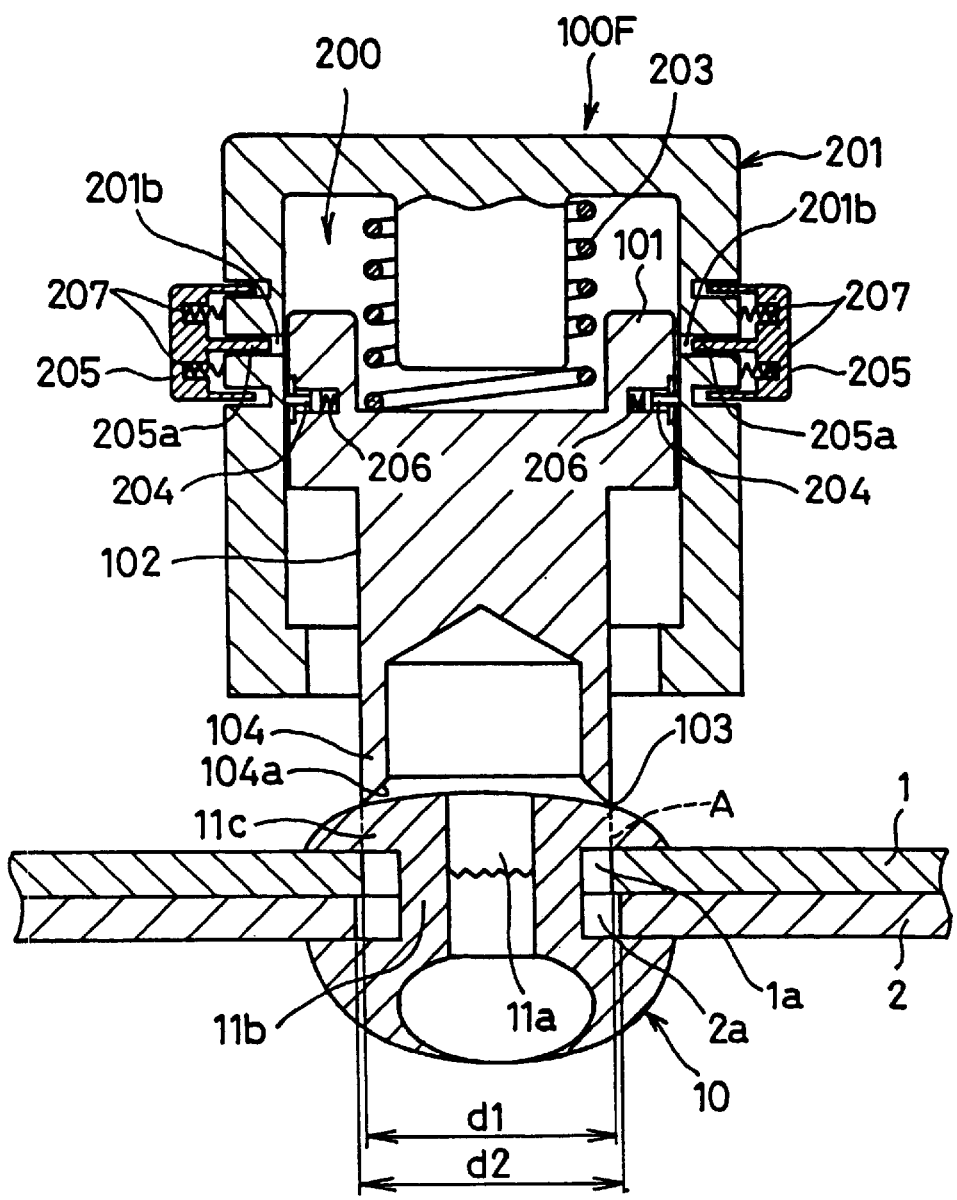
FIG. 45 is a cross-sectional view showing a schematic constitution of a dismounting device for a fastening member according to a twelfth embodiment of the present invention.
Figure 46:
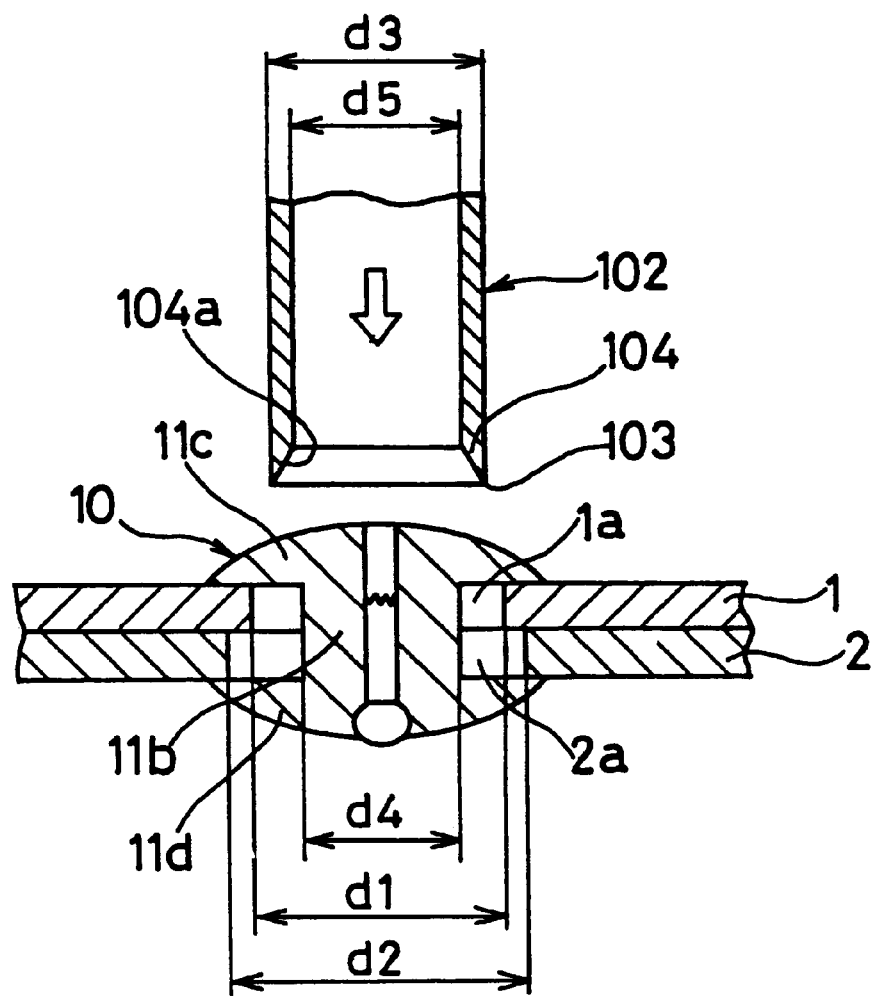
FIG. 46 is a partial cross-sectional view for explaining the dimension of a cutting blade of the dismounting device shown in FIG. 45.

FIG. 45 shows a dismounting device 100F capable of removing the body 11b of the fastening member cut from the base materials 1 and 2, according to a twelfth embodiment of the present invention. The dismounting device 100F has a cutting blade 102 for cutting the body 11b and the head 11c along the boundary region A. The dismounting device 100F has a moving stroke for pressing the body 11b, remaining in the base materials 1 and 2, using a knife edge 103, after the cutting of the body 11b and the head 11c to remove the body 11b from the base materials 1 and 2. As shown in FIG. 46, the cutting blade 102 is cylindrical in shape and has an inside diameter d5, which is larger than the outside diameter d4 of the body 11b and an outside diameter d3, which is smaller than the diameters d1 and d2 of the fastening holes 1a and 2a of the base materials 1 and 2, respectively.

The dismounting device 100F is an improvement over the dismounting device 100B shown in FIG. 15, but is substantially of the same in construction as the dismounting device 100B, except that a tapered surface 104a of the knife edge portion 104 of the cutting blade 102 is formed in the inner peripheral surface.

Figure 47A:
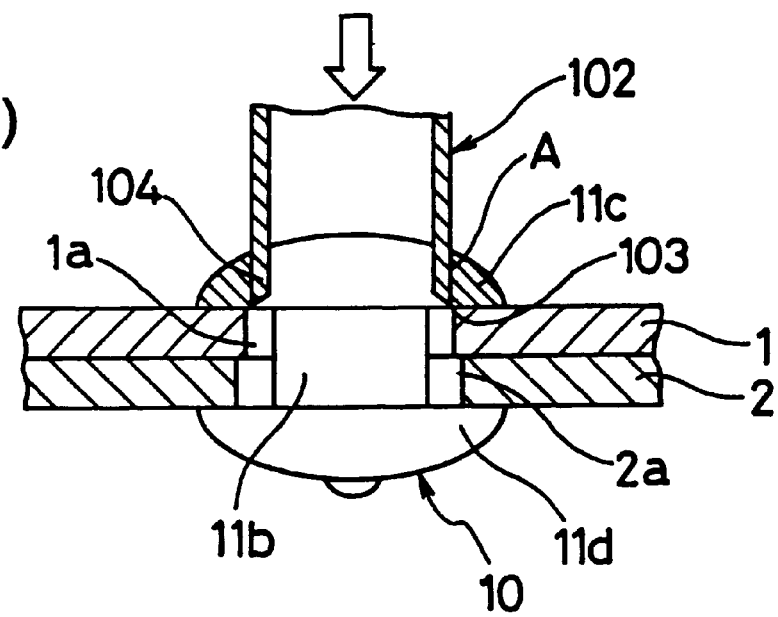
Figure 47B:
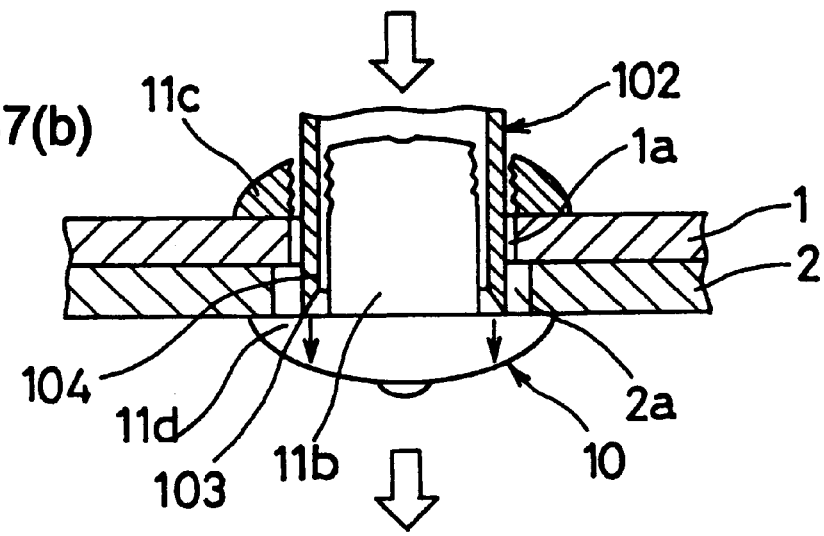
Figure 47C:
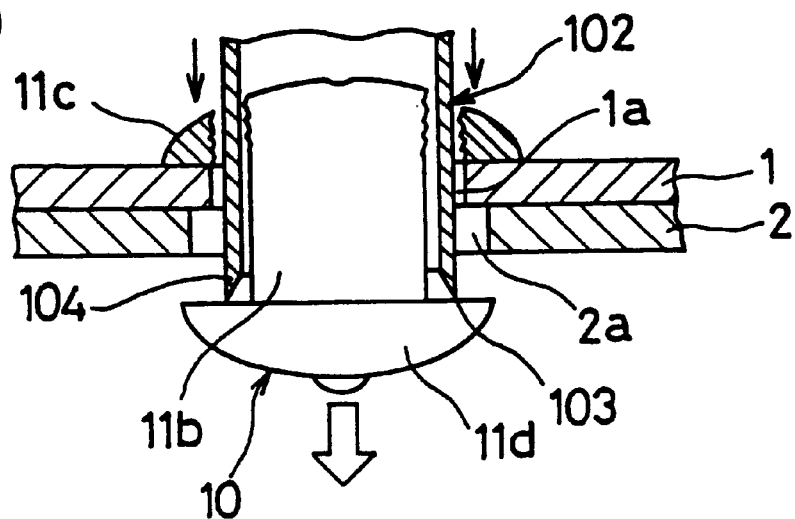

When the cutting force is applied to cut the boundary region A, between the head 11c and the body 11b, using the cutting blade 102, the boundary region A is cut by the cutting blade 102 and separated as shown in FIG. 47(a). When the cutting blade 102 is further moved down, the knife edge 103 of the cutting blade 102 comes into contact with the head 11d on the side of the blind rivet 10 opposite the head 11c, as shown in FIG. 47(b). When the cutting blade 102 is further moved down from the state shown in FIG. 47(b), the body 11b of the blind rivet 10 may be removed from the fastening holes 1a and 2a of the base materials 1 and 2, respectively, by the cutting blade 102. Thereby, the blind rivet 10 is completely removed, as shown in FIG. 47(c), from the base materials 1 and 2. According to this arrangement, since the outside diameter d3 of the cutting blade 102 is smaller than the inside diameters d1 and d2 of the fastening holes 1a and 2a, respectively, the base materials 1 and 2, respectively, are prevented from being damaged by the cutting blade 102 when the body 11b, which has been cut, is removed.

Figure 48:
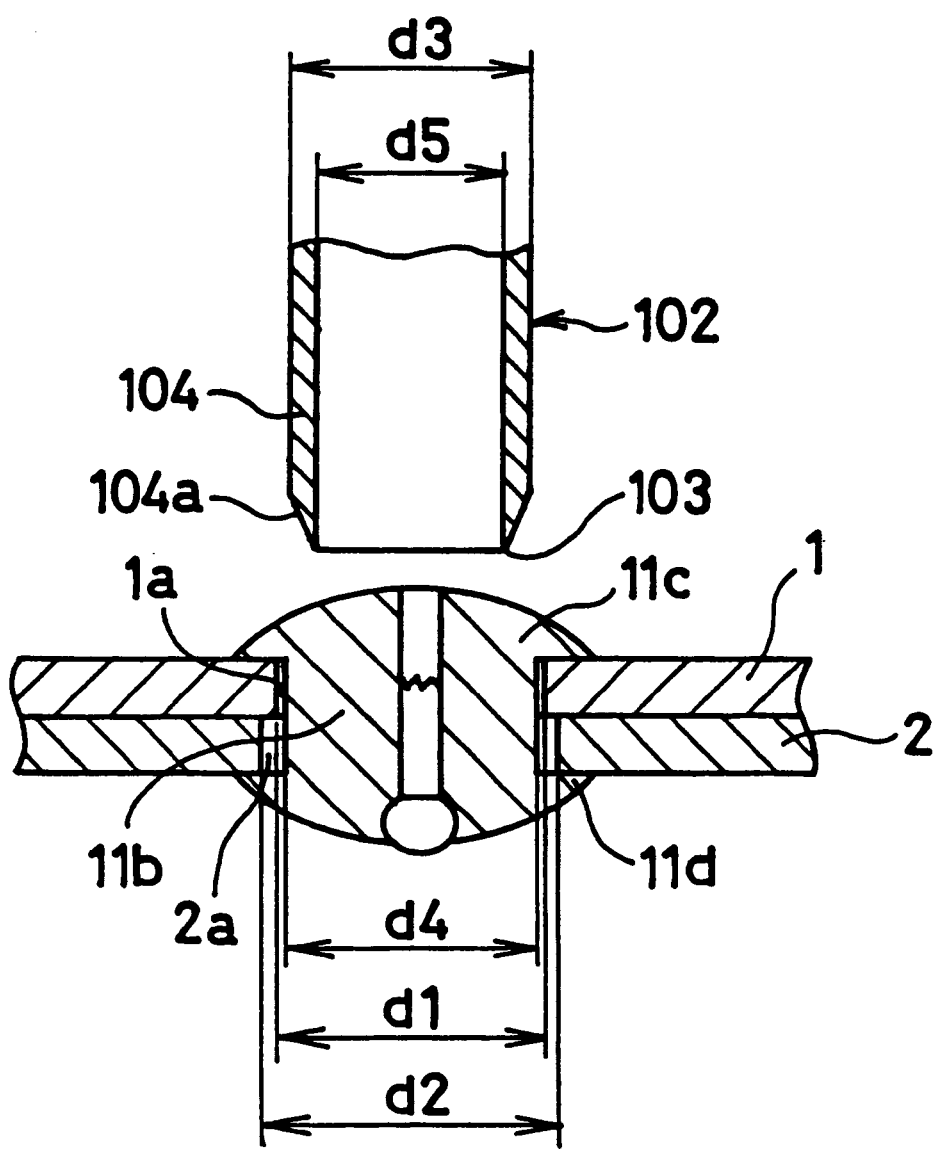
FIG. 48 is a cross-sectional view showing an example of the change of a dimensional relationship of the cutting blade to the body.
Figure 49A:
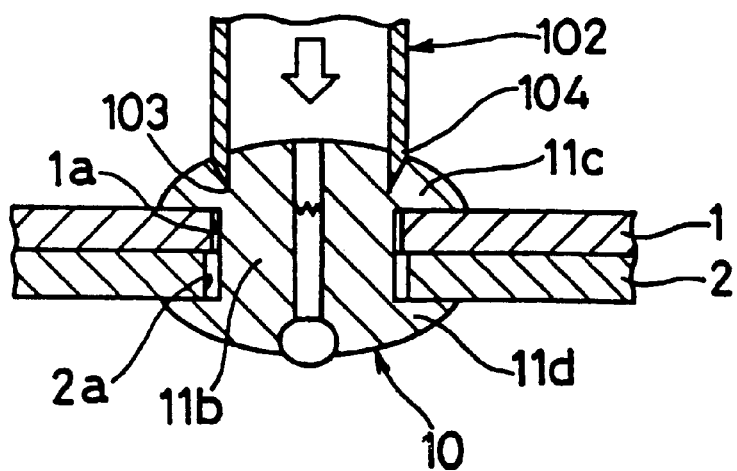
Figure 49B:
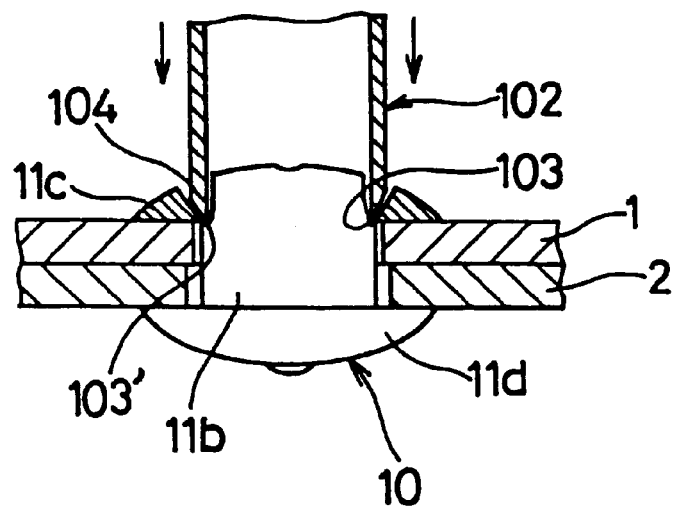
Figure 49C:
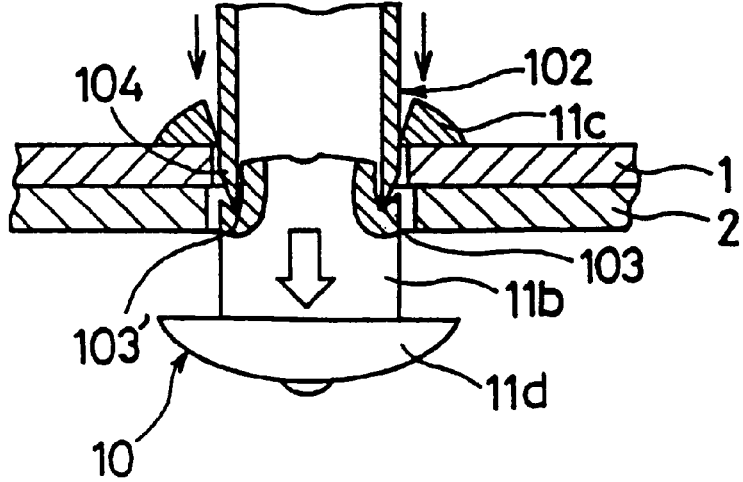

While the dismounting device 100F, shown in FIG. 45, employs the constitution wherein the knife edge 103 is placed in contact with the head 11d, on the side opposite the head 11c, to remove the body 1b, which has been cut from the fastening holes 1a and 2a of the base materials 1 and 2, respectively, it is to be noted that: the inside diameter d5 of the cutting blade 102 is formed to be of the same or a somewhat smaller diameter than the outside diameter d4 of the body 11b; the outside diameter d3 is formed to be smaller than the diameters d1 and d2 of the fastening hole, as shown in FIG. 48; and the cutting blade 102 is moved down while pressing a cutting and separating place 103' of the body 11b using the knife edge 103, as shown in FIGS. 49(a)–(c), to thereby remove the body 11b cut from the fastening holes 1a and 2a. By doing so, its moving stroke can be reduced, as compared with the moving stroke of the dismounting device 100F shown in FIG. 45. Further, the knife edge 103 of the cutting blade 102 can be brought into contact with the body 11b positively.

Figure 50:
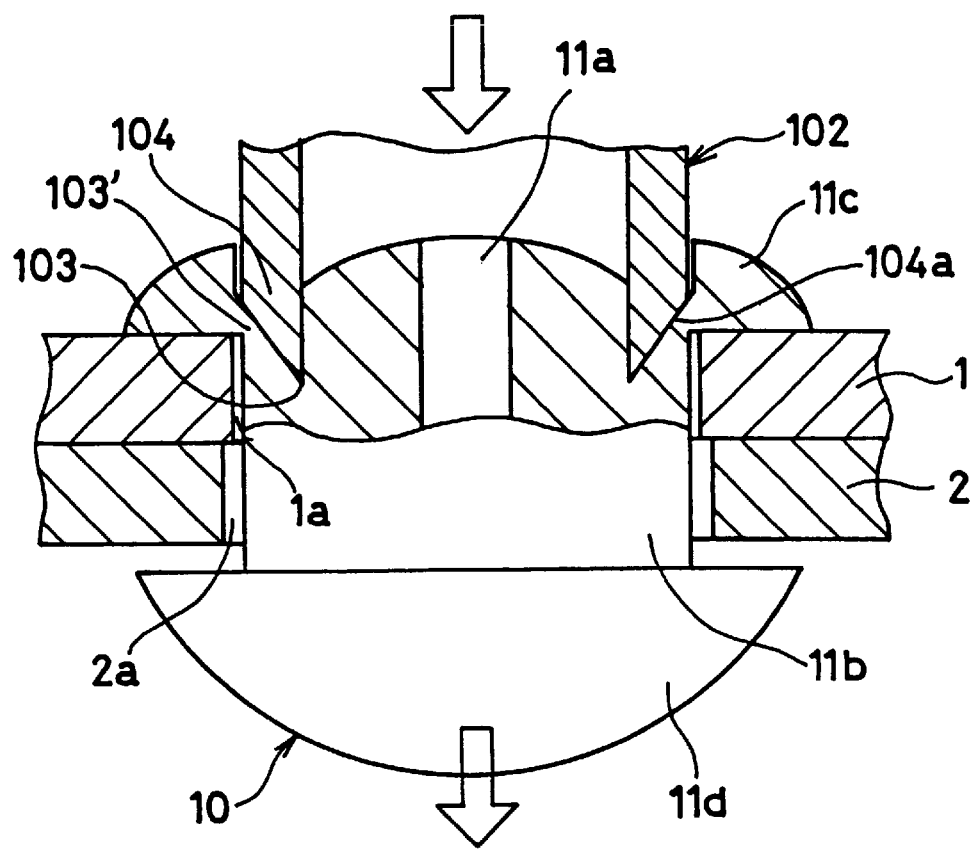
FIG. 50 is an enlarged cross-sectional view for explaining the biting state of the cutting blade, shown in FIG. 48, into the head.

The cutting blade 102 has a cylindrical knife edge portion 104 along the boundary region A, and the knife edge portion 104 has a tapered surface 104a which gradually reduces in diameter toward the extreme end thereof, as shown in enlarged view in FIG. 50. The tapered surface 104a is formed in the outer peripheral surface of the cutting blade 102. Thereby, since the head 11c is cut into the shape of an inverted truncated cone in cross-section, it is possible to prevent the head 11c from biting into the knife edge portion 104. Accordingly, when the body 11b is extruded using the cutting blade 102, the frictional force, caused by a head 11c biting into a cutting blade 102, can be reduced, and the body 11b can be removed smoothly from the fastening holes 1a and 2a of the base materials 1 and 2, respectively.

According to this arrangement, the extruding force, for extruding the body 11b from the fastening hole 1a, once the head 11c has been separated using the cutting means, is applied by the cutting force applying means 200.

Example 2

Dismounting Device Capable of Removing the Body 11b of the Fastening Member Cut from the Base Materials 1 and 2

Figure 51:
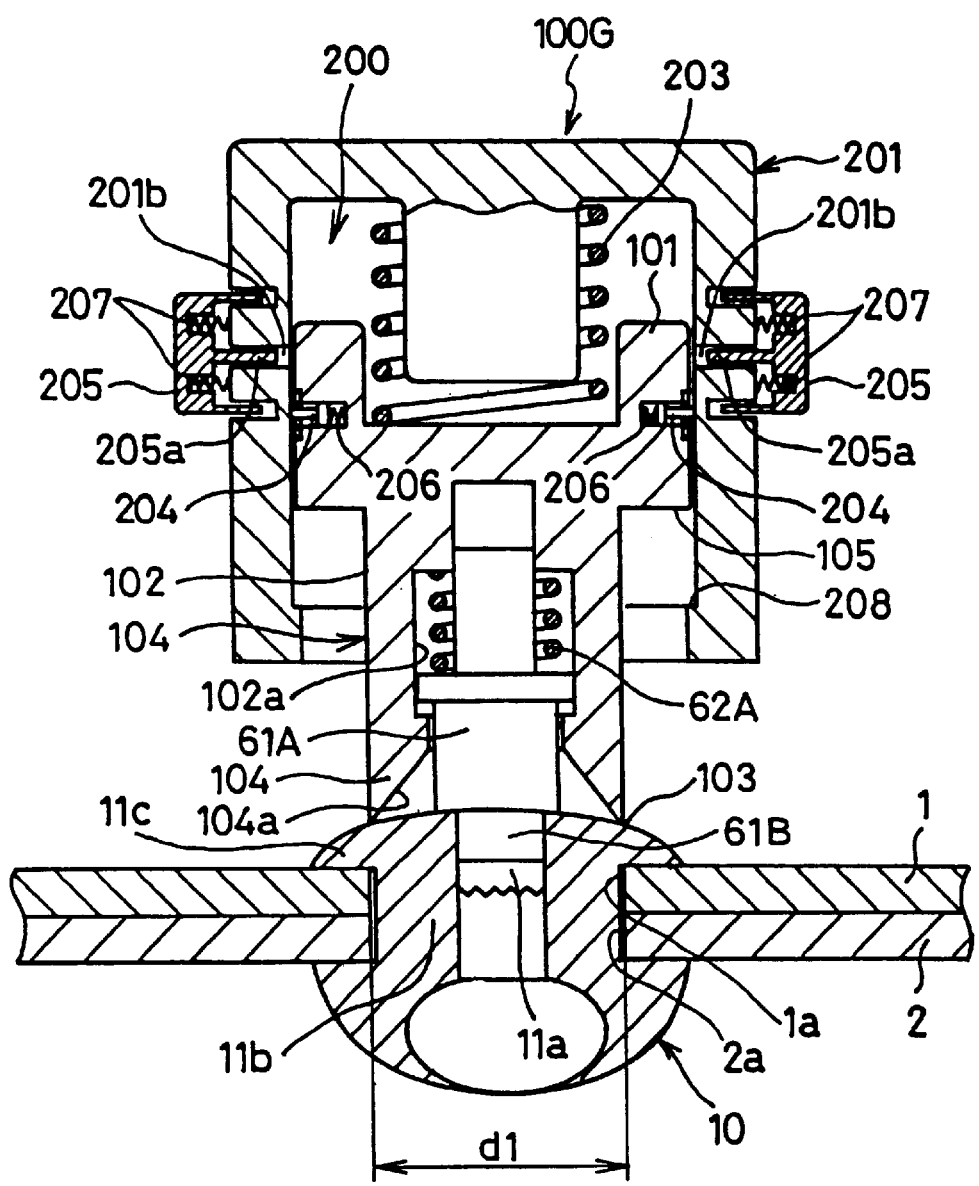
FIG. 51 is a cross-sectional view showing a schematic constitution of a dismounting device having a body extruding means according to a thirteenth embodiment of the present invention.

FIG. 51 shows a dismounting device 100G capable of removing the body 11b of the fastening member cut from the base materials 1 and 2, according to a thirteenth embodiment of the present invention. The dismounting device 100G is an improvement over the dismounting device 100F. In the dismounting device 100G, a body extruding member 61A is integral with the cutting blade 102. The body extruding member 61A can be moved forward and backward in an axial direction of an axial hole 11a of the blind rivet 10 within a hollow portion 102a formed in the axial portion of the cutting blade 102. The body extruding member 61A is provided with a fitting portion 61B fitted in the axial hole 11a.

A coil spring 62A, for applying the extruding force to the body extruding member 61A, is interposed between the body extruding member 61A and the upper part of the cutting blade 102. The body extruding member 61A is normally projected from the knife edge 103 by the urging force of the coil spring 62A. The extruding force is accumulated in the coil spring 62A with compression. The compression force is applied by releasing the cutting force of the coil spring 203.

According to the dismounting device 100G, the fitting portion 61B is first fitted in the axial hole 11a to carry out positioning relative to the blind rivet 10 of the cutting blade 102. Thereby, it is possible to prevent a deviation in position of the cutting blade 102 relative to the boundary region A when it is cut. Further, since the body extruding member 61A is urged in the fitting direction of the axial hole 11a by the coil spring 62A, the fitting between the axial hole 11a and the fitting portion 61B is easily done.

Next, the cutting blade support 201 is urged against the base material 1 so that the knife edge 103 of the cutting blade 102 faces the boundary region A. Thereby, the cutting blade 102 is pressed into the cutting blade support 201 while contracting the coil spring 203 against the stretching force of the coil spring 203. The cutting force is thereby accumulated in the coil spring 203. These operations are the same as those of the dismounting device 100B shown in FIG. 15, a detailed description of which is omitted here.

Figure 52A:
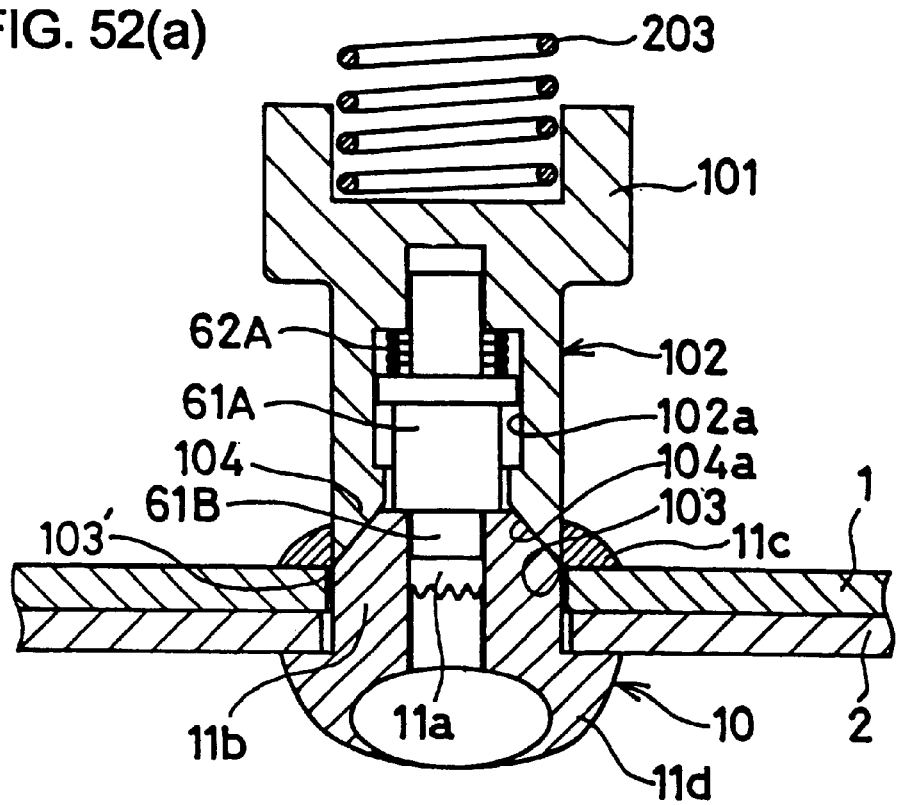

Next, when a release button 205 is operated to release the stop, the cutting force is released by the stretching force of the coil spring 203, and the cutting blade 102 is moved downwardly. Thereby, the knife edge portion 104 bites into the boundary region A, as shown in FIG. 52(a), to separate the body 11b and the head 11c. The moving stroke at the time of cutting by the dismounting device 100G is a stroke to an extent that it reaches a separating and rupturing place 103' between the head 11c and the base material 1 and stops in the state of being positioned in the vicinity of the edge of the fastening hole 1a of the base material 1. A shoulder 208 is formed in the inner peripheral portion of the cutting blade support 201 in order to control the stoke amount, and the cutting blade 102 is formed with a shoulder 105 in engagement with the shoulder 208.

When the boundary region A is cut by being bitten into by the knife edge portion 104, the coil spring 62A is compressed by the stretching force of the coil spring 203. The extruding force is accumulated in the coil spring 62A by the compression force of the coil spring 62A. As described above, according to the dismounting device 100G, the knife edge 103 of the cutting blade 102 is moved toward the separating and rupturing place 103' between the head 11c and the base material 1 by the cutting force applied by the coil spring 203, whereby the extruding force is accumulated in the body extruding member 61A. Therefore, it is not necessary to provide an exclusive-use means for accumulating the extruding force in the body extruding member 61A itself, and the dismounting device 100G can be miniaturized.

Figure 52B:
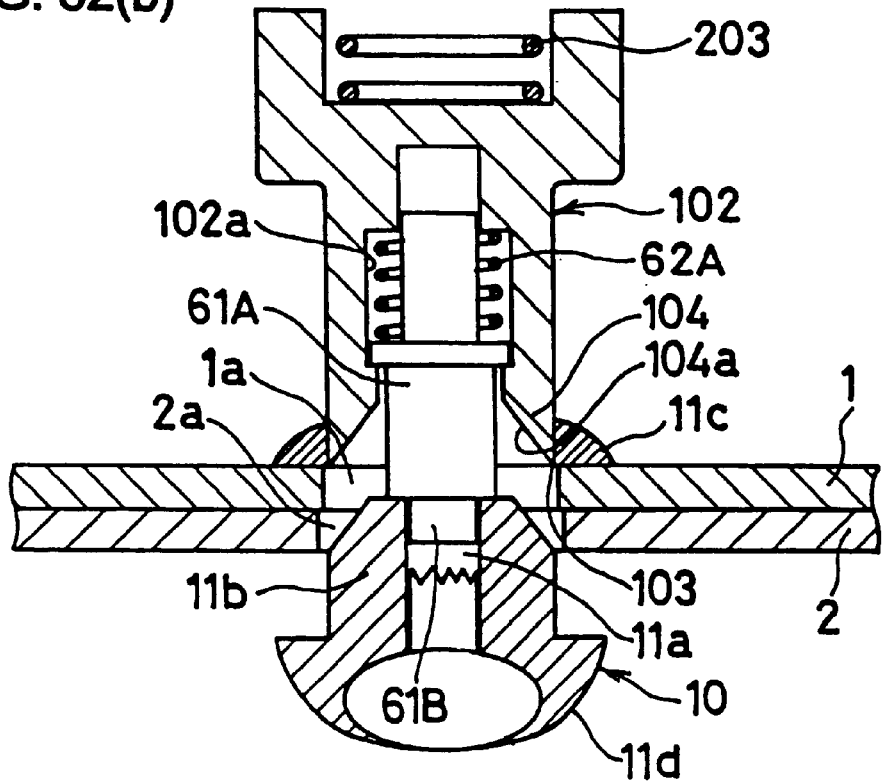

Accordingly, as shown in FIG. 52(b), the body 11b is extruded from the fastening holes 1a and 2a by the extruding force accumulated in the coil spring 62A.

Figure 53:
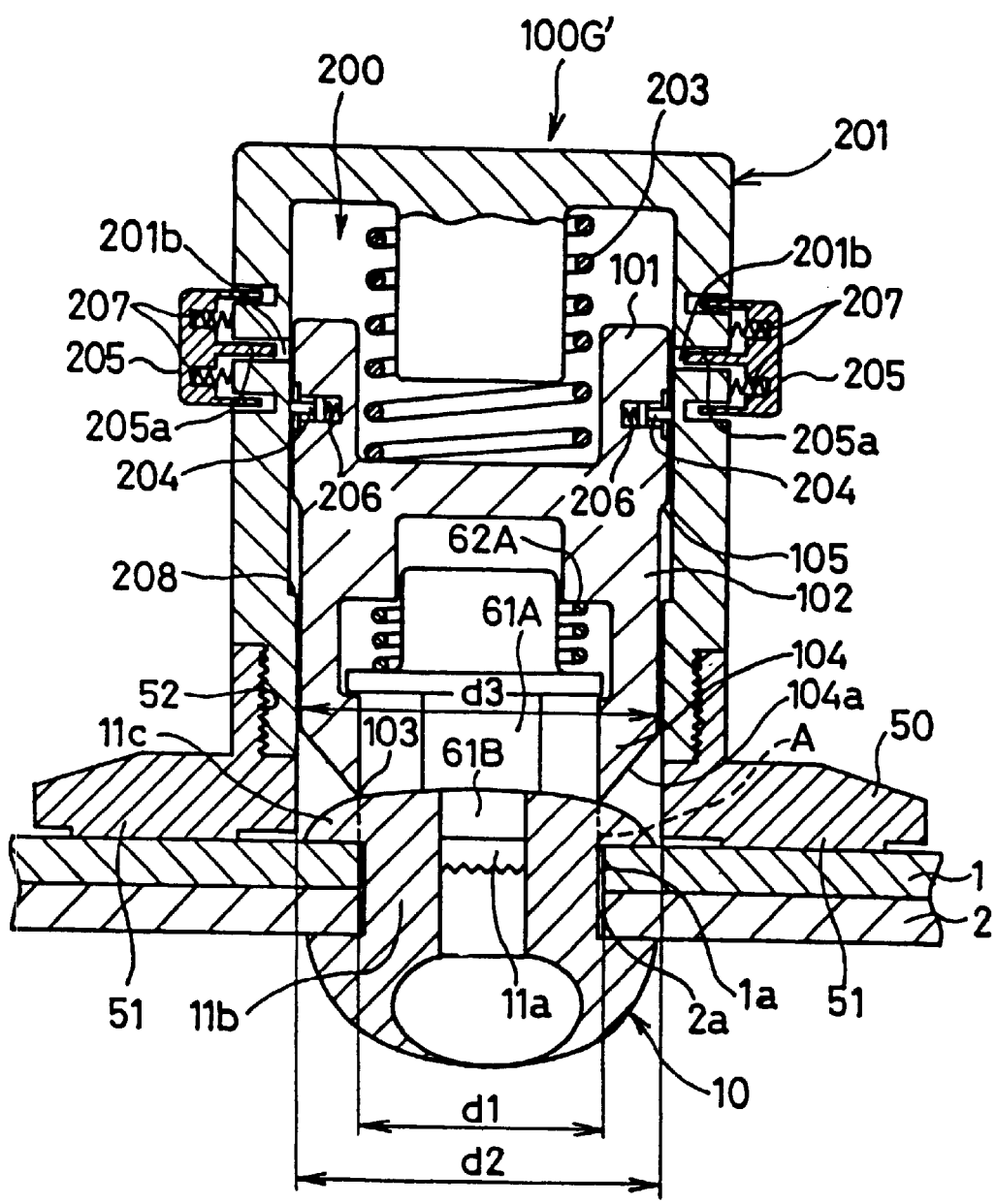
FIG. 53 is a cross-sectional view showing a schematic constitution of a dismounting device according to a modification of the dismounting device shown in FIG. 51.

FIG. 53 shows a dismounting device 100G' capable of removing the body 11b of the fastening member cut from the base materials 1 and 2. The dismounting device 100G' is a modification of dismounting device 100G, which is an improvement over the dismounting device 100D, shown in FIG. 24. The dismounting device 100G' provides a body extruding member 61A on the dismounting device 100D, shown in FIG. 24. Other constitutions are the same as those of the dismounting device 100D, a detailed description of which is omitted here, but the same reference numerals are given to the same constitutional elements.

Figure 54A:
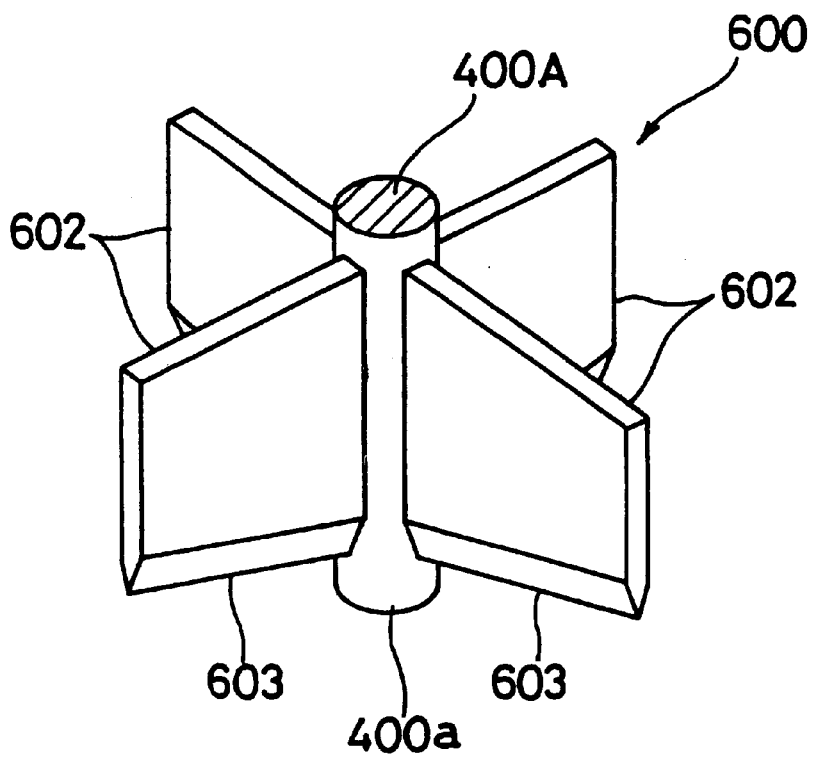
Figure 54B:
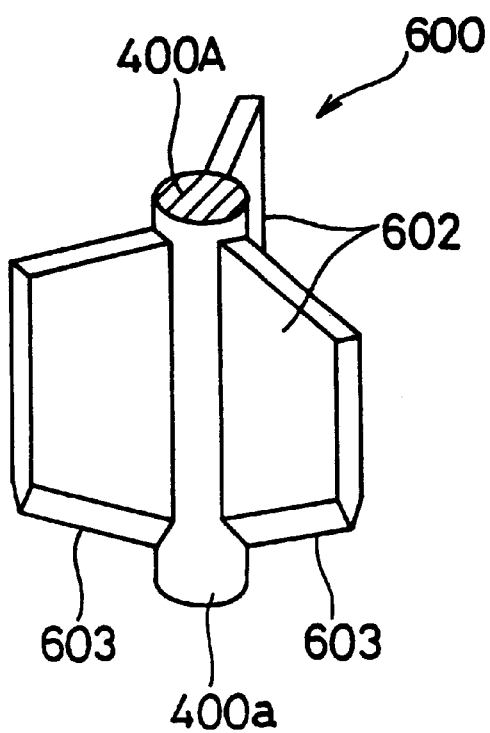
FIG. 54(b) shows a radial cutting blade having a radial edge comprised of three plates.
Figure 54C:
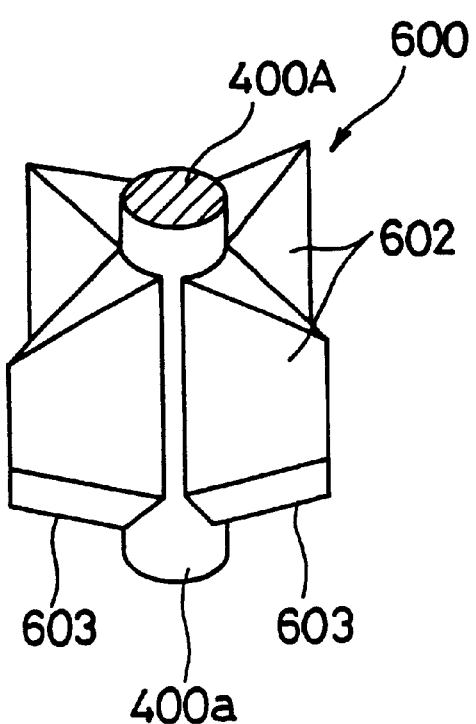
FIG. 54(c) shows a radial cutting blade having a radial edge comprised of four wedges.

Method of Cutting a Boundary Region of a Fastening Member after the Head of the Fastening Member has been Cut Radially in Advance FIGS. 54(a)–(c) show a radial cutting blade 600 for cutting the head 11c of the blind rivet 10 substantially radially in advance. This radial cutting blade 600 has a centering shaft 400A, as a cutting blade positioning member, which is fitted in the axial hole 11a of the blind rivet 10, when the head 11c of the blind rivet 10 is cut, to locate a cutting position of the radial cutting blade 600. A radial blade 602 is disposed on the centering shaft 400A. The radial blade 602 may be formed integrally with the centering shaft 400A or may be detachably integrated with the centering shaft 400A. One radial blade 602 will suffice, but preferably a plurality of the edges are provided, as shown in FIGS. 54(a)–(c).

The radial blade 602 may be formed from a plate-like element having substantially uniform thickness, as shown in FIGS. 54(a) and (b), or may be a wedge-like element which gradually increases the thickness toward the centering shaft 400A, as shown in FIG. 54(c).

In the case where a plurality of the radial blades 602 are provided, preferably, knife edges 603 of the radial blades 602 are arranged at equally intervals so that the head 11c of the blind rivet 10 is substantially equally divided and cut by the knife edge 603 of the radial blade 602. Thereby, when the head 11c is cut, the loads applied to the radial blades 602 are substantially made uniform.

Next, an explanation will be made of the case where the head 11c of the blind rivet 10 is radially cut using the radial cutting blade 600.

Figure 55:
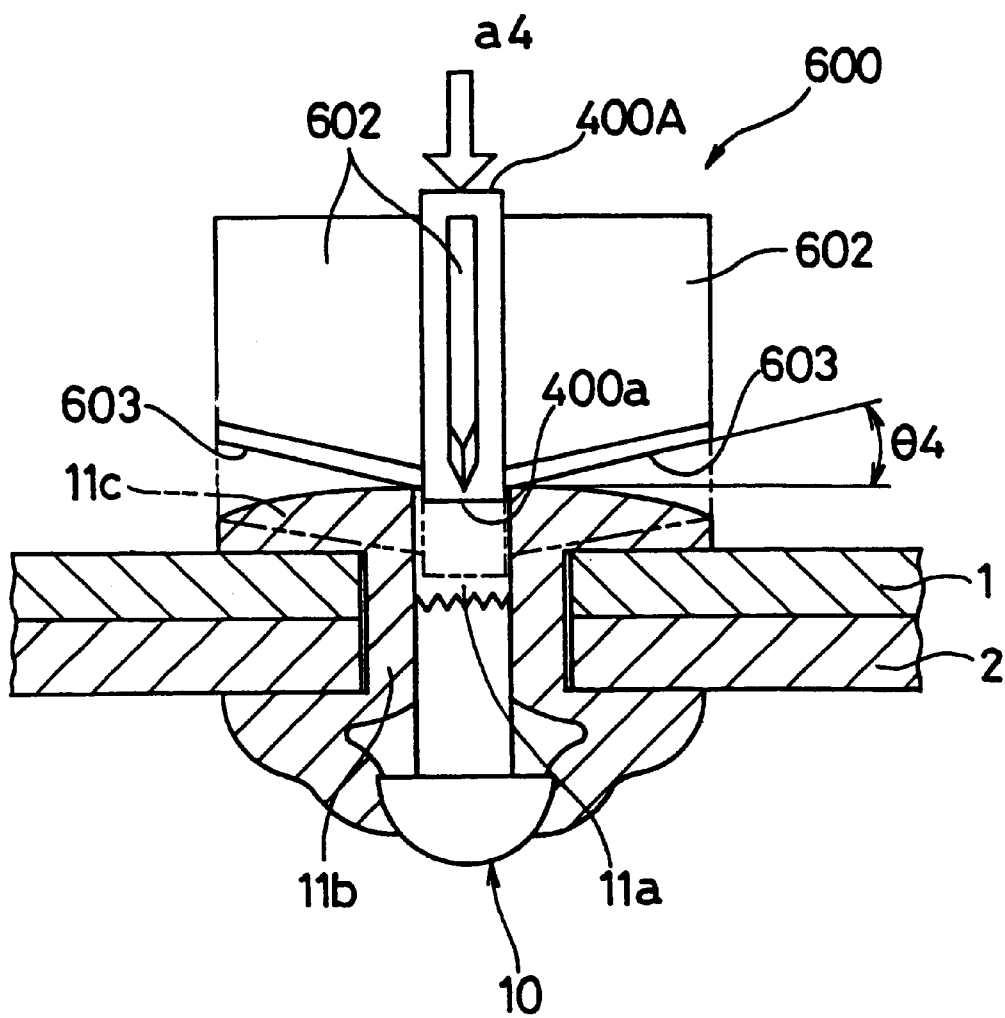
FIG. 55 is a cross-sectional view showing a state of cutting a head of a blind rivet using the radial cutting blade shown in FIG. 54(a)

First, as indicated by the solid line in FIG. 55, a fitting portion 400a at the lower end of the centering shaft 400A is fitted in the axial hole 11a of the blind rivet 10. Thereby, the knife edge 603 of the radial blade 602 of the radial cutting blade 600 is centered to an adequate cutting position with respect to the head 11c of the blind rivet 10.

Next, with the fitting portion 400a of the centering shaft 400A fitted in the axial hole 11a of the blind rivet 10, the cutting force is applied by the radial cutting blade 600 in the cutting direction (i.e., in the direction of the arrow a4). Thereby, as indicated by the dashed line in FIG. 55, the knife edge 603 of the radial blade 602 of the radial cutting blade 600 bites into the head 11c of the blind rivet 10 so that the head 11c is cut so as to divided radially in plural number.

Figure 56:
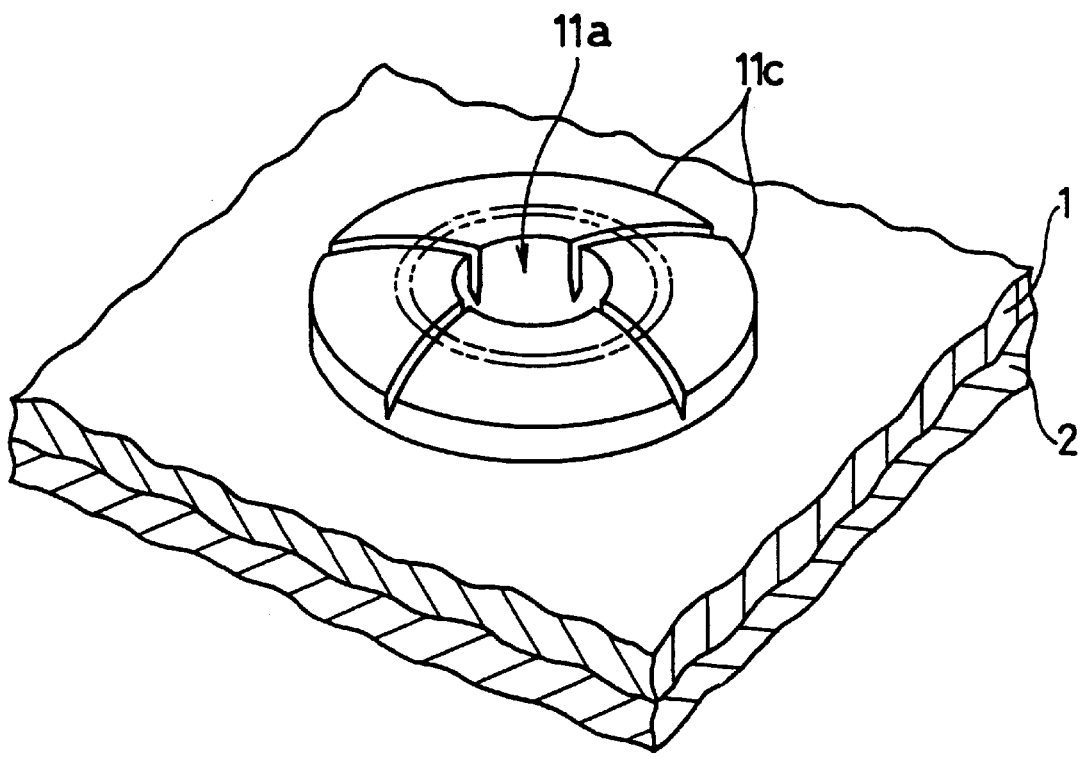
FIG. 56 is a perspective view showing the head cut by the radial cutting blade shown in FIG. 54(a)

For example, in the case where the head 11c of the blind rivet 10 is cut using the radial cutting blade 600 provided with four radial blades 602 as shown in FIG. 54(a), the head 11c of the blind rivet 10 is cut so as to be divided into fourth, as shown in FIG. 56.

Next, cutting is done along the boundary region A between the body 11b and the head 11c of the blind rivet 10 using any one of the dismounting devices described so far. The head 11c is separated from the body 11b, so as to be divided into a plurality of sections, by a radial cutting of the head 11c and the cylindrical cutting of the boundary region A, and the blind rivet 10, formerly fastened to the base materials 1 and 2, is removed from the base materials 1 and 2.

According to the above-mentioned dismounting method, since the head 11c is cut radially into a plurality of sections by the radial cutting blade 600, when the boundary region A is cut, the load applied to the cutting blade 102 is reduced, and the cutting force applied to the cutting blade 102 will suffice to be small, thus enabling miniaturization of the dismounting device. Further, since the head 11c is divided into a plurality of sections and separated from the body 11b, the head 11c, after being cut, does not become entangled with the cutting blade 102, and the separability of the dismounting device and the head 11c is improved.

Preferably, the knife edge 603 of the radial blade 602 of the radial cutting blade 600 is inclined so as to project from the direction of the head 11c toward the axial center of the fitting portion 400a of the centering shaft 400A, as shown in by the angle Θ4 in FIG. 55.

Thereby, when the head 11c is cut by the radial cutting blade 600, the knife edge 603 of the radial blade 602 gradually bites from the axial center of the head 11c toward the radial outside.

Thus, according to the radial cutting blade 600, when the head 11c is cut, the load applied to the radial cutting blade 600 can be reduced, and the cutting force applied to the radial cutting blade 600 will be small. Therefore, the cutting work of the head 11c is facilitated by the radial cutting blade 600.

Figure 57:
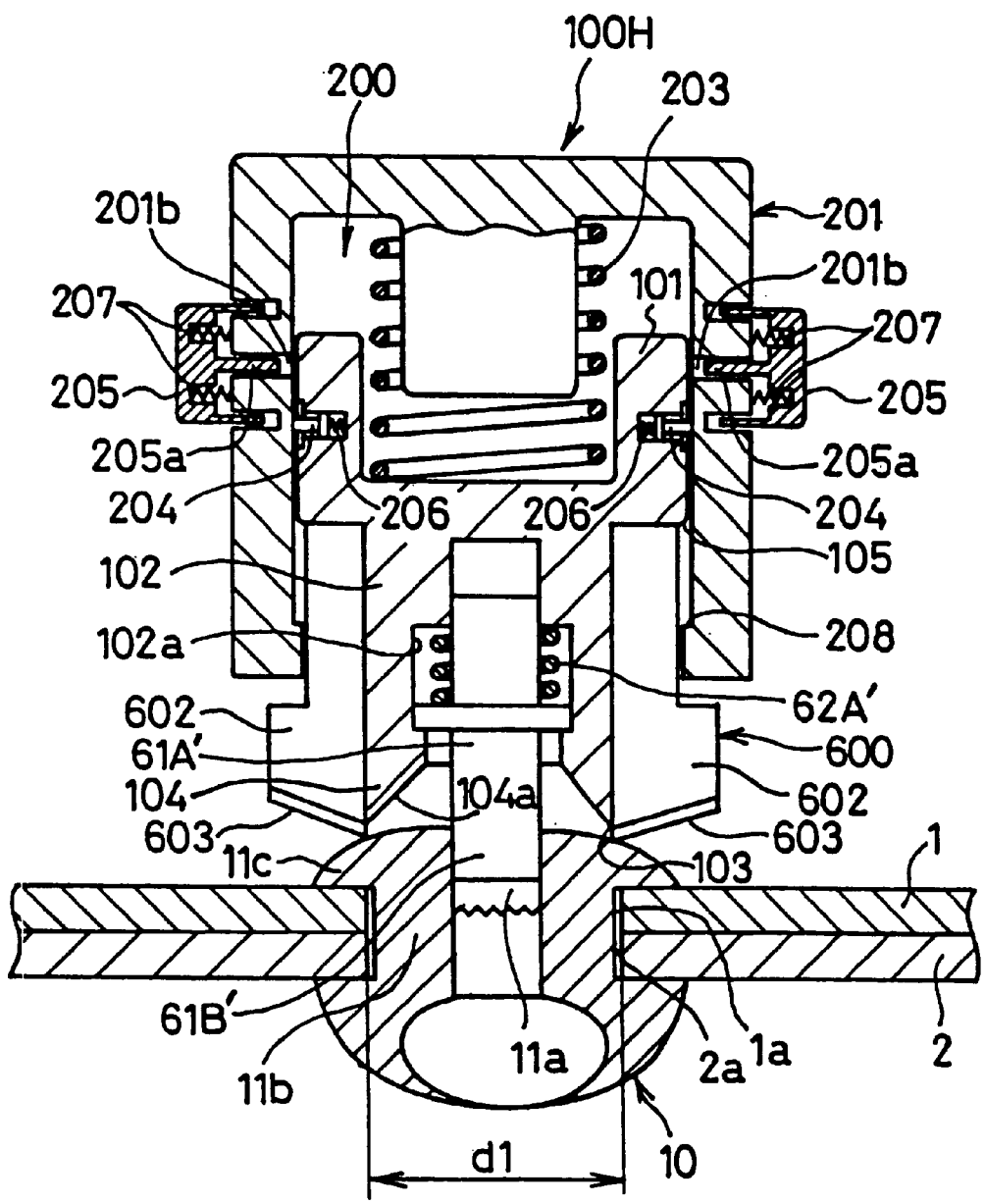
FIG. 57 is a cross-sectional view showing a schematic constitution of a dismounting device integral with a radial cutting blade according to a fourteenth embodiment of the present invention.

Example of a Dismounting Device for Radially Cutting an End of a Fastening Member and at the Same Time Cutting a Boundary Region FIG. 57 shows a dismounting device 100H for radially cutting an end of a fastening member and at the same time cutting a boundary region A, according to a fourteenth embodiment of the present invention. The dismounting device 100H is an improvement over the dismounting device 100G, in which the radial blade 602 is formed integrally with the outer peripheral portion of the cutting blade 102. A cutting blade positioning member 61A' is provided within a hollow portion 102a of the cutting blade 102, and the cutting blade positioning member 61A' is urged in the projecting direction by a coil spring 62A'. An extreme end 61B' of the cutting blade positioning member 61A' is fitted in the axial hole 11a.

According to the dismounting device 100H having the integral constitution of the cutting blade 102 and the radial cutting blade 600, the cylindrical cutting of the boundary region A between the body 11b and the head 11c of the blind rivet 1 by the cutting blade 102 and the radial cutting of the head 11c of the blind rivet 10 by the radial cutting blade 600 can be carried out substantially at the same time by a single cutting operation. Therefore, the operation of the dismounting device 100H is easy, and the time required for the dismounting work of the blind rivet 10 can be shortened.

Other constitutions of the dismounting device 100H are substantially the same as that of the dismounting device 100G, and the operation and effect thereof are also substantially the same, except for the cylindrical cutting of the boundary region A and the radial cutting of the head 11c and therefore, a detailed description is omitted here, but the same reference numerals have been given to the same constituent elements.

Figure 58:
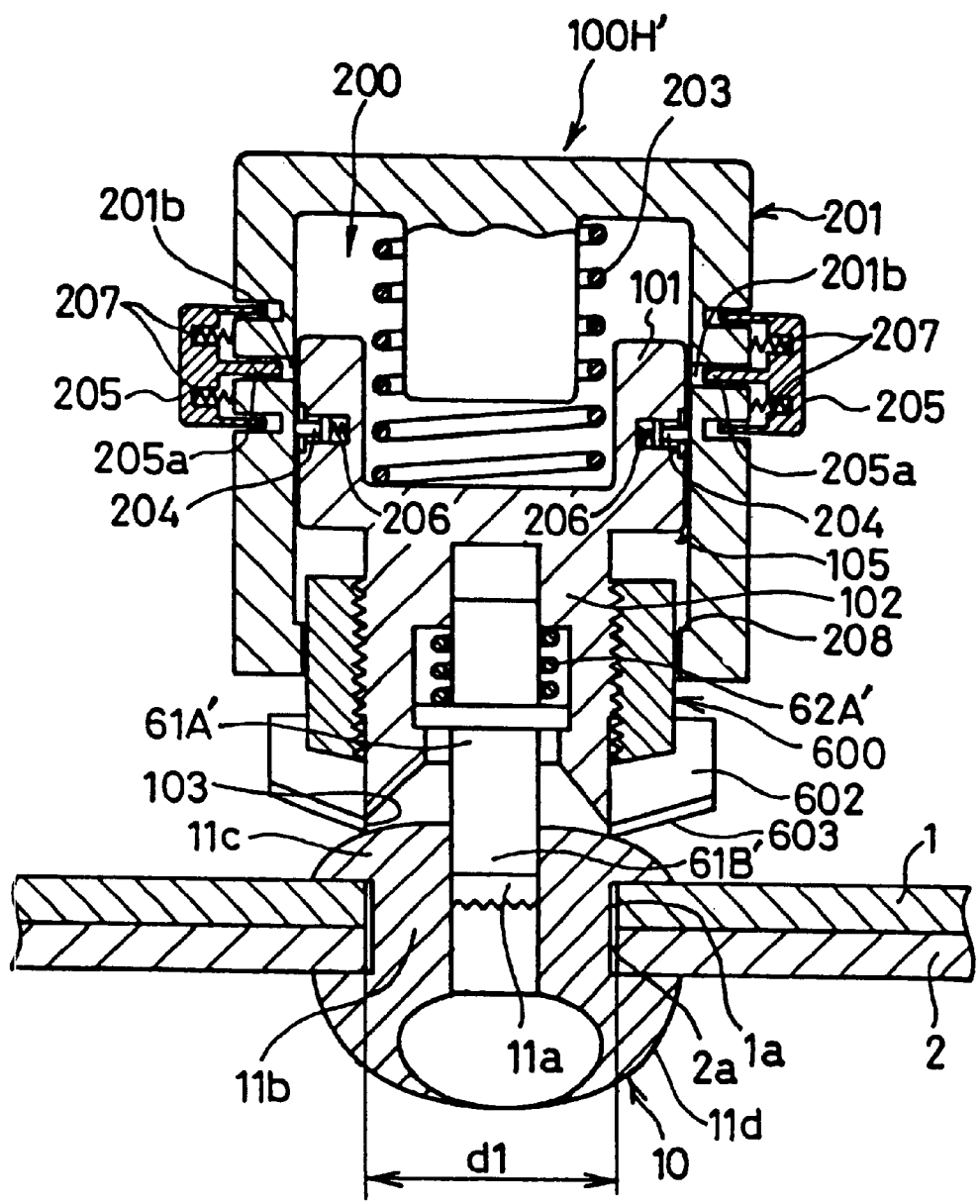
FIG. 58 is a cross-sectional view showing a schematic constitution of a dismounting device integral with a radial cutting blade according to a fifteenth embodiment of the present invention.

Preferably, the radial cutting blade 600 is adjustable in movement in the cutting direction with respect to the cutting blade 102. Referring to FIG. 58, in a dismounting device 100H', according to a fifteen embodiment of the present invention, the radial cutting blade 600 is threadingly engaged with the cutting blade 102, whereby the radial cutting blade 600 is adjustable in movement in the cutting direction with respect to the cutting blade 102.

According to the dismounting device 100H', for example, even in the case where a relative positional relationship, between the knife edges 103 and 603 in the cutting direction due to polishing of the knife edges 103 and 603 of the cutting blade 102 or the radial cutting blade 600, is changed, the radial cutting blade 600 is adjusted in movement along the cutting direction with respect to the cutting blade 102, whereby the relative positional relationship between the knife edges 103 and 603 in the cutting direction can be properly adjusted.

Further, the relative positional relationship between the knife edges 103 and 603 in the cutting direction can be changed so as to adapt to the dimensions of the boundary region A of the fastening member and the head 11c, without replacing the cutting blade 102 and the radial cutting blade 600.

Figure 59:
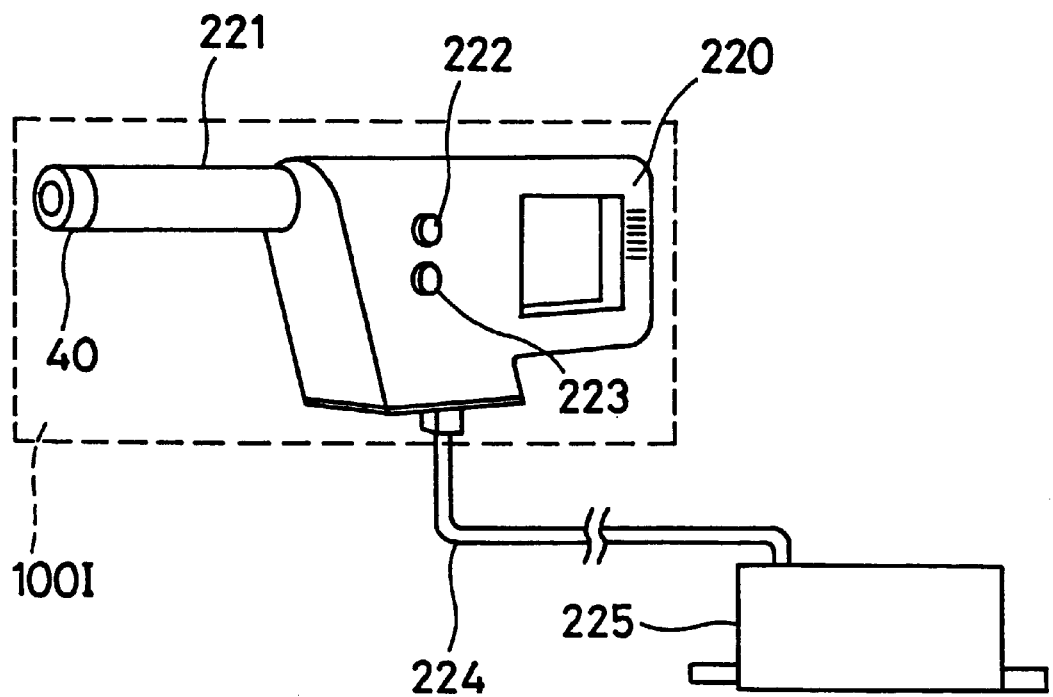
FIG. 59 is a perspective view showing a schematic constitution of a dismounting device having a hole forming means according to a sixteenth embodiment of the present invention.

Method for Opening Continuous Holes in the Head in Advance and Thereafter Cutting a Boundary Region A Between the Body and the Head FIG. 59 is a view showing a schematic constitution of a dismounting device 100I used for a method of opening continuous holes in the head in advance and thereafter cutting a boundary region A between the body and the head, according to a sixteenth embodiment of the present invention. The dismounting device 100I comprises a handle 220, a cylindrical construction 221, operating buttons 222, 223, etc. The dismounting device 100I is connected to a compressed air generator 225 and an air hose 224, and is operated by compressed air.

Figure 60:
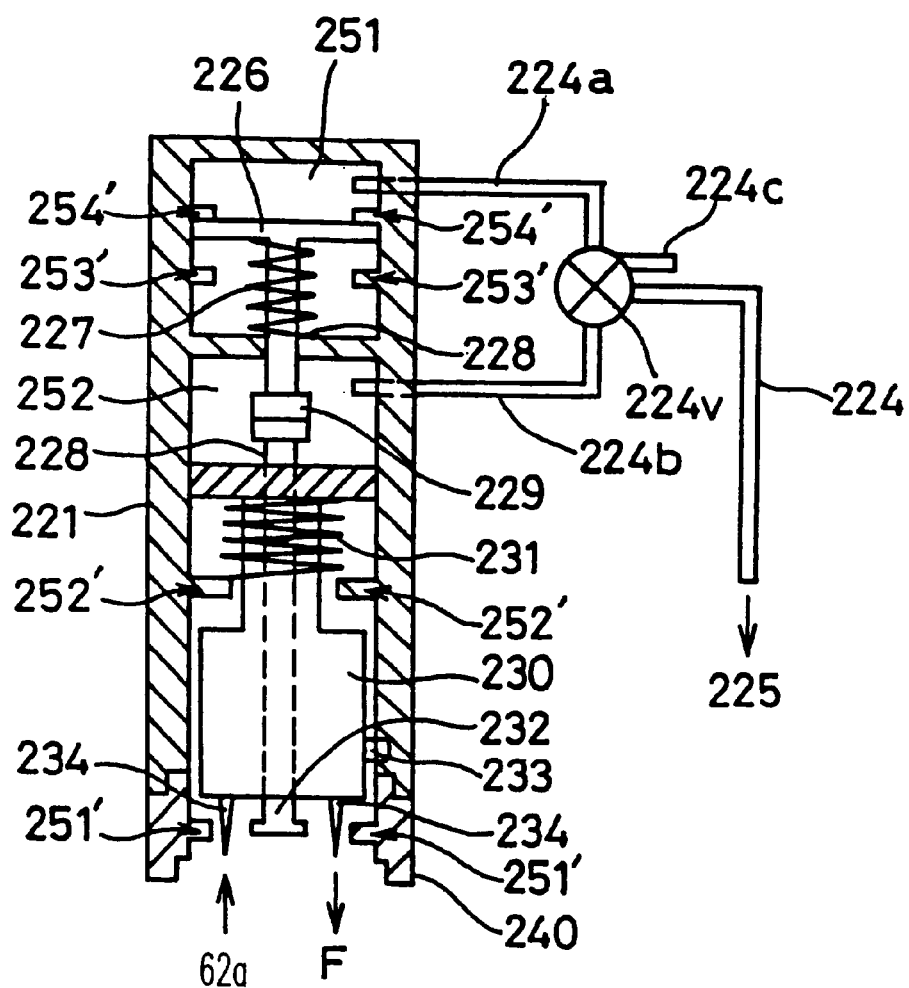
FIG. 60 is a cross-sectional view showing a detailed constitution of a cylindrical construction shown in FIG. 59.

FIG. 60 is a cross-sectional view showing the detailed configuration, of the cylindrical construction 221 of the dismounting device 100I. The cylindrical construction 221 includes pistons 226, 230, springs 227, 231, a packing 228, a united portion 229, a push rod 232, a projecting pin 233 secured to the piston 230, a needle-like member 234, and an attachment 240.

In the cylindrical construction 221, compressed air is supplied, by the switching operation of an air valve 224v, to piston chambers 251, 252 through air hoses 224a, 224b, respectively. The air valve 224v is disposed internally of the dismounting device 100I, and is interlocked with the operating buttons 222, 223 so that the operation thereof is switched.

The needle-like member 234 is formed at the extreme end of the piston 230. Preferably, the needle-like member 234 is not integral with the piston 230, but is replaceably mounted so as to be easily replaceable, when worn. The cylindrical construction 221 has an inner peripheral surface formed with a straight line-like groove and a spiral groove to be described in more detail below. The piston 230 is intermittently rotated at an equal angle when the projecting pin 233 moves along the straight line-like groove. This rotation will be described in more detail below.

FIG. 61(a) is an exploded perspective view, before assembly, of the united portion 229 between the piston 226 and the push rod 232. A spherical portion 235 is formed at the extreme end of the piston 226. The upper end of the push rod 232 is formed with a hemispheric hole 241, into which the spherical portion 235 of the piston 226 moves. In the state that the spherical portion 235 is within the hole 241, two joint members 236 are set so as to hold the upper part of the spherical portion 235. Thereafter, the joint members 236 and the push rod 232 are connected by a connecting plate 237 and a screw 238. Thereby, the piston 226 and the push rod 232 are rotatably connected. FIG. 61(b) shows the united portion 229, after assembly.

Figure 62A:
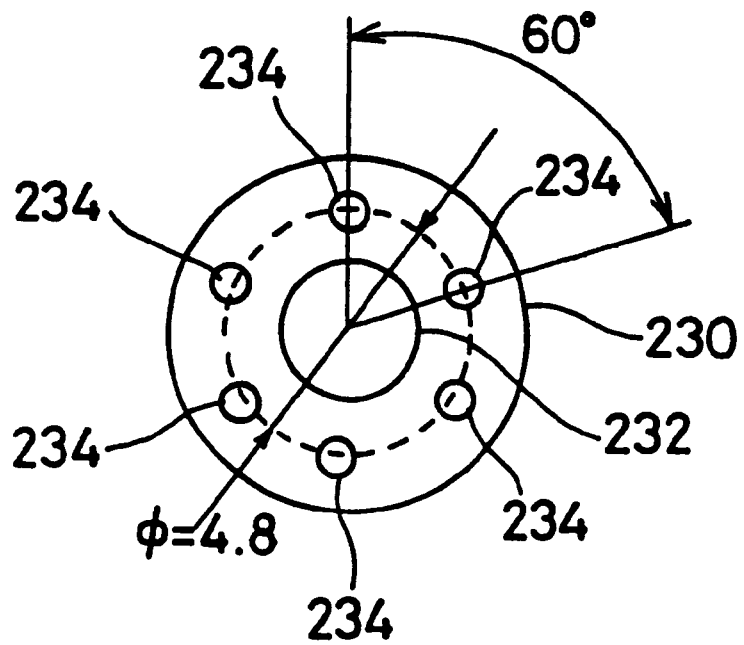

FIG. 62(a) shows the piston 230 and the needle-like member 234 in cross-section as viewed from the arrow 62(a) of FIG. 60. As shown in FIG. 62(a), six needle-like members 234 are provided at intervals of 60 degrees on a dashed circumferential line having a diameter $\phi$ of 4.8 mm, for example. Preferably, the needle-like members 234 are disposed so there are as many as possible, unless a restriction in terms of layout is present. The diameter d1 of the fastening hole 1a is 4.9 mm, and the diameter $\phi$ of the dashed circumferential line is smaller than the diameter d1 to thereby prevent the base material 1 from being damaged.

The operation of forming a plurality of holes in the head 11c of the fastening member by the dismounting device 100I will be described hereinafter.

First, when the operating button 222 is depressed, the compressed air enters the piston chamber 252 through the air hose 224b by the switching operation of the air valve 224v. Since the piston chamber 252 is sealed by the packing 228, the piston 230 is moved in the direction of arrow F in FIG. 60 by the force of the compressed air. The piston 230 impinges upon stoppers 251', 251' provided on the inner surface of the attachment 240 and stops.

Next, when the operation of the operating button 222 is released, the compressed air of the piston chamber 252 moves out of an exhaust port 224c through the air hose 224b by the switching operation of the air valve 224v. Accordingly, the piston 230 returns until it impinges upon the stoppers 252', 252' by the force of a spring 231. Next, the operation of intermittent rotation at an equal angle of the piston 230 will be described.

Figure 63:
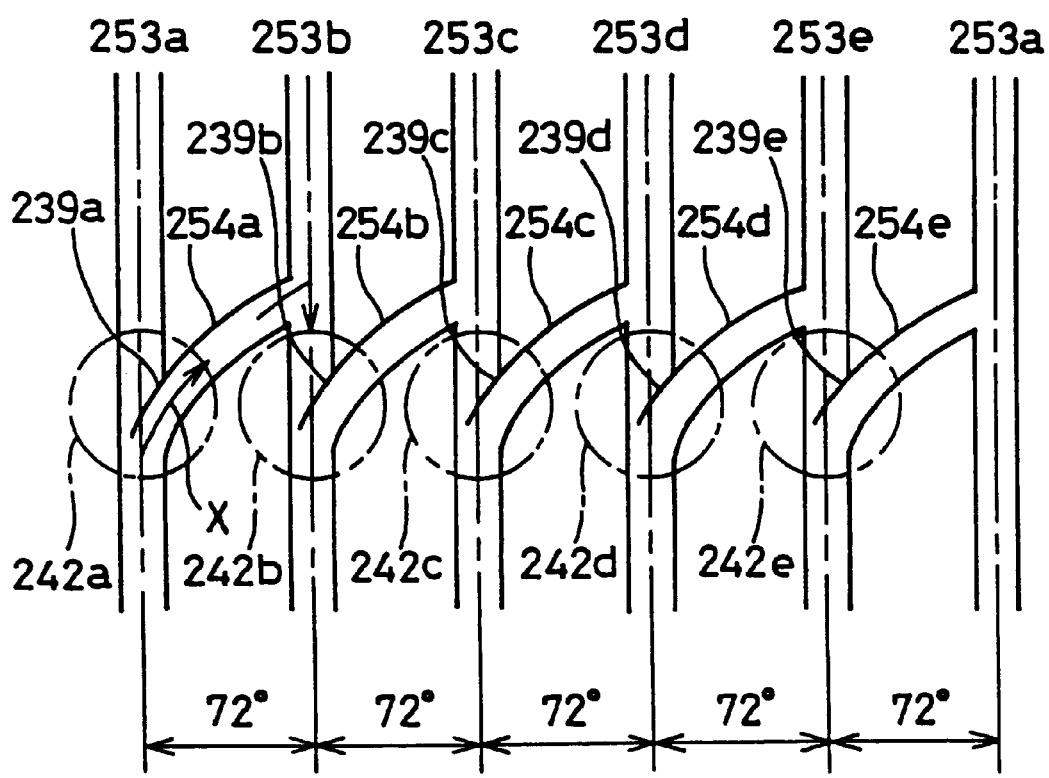
FIG. 63 is a cross-sectional view of the cylindrical construction shown in FIG. 60.

FIG. 63 is a cross-sectional view showing an internal surface developmental of the cylindrical construction 221. The cylindrical construction 221 is formed in its inner surface with grooves which are somewhat wider than the outside diameter of the columnar projecting pin 233, which is disposed on the outer peripheral surface of the piston 230.

That is, the cylindrical construction 221 is formed in its inner surface with five straight line-like grooves 253a to 253e at intervals of 72 degrees. The cylindrical construction 221 is formed with spiral grooves 254a to 254e in communication with the straight line-lie grooves 253a to 253e. Leaf springs 239a to 239e are disposed in branch points 242a to 242e between the straight line-like grooves 253a to 253e and the spiral grooves 254a to 254e. Since the projecting pin 233 is secured to the piston 230, when the projecting pin 233 moves along the straight line-like grooves 253a to 253e and the spiral grooves 254a to 254e, the piston 230 is rotated intermittently at an equal angle.

In the case where the arranging spacing of the needle-like member 234 is uniform, a suitable angle for the rotational angle of the piston 230 may be selected, if it is not an integer fold of the arranging angle of the needle-like member 234. When the rotational angle of the piston 230 is an integer fold of the angle of the needle-like member 234, a number of holes, corresponding in number to the needle-like members 234, cannot be bored.

Next, the operation in which the projecting pin 233 and the piston 230 move along the straight line-like grooves 253a and 253b will be described.

First, when the operating button 222 is depressed, air pressure is applied to the piston chamber 252 so that the piston 230 is moved straight along the straight line-like groove 253a. At that time, since the extreme end of the plate spring 239a is directed downwardly with respect to the direction in which the projecting pin 233 passes, it is elastically deformed in the direction for allowing the passage of the projecting pin 233.

Thereby, the projecting pin 233 passes through the branch point 242a as it is. The piston 230 impinges upon the stoppers 251', 251' in the inner surface of the attachment 240 and stops. When the operating button 222 is depressed, as described above, the piston 230 is not rotated, but moved straight.

Then, when the operation of the operating button 222 is released, the piston 230 is pushed back by the force of the spring 231. At that time, the passage of the projecting pin 233 is obstructed by the plate spring 239a, the projecting pin 233 moves in the direction of arrow X in FIG. 63, and the projecting pin 233 enters the spiral groove 254a. Since the projecting pin 233 is secured to the piston 230, the piston 230 is rotated along the spiral groove 254a. When the piston 230 is further pushed back, the projecting pin 233 enters the straight line-like groove 253a. By a series of operations as described, the piston 230 rotates only at an angle corresponding to the straight line-like grooves 253a and 253b. Every time the operation of the operating button 222 is repeated, the piston 230 rotates at 72 degrees when the former is extruded and returned, and the needle-like member 234, integral with the piston 230, rotates every 72 degrees.

Next, the operation of the push rod 232 for removing the body 11b and the head 11c of the fastening member from the base materials 1 and 2 will be described.

When the operating button 223 is depressed, the compressed air enters the piston chamber 251 through the air hose 224a by the switching operation of the air valve 224v. Thereby, the piston 226 is extruded in the direction of arrow F in FIG. 60. The piston 226 impinges upon the stoppers 251', 251' in the inner surface of the cylindrical construction 221 and stops. The piston 226 is connected to the push rod 232 which extends through the center portion of the piston 230 through the united portion 229. Accordingly, when the operating button 223 is depressed, the push rod 232 also moves in the direction of arrow F, while being operatively connected to the piston 226.

When the operation of the operating button 223 is released, the compressed air of the piston chamber 251 passes through the exhaust port 224c from the air hose 224a. Therefore, the piston 226 is returned to the position of the stoppers 251', 251' in the inner surface of the cylindrical construction 221 by the force of the spring 227. The push rod 232 is also operatively connected to the piston 226 and returned to its original position.

Since the air tightness is required for the push rod 232 and the piston 230, particularly on the side of the piston chamber 252, a packing 228, such as an O-ring, is disposed. The packing 228 should have a good air tightness with respect to the movement in the thrust direction in terms of the construction of the dismounting device 100I. However, the push rod 232 is rotatable along with the piston 230 via the united portion 229, since the force in the rotating direction is not applied to the packing 228, thus leading to the improvement of reliability of the packing 228.

Next, the dismounting of the blind rivet 10 using the dismounting device 100I will be described.

Figure 64:
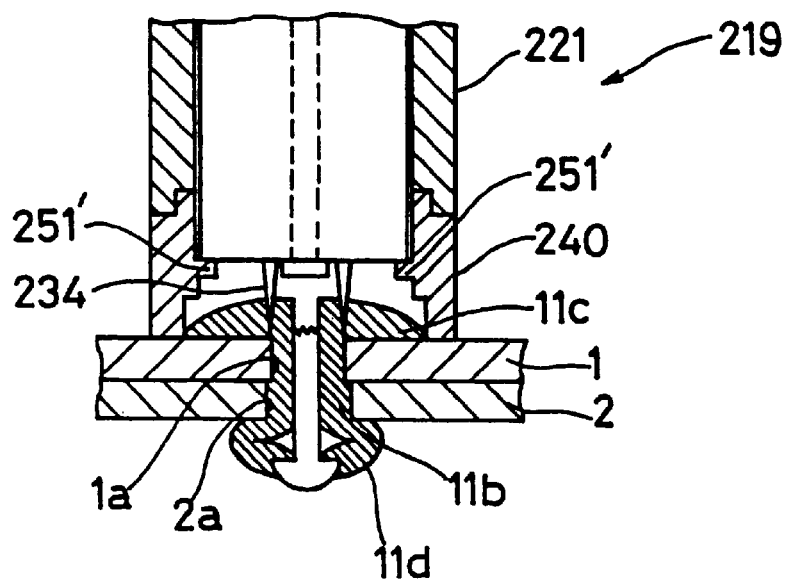
FIG. 64 is a partial cross-sectional view showing a state of being formed with a plurality of holes in a head by a needle-like member.

FIG. 64 shows the state that a plurality of holes are formed along the boundary region A between the head 11c and the body 11b by the needle-like member 234 of the dismounting device 100I. The inside diameter of an opening of the attachment 240 is, for example, 9.7 mm, which is slightly larger than the outside diameter 9.6 mm of the head 11c.

As shown in FIG. 64, the dismounting device 100I is set so that the head 11c is moved into the attachment member 240 by holding the attachment member 240 from the top. Thereafter, when the operating button 222 is depressed, six holes 243A are formed at evenly spaced intervals in the head 11c by the needle-like member 234. The needle-like member 234 extends through the head 11c, but since the stroke of the needle-like member 234 is controlled by the stopper 251', the base materials 1 and 2 are prevented from being damaged.

After a plurality of holes 243A have been formed by the first boring step, the operation of the operating button 222 is released. Then, the needle-like member 234 returns, while rotating 72 degrees. Thereafter, when the operating button 222 is further depressed, the needle-like member 234 forms a hole at a place deviated by 72 degrees from the place where the first plurality of holes were been formed. In this manner, the operation of the operating button 222 is repeated five times whereby a row of 30 continuous circumferential holes is formed in the head 11c.

Figure 65A:
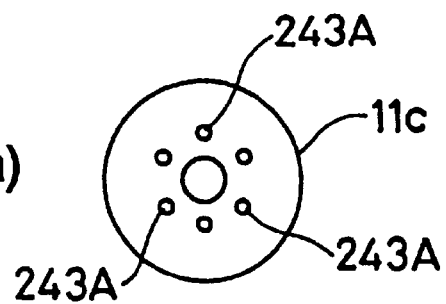
Figure 65B:
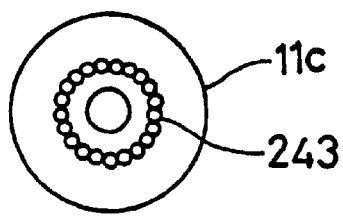

FIG. 65(a) shows the state that six holes 243A are formed in the head 11c by one operation of the operating button 222 of the dismounting device 100I, and FIG. 65(b) shows the state that a row of continuous holes 243 is formed in the head 11c by the repeated operation described immediately above.

Figure 66:
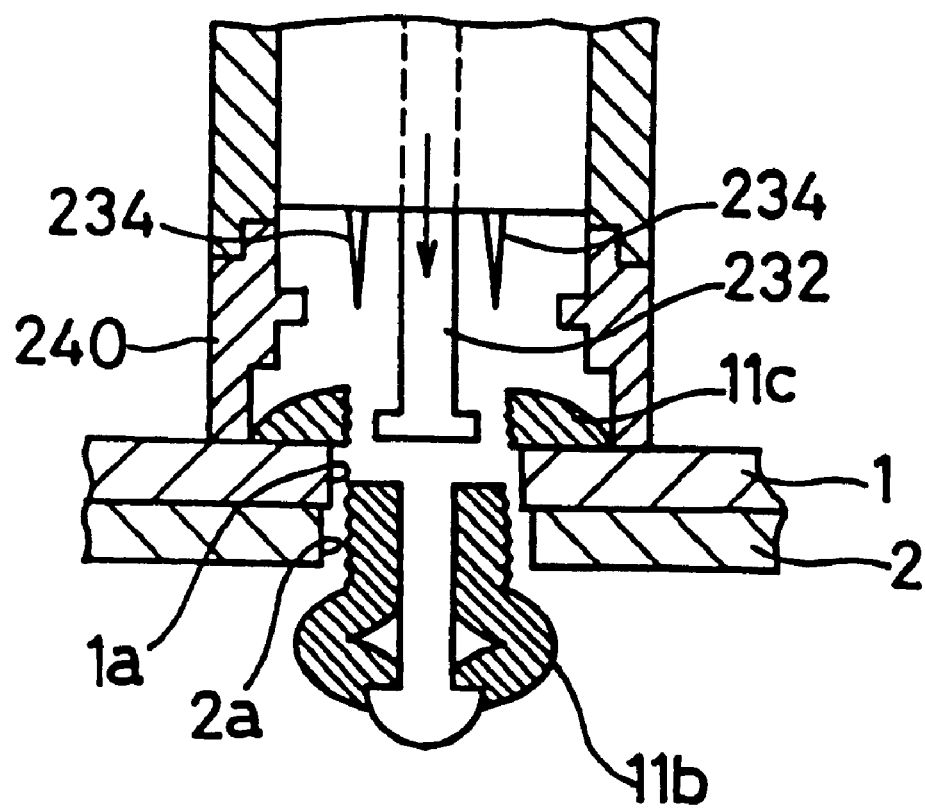
FIG. 66 is a partial cross-sectional view showing a state of removing the body from the fastening hole using the dismounting device shown in FIG. 59.

Next, the operation for removing the body 11b and the head 11c from the base materials 1 and 2 will be described. FIG. 66 shows the state that the body 11b is removed by the push rod 232 of the dismounting device 100I. When the operating button 223 is depressed after the row of holes 243A has been formed in the head 11c, the push rod 232 is extruded, and the body 11b is pressed. Then, the row of holes 243A is ruptured by the pressing force of the push rod 232 so that the head 11c and the body 11b are separated and removed. At that time, the circumference, comprising a row of holes 243A formed in advance, is ruptured, and the body 11b and the head 11c can be removed from the base materials 1 and 2 by a small pressing force.

Figure 62B:
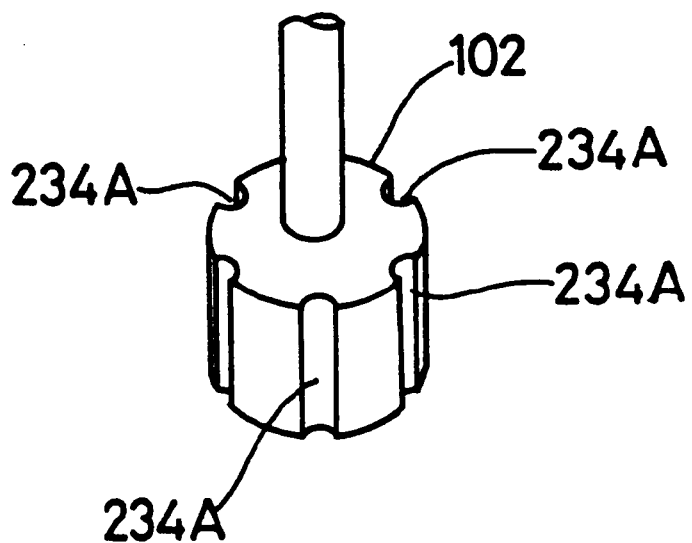

In the case of the dismounting device 100I, the cylindrical cutting blade 102, shown in FIG. 62(b), can be used in place of the push rod 132. The cutting blade 102 is formed in the outer peripheral portion with an escape groove 234A of the needle-like member 234 therearound. The escape groove 234A extends in the extending direction of the needle-like member 234. According to this arrangement, the boundary region A can be cut by the cutting blade 102 after the row of holes 243A has been formed.

While the head 11c and the body 11b are separated by the push rod 232, it is to be noted that, for example, the knife edge 103 of the cutting blade 102 of the dismounting devices 100A1 to 100A4 is placed on the circumferential line of the row of holes 243A, and the dismounting devices 100A1 to 100A4 can be used for dismounting. In this case, the cutting force applied to the dismounting devices 100A1 to 100A4 can be made small. Further, the configuration of the cylindrical construction 221 can be simplified by employing a portion which requires no piston 226 and push rod 232.

Example 1

Dismounting Device Capable of Relieving the Shock Applied to the Cutting Blade 102

Figure 67:
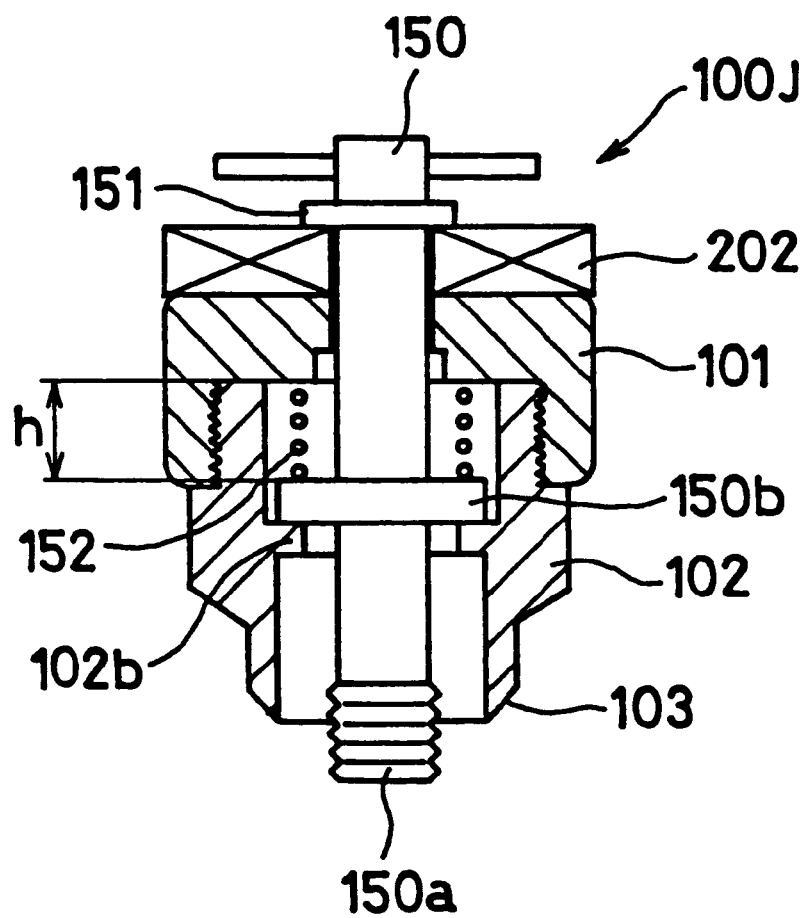
FIG. 67 is a cross-sectional view showing a schematic constitution of a dismounting device capable of relieving shocks applied to the cutting blade according to a seventeenth embodiment of the present invention.

FIG. 67 shows a cross-section of a schematic constitution of a dismounting device 100J capable of relieving the shock applied to the cutting blade 102, according to a seventeenth embodiment of the present invention. This dismounting device 100J is an improvement over the dismounting device 10A1. The dismounting device 100J comprises a cutting blade 102, a cutting force applying member 202, a tapping member 150, and a holding force applying member 151.

The cutting blade 102 moves forward and backward along the axial direction of the body 11b and the head 11c of the blind rivet 10 to cut the body 11b and the head 11c. The cutting force applying member 202 applies the cutting force for cutting the body 11b and the head 11c of the blind rivet 10 using the cutting blade 102. The tapping member 150 is provided with a tapping portion 150a, wherein the axial hole 11a of the blind rivet 10 is tapped into threaded engagement with the tapping portion 150a of the tapping member 150. When the cutting force is applied by the cutting force applying member 202, the holding force applying member 151 applies the holding force for locking the blind rivet 10, against the cutting force, to the tapping member 150 having the tapping portion 150a, which is in threaded engagement with the axial hole 11a.

The cutting blade 102 of the dismounting device 100J is threadingly engaged with the dismounting device body 101 so that the axial center thereof coincides with the axial center of the tapping member 150, and is slidable with respect to the tapping member 150.

A spring 152 is interposed between the dismounting device body 101 and the tapping member 150. The tapping portion 150a of the tapping member 150 is projected and amount from the knife edge 103 of the cutting blade 102 by the force of the spring 152. The projecting amount, of the tapping portion 150a from the knife edge 103, is controlled by the contact of an inward flange 10b, provided on the cutting blade 102, with the brim 150b formed integrally with the middle part of the tapping member 150.

The cutting force applying member 202 is operated by a driving source of air or oil pressure to apply the fixed cutting force of the cutting blade 102. The cutting force applying member 202 of the dismounting device 100J is operated between the dismounting device body 101 and the holding force applying member 151, whereby the cutting blade 102 and the tapping member 150 are relatively moved against the force of the spring 152.

Figure 68A:
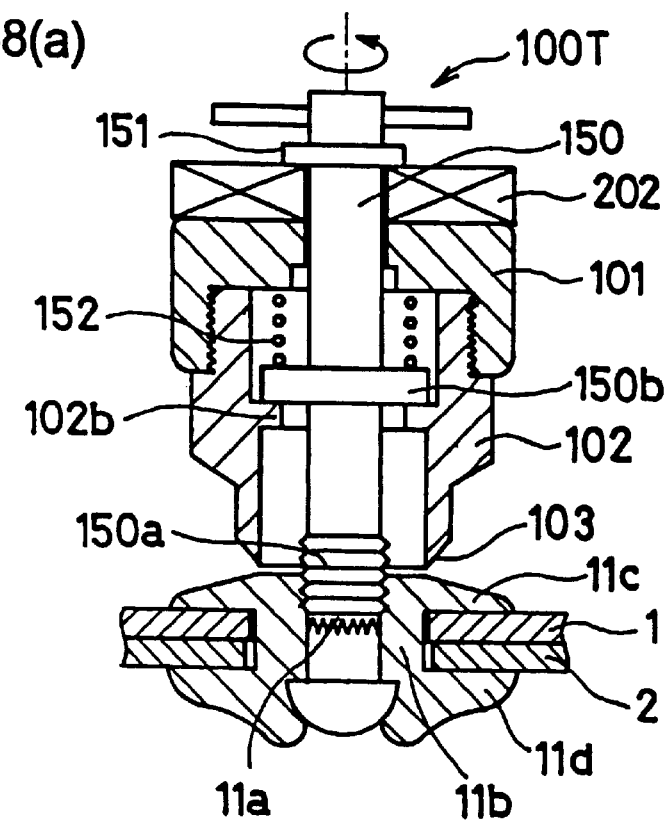

The blind rivet 10 is dismounted using the dismounting device 100J in a procedure as will now be described. First, as shown in FIG. 68(a), the tapping member 150 is rotated in the fixed direction, and the tapping portion 150a is threadingly engaged with the axial hole 11a, while tapping the axial hole 11a by the tapping portion 150a. In the state that the tapping portion 150a is threadingly engaged with the axial hole 11a, the cutting force applying member 202 is operated to apply the cutting force of the cutting blade 102.

Thereby, the cutting blade 102 and the tapping member 150 are moved relative to each other against the resilient force of the spring 152. Since the tapping member 150 is threadingly engaged with the blind rivet 10, the holding force for holding the blind rivet 10 is applied to the tapping member 150 by the holding force applying member 151 against the cutting force applied by the cutting force applying member 202.

Figure 68B:
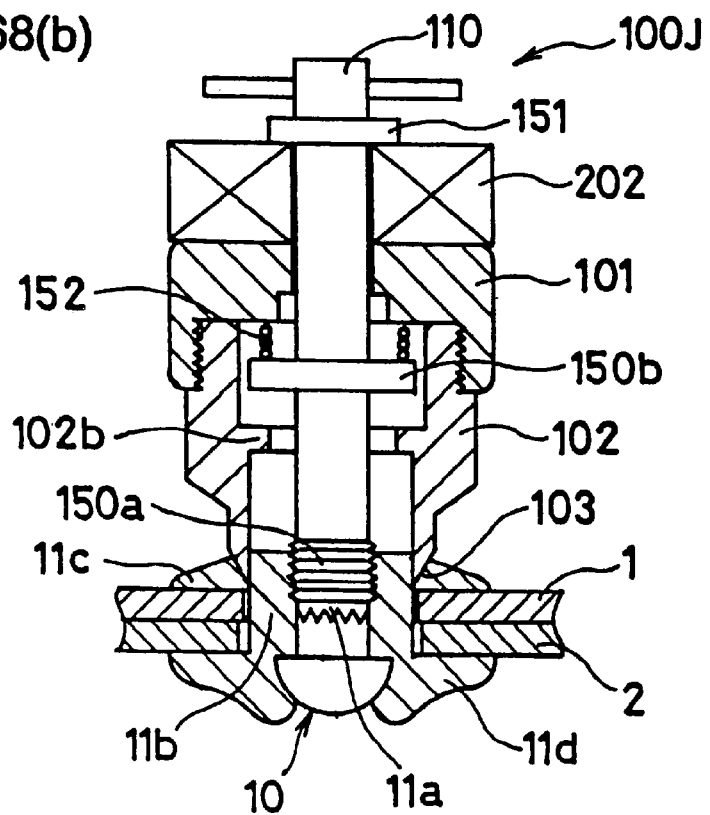

As a result, the cutting blade 102 bites into the head 11c along the boundary region A, in the axial direction of the body 11b, between the body 11b and the head 11c, as shown in FIG. 68(b). Thereby, in the state that the blind rivet 10 is held on the tapping member 150, the body 11b and the head 11c are cut by the cutting blade 102 to make the base materials 1, 2 and the blind rivet 10 separable.

According to the dismounting device 100J, as described above, in the state that the blind rivet 10 is pulled toward the cutting blade 102, the knife edge 103 of the cutting blade 102 is moved linearly along the axial direction of the body 11b of the blind rivet 10 to cut the body 11b and the head 11c, thus relieving the shock applied to the base materials 1 and 2. When dismounting the blind rivet 10 from the base materials 1 and 2, the idle-running of the blind rivet 10 and the damage of the base materials 1 and 2 caused by the idle-running can be prevented. Thereby, the head 11c and the body 11b can be cut easily by the single operation.

Further, when the blind rivet 10 is cut, the head 11c or the body 11b need not be locked by means of gripping the blind rivet 10 with a plier or a pair of cutting pliers. Therefore, even if the blind rivet 10 cannot be gripped by a gripping tool, the blind rivet 10 can be cut relatively easily.

In particular, according to the dismounting device 100J, in the state that the blind rivet 10 is locked by the tapping portion 150a, the body 11b and the head 11c are cut by the cutting blade 102. Therefore, the base materials 1 and 2 are not deformed by the cutting force, when the cutting blade 102 bites into the head 11c. That is, it is possible to prevent the base materials 1 and 2 from being damaged by shock, during cutting.

Further, the blind rivet 10 is locked by the tapping member 150, whereby a great cutting force can be applied by the cutting blade 102, when cutting, so that the blind rivet 10 can be cut positively.

Further, in the dismounting device 100J, the cutting blade 102 is threadingly engaged with the dismounting device body 101. Thereby, the parting distance h, between the upper surface of the brim 150b of the tapping member 150 and the lower surface of the dismounting device body 101, can be changed, and the relative positional relationship, between the tapping member 150 and the cutting blade 102, can be adjusted. Accordingly, the distance the knife edge 103 bites, with respect to the head 11c, can be adjusted.

Preferably, the biting distance of the knife edge 103 with respect to the head 11c is adjusted so that the movement of the cutting blade 102 is controlled in the state that the knife edge 103 of the cutting blade 102 arrives at the separating and rupturing place between the head 11c and the base material 1, as shown in FIG. 68(b). By adjusting the biting distance of the knife edge 103 with respect to the head 11c as described above, the cutting stroke of the cutting blade 102, when the blind rivet 10 is cut, can be made constant, and therefore the body 11b and the head 11c can be separated positively. Further, the damage of the base material 1 caused by an overstroke can be avoided positively.

When the knife edge 103 of the cutting blade 102 arrives at the separating and rupturing place between the head 11c of the blind rivet 10 and the base material 1, either the head 11c and the body 11b are completely separated, or the head 11c and the body 11b are connected with only a minor wall-thickness portion left.

Further, since the dismounting device 100J is constituted so that the axial center of the cutting blade 102 coincides with the axial center of the tapping member 150, the positional relationship between the cutting blade 102 and the head 11c, when the blind rivet 10 is cut, is always maintained constant. Thereby, the knife edge 103 of the cutting blade 102 can be positively located on the head 11c, without involving situations where the axial center of the cutting blade 102 is deviated from the axial center of the head 11c, and the biting direction of the cutting blade 102 is inclined with respect to the axial direction of the fastening holes 1a and 2a of the base materials 1 and 2, respectively.

Accordingly, the dismounting device 100J does not have the drawback that when the cutting blade 102 bites into the head 11c, the position between the knife edge 103 and the head 11c is deviated so that the head 11c cannot be cut accurately or the knife edge 103 bites into the base material side to damage the base material 1.

Further, in the dismounting device 100J, the tapping member 150, for holding the blind rivet 10 at the time of cutting, also functions as a cutting blade positioning means of the cutting blade 102 with respect to the blind rivet 10, thus making it unnecessary to provide a positioning member as an independent part to simplify the dismounting device.

Example 2

Dismounting Device Capable of Relieving the Shock Applied to the Cutting Blade 102

Figure 69A:
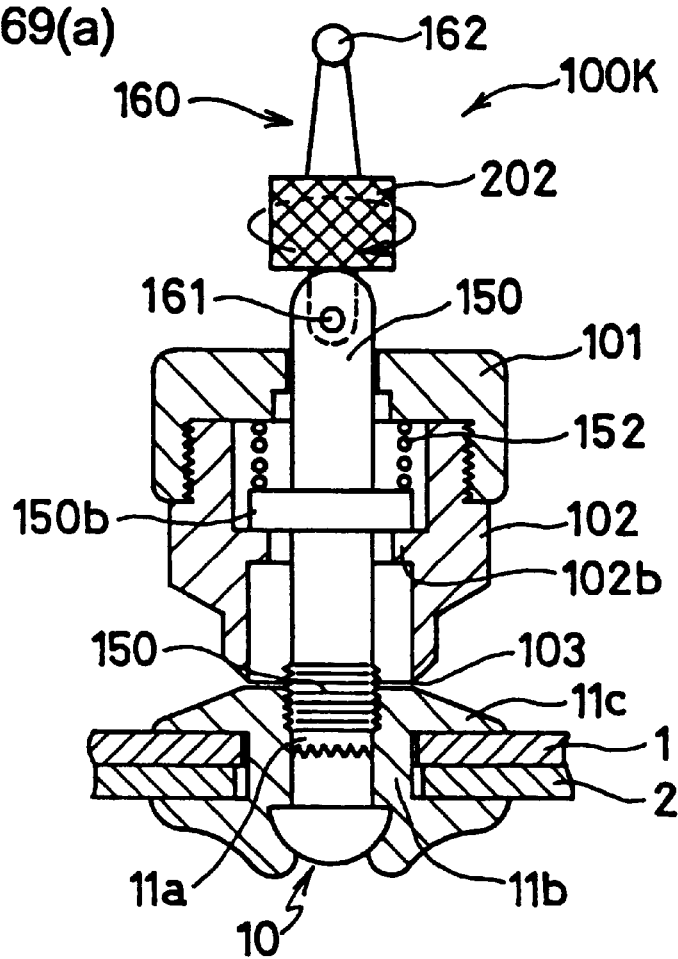

FIGS. 69(a) and (b) show a constitution of a dismounting device 100K capable of relieving the shock applied to the cutting blade 102, according to an eighteenth embodiment of the present invention. This dismounting device 100K is an improvement over the dismounting device 100J. In FIGS. 69(a) and (b), the same reference numerals are given to the same elements as those of the dismounting device 100J, and a detailed description of which is omitted here.

In the dismounting device 100K, the cutting force applying member 202 applies the cutting force of the cutting blade 102 by turning the pivotal lever 160, and a support shaft 161 of the pivotal lever 160 is pivotally supported on the tapping member 150 to serve as a fulcrum point. Additionally, a free end 162 of the pivotal lever 160 serves as a point of force. In other words, the cutting force applying member 202 makes use of the principle of a lever to apply the cutting force. The cutting force applying member 202 also functions as a holding force applying member.

According to the dismounting device 100K, the axial hole 11a is tapped by the tapping portion 150a of the tapping member 150, similarly to the dismounting device 100J. Thereby, the tapping portion 150a is threadingly engaged with the axial hole 11a, as shown in FIG. 69(a).

Next, in this state, the pivotal lever 160 is turned in the direction of applying the cutting force of the cutting blade 102, with the support shaft 161 serving as a support point and the free end 162 of the pivotal lever 160 serving as the point of force.

Figure 69B:
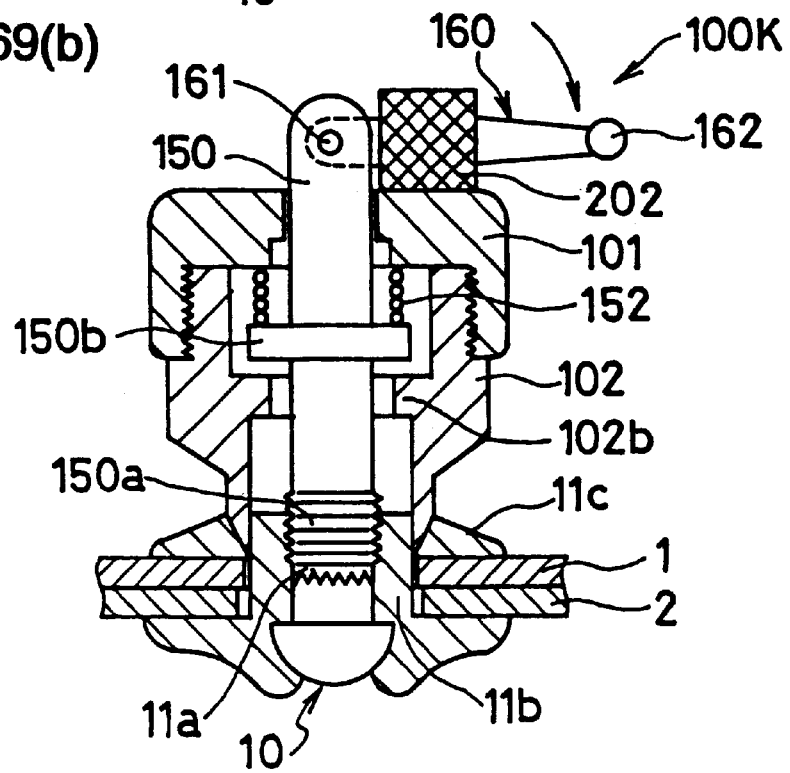

Thereby, as shown in FIG. 69(b), the cutting force applying member 202, as the action point of the pivotal lever 160, comes in contact with the upper surface of the dismounting device body 101, and pressure applied to the free end 162 (point of force) increases, due to the principle of a lever, to apply the cutting force of the cutting blade 102.

Thereby, the cutting blade 102 bites into the head 11c along the boundary region A in the axial direction of the body 11b, between the body 11b and the head 11c. At this time, by the biting of the cutting blade 102 into the head 11c, the reaction of the cutting force, applied by the cutting force applying member 202, is exerted on the support shaft 161 of the pivotal lever 160. The holding force for holding the blind rivet 10 is applied to the tapping member 150, against the cutting force applied of the cutting blade 102, by the reaction exerted on the support shaft 161 of the pivotal lever 160. Accordingly, the body 11b and the head 11c are cut in the state that the blind rivet 10 is held on the tapping member 150.

As described above, according to the dismounting device 100K, merely by the operation for turning the pivotal lever 160, a great cutting force can be applied by the cutting blade 102, and the holding force can be applied to the tapping member 150, thus requiring no large-scaled driving source, such as, for example, air or oil pressure, to enable the provision of a dismounting device which is simple in constitution and easy in handling.

Example 3

Dismounting Device Capable of Relieving the Shock Applied to the Cutting Blade 102

Figure 70A:
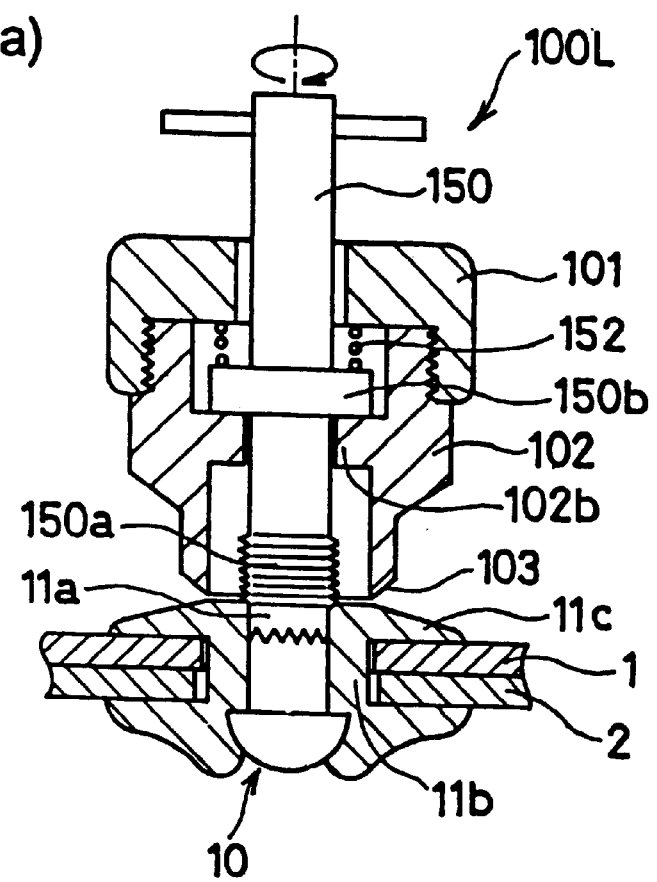

FIGS. 70(a) and (b) show a dismounting device 100L capable of relieving the shock applied to the cutting blade 102, according to a nineteenth embodiment of the present invention. The dismounting device 100L is an improvement over the dismounting device 100J. In FIGS. 70(a) and (b), the same reference numerals are given to the same elements as those of the dismounting device 100J, and a detailed description of which is omitted here.

In the dismounting device 100L, the cutting force applying member and the holding force applying member are operatively connected to the tapping operation of the tapping member 150, wherein the dismounting device 100L includes the brim 150b of the tapping member 150, acting as a cutting blade pressing means for pressing the cutting blade 102 in the axial direction of the body.

That is, according to the dismounting device 100L, first, the tapping portion 150a is threadingly engaged with the axial hole 1a, while tapping the axial hole 11a by the tapping portion 150a, as shown in FIG. 70(a), similarly to the dismounting device 100J.

Figure 70B:
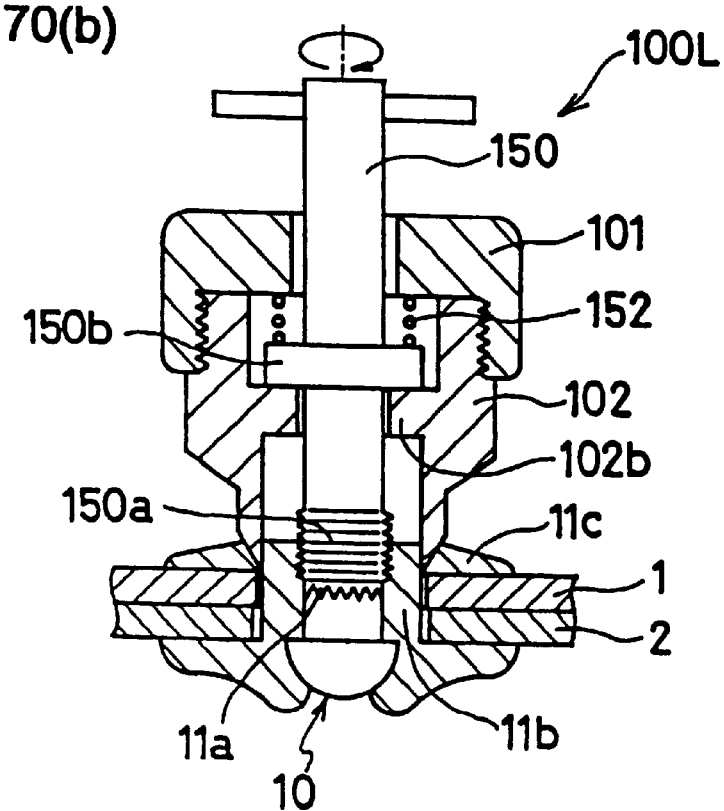

At that time, the upper surface of the inward flange 102b of the cutting blade 102 is pressed by the brim 150b of the tapping member 150, as shown in FIG. 70(b), in association with the tapping operation of the axial hole 11a by the tapping portion 150a. Thereby, the knife edge 103 bites along the axial direction of the body 11b, between the body 11b and the head 11c to cut the body 11b and the head 11c.

As described above, according to the dismounting device 100L, the cutting force is applied by the cutting blade 102 in association with the tapping operation of the tapping portion 150a. Thereby, the tapping operation of the axial hole 11a by the tapping member 150 and the cutting operation of the body 11b and the head 11c by the cutting blade 102 can be carried out simultaneously. Accordingly, it is possible to save the time and labor required for the cutting work of the body 11b and the head 11c of the blind rivet 10.

Example 4

Dismounting Device Capable of Relieving the Shock Applied to the Cutting Blade 102

Figure 71:
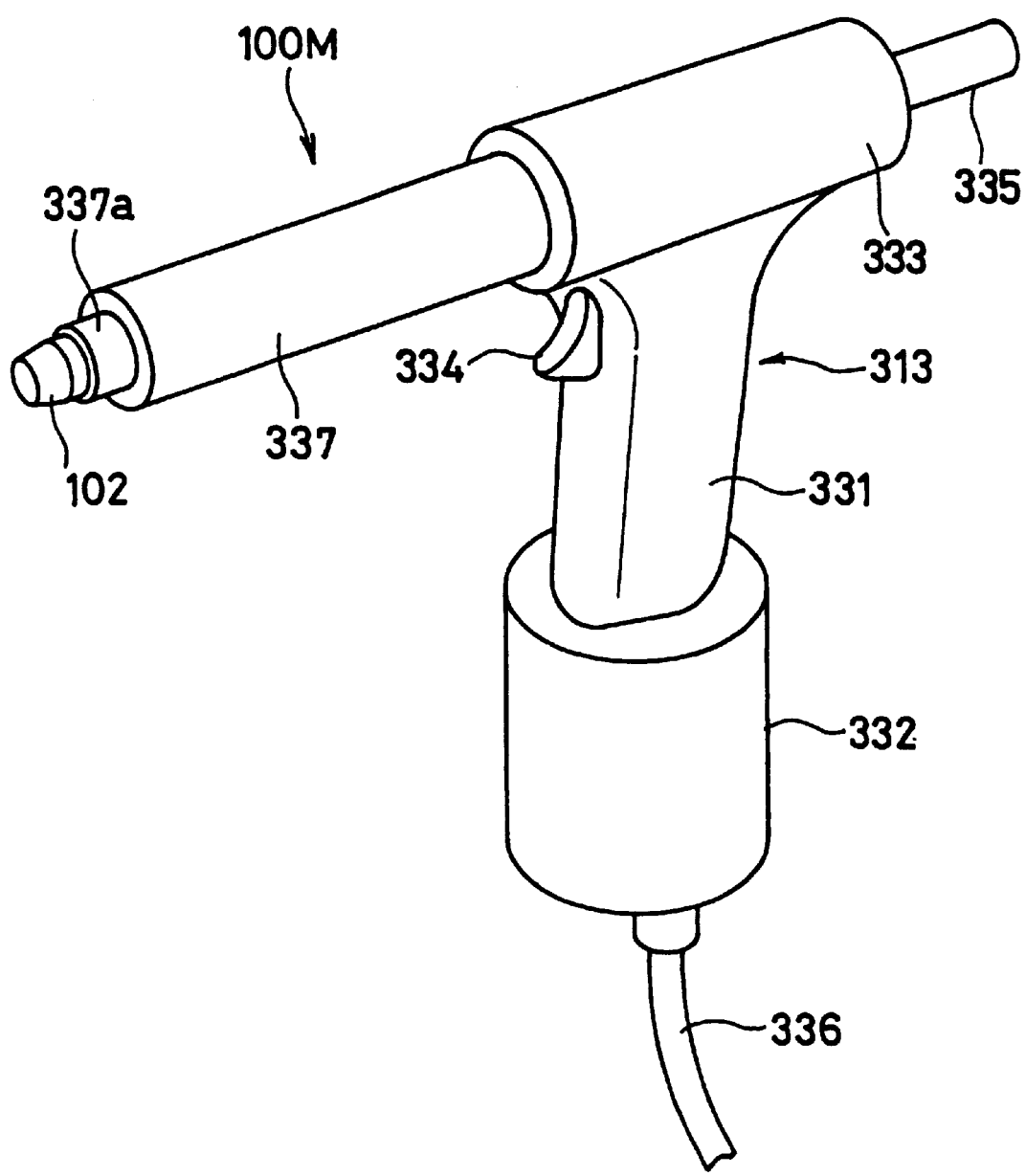
FIG. 71 is a perspective view of a dismounting device capable of relieving shocks applied to a cutting blade according to a twentieth embodiment of the present invention.

FIG. 71 shows a dismounting device 100M capable of relieving the shock applied by the cutting blade 102, according to a twentieth embodiment of the present invention.

The dismounting device 100M can use the existing rivet fastening device 13, without modification.

Figure 72:
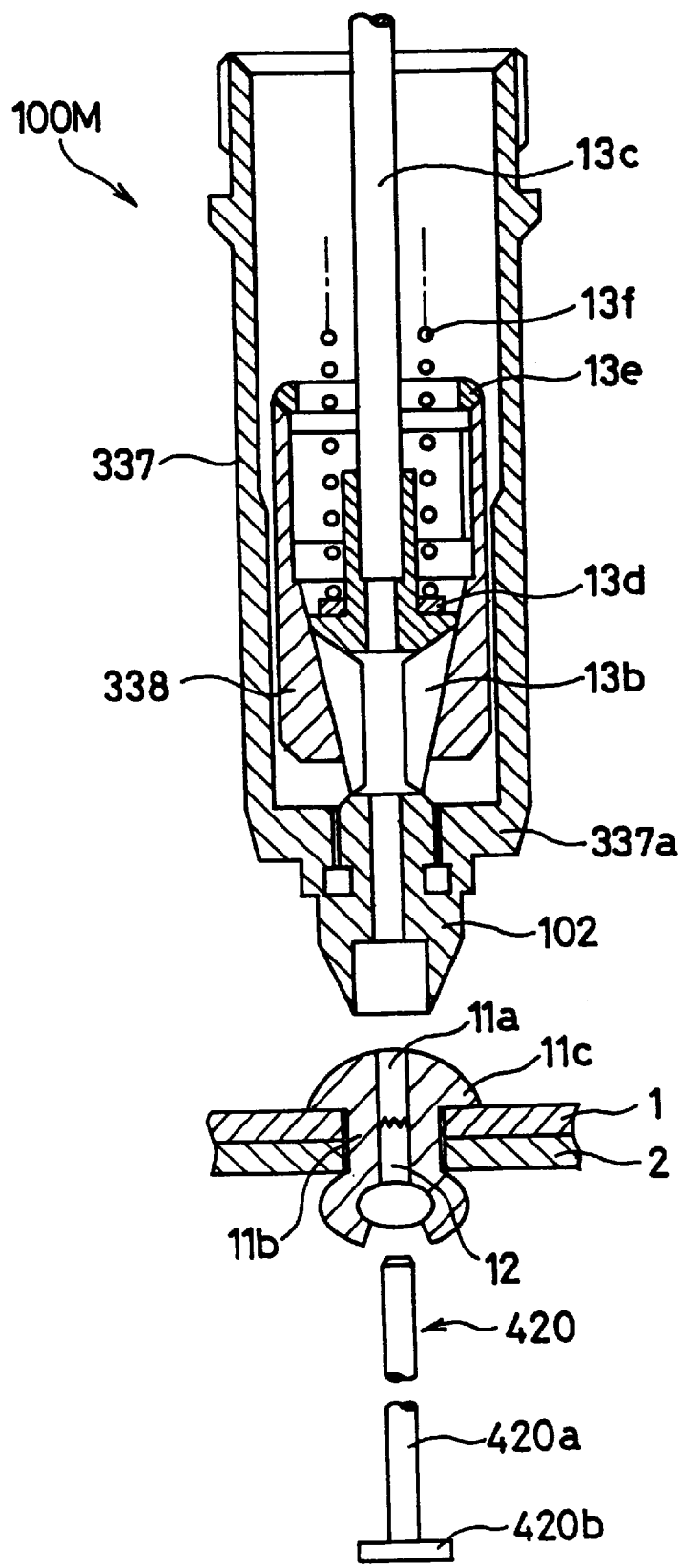
FIG. 72 is a cross-sectional view showing a schematic constitution of a nose casing shown in FIG. 71.
Figure 95A:
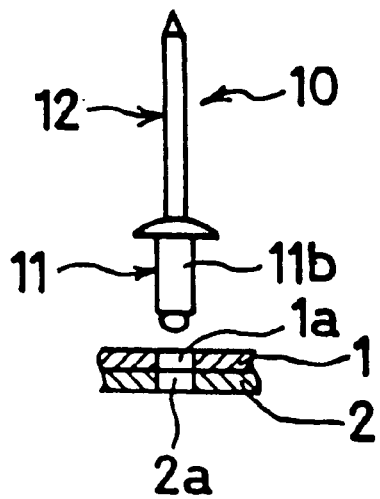
Figure 95B:
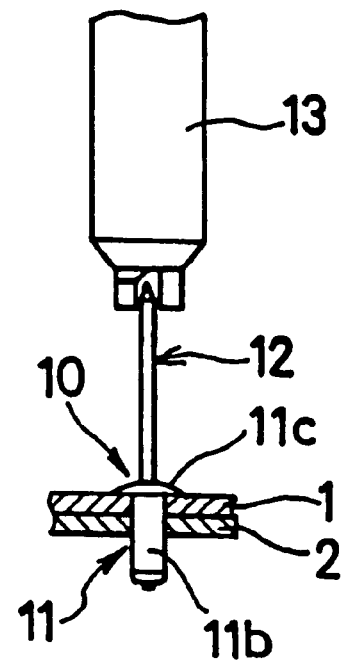
Figure 95C:
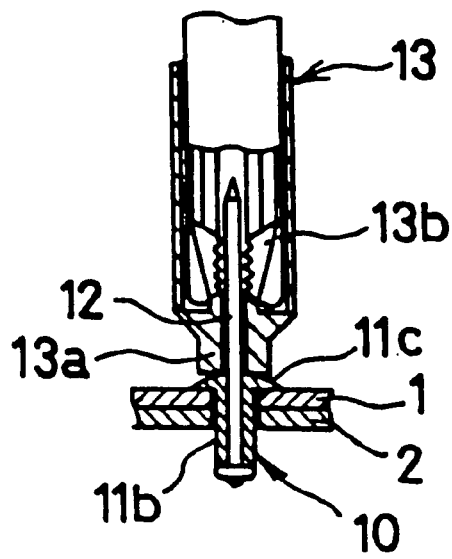
Figure 95D:
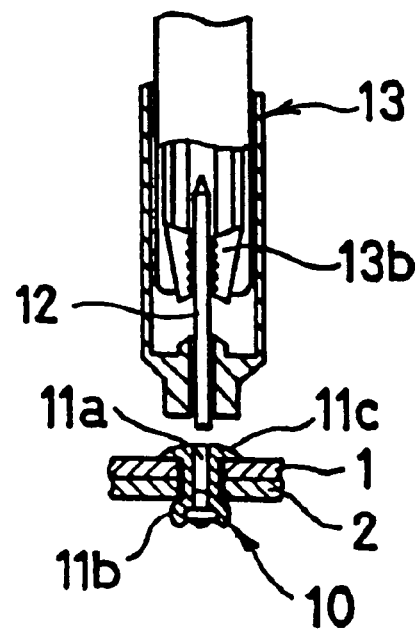
Figure 96:
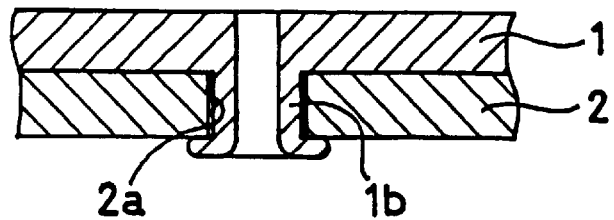
FIG. 96 is a partial cross-sectional view showing a conventional burr caulking.
Figure 97:
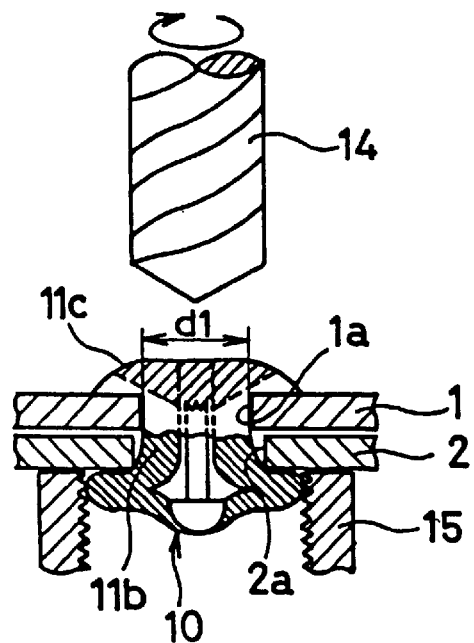
FIG. 97 is a partial cross-sectional view showing a state of cutting the head via a conventional drill to dismount the fastening member.
Figure 98:
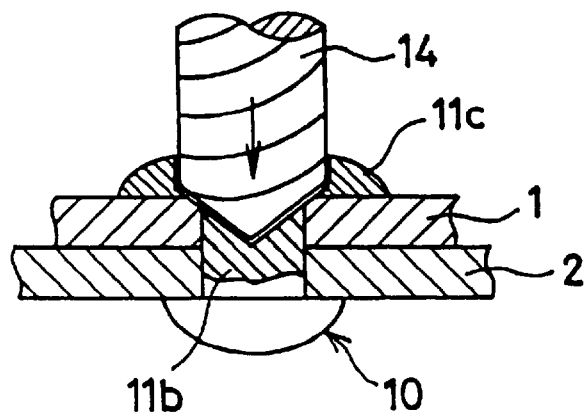
FIG. 98 is a partial cross-sectional view for explaining the drawbacks of a conventional dismounting method using a drill.

That is, the rivet fastening device 13 is of a pistol type in which a handle portion 331 is provided, for example, as shown in FIG. 71. The handle portion 331 is provided with an air valve 332, an air cylinder 333, a trigger 334, an adjusting knob 35. The air cylinder 333 is provided with a nose casing 337. A jaw housing 338 is housed in the nose casing 337 so as to be capable of being moved forward and backward, as shown in FIG. 72. A jaw 13b is disposed in the jaw housing 338, the jaw 13b being for pulling a mandrel 12 of the blind rivet 10. A jaw spreader 13c, a buffer member 13d, a locking ring 13e, a spring 13f are also disposed in the jaw housing 338. A nose piece 13a is provided on a tool end 337a of the nose casing 337 (see FIG. 95(c)).

Figure 73A:
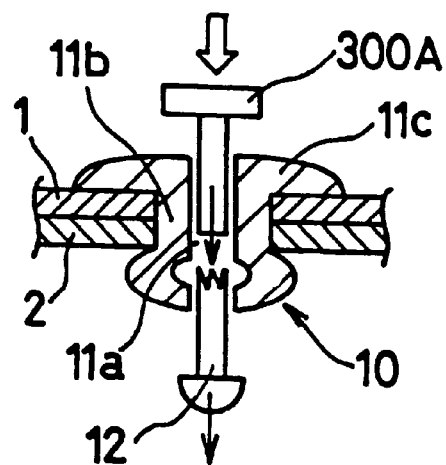

In the case where the blind rivet fastening device 13 is used as the dismounting device 100M, the nose piece 13a, mounted on the tool end 337a of the blind rivet fastening device 13, is removed. In place of the nose piece 13a, the cutting blade 102, for cutting the head 11c from the body 11b, along the axial direction of the body and the head 11c, is mounted on the tool end 337a, as shown in FIGS. 72, and 73(a) and (b).

Figure 73B:
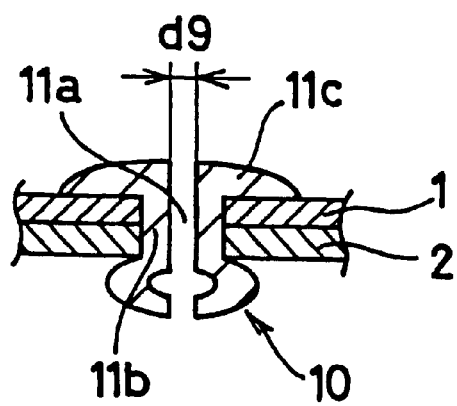

The blind rivet 10, fastened to the base materials 1 and 2 as shown in FIG. 72, is dismounted using the dismounting device 100M as follows. First, as shown in FIG. 73(a), a knock pin 300A, having a diameter capable of being inserted into the axial hole 11a, is inserted into the axial hole 11a from the head 11c side, and the head of the knock pin 300A is knocked to remove the mandrel 12, remaining in the axial hole 11a, from the body 11b, as shown in FIG. 73(b). A pull pin 420, to be described in more detail below, may be used in replace of the knock pin 300A.

Figure 73C:
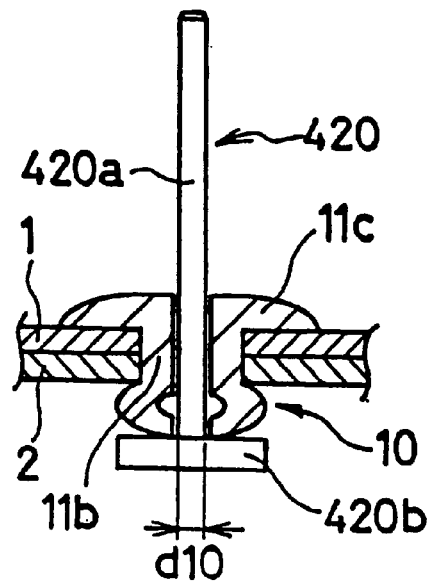

Thereafter, a pull pin 420 is inserted, from the side of a plastically deformed portion (caulked portion) 11d, into the axial hole 11a, from which the mandrel 12 is removed, as shown in FIG. 73(c). The extreme end of the pull pin 420 projects from the head 11c. The pull pin 420 has a shaft portion 420a. The outside diameter d10 of the shaft portion 420a of the pull pin 420 is smaller than the diameter d9 (see FIG. 73(b)) of the axial hole 11a of the body 11b of the blind rivet 10. A flange-like rivet contact portion 420b is formed integrally with the shaft portion 420a of the pull pin 420. The rivet contact portion 420b is shown as having a disk shape, but the shape of the rivet contact portion 420b is not limited thereto.

Next, as shown in FIG. 74(a), the cutting blade 102 is placed in pressure contact with the head 11c. The extreme end of the shaft portion 420a of the pull pin 420, which projects from the head 11c, is gripped by the jaw 13b of the rivet fastening device 13 so that the rivet contact portion 420b of the pull pin 420 comes in contact with the caulked portion 11d of the body 11b.

In the state shown in FIG. 74, the trigger 334 of the rivet fastening device 13 is pulled. When the rivet fastening device 13 is triggered, the air valve 332 of the rivet fastening device 13, shown in FIG. 71, is opened so that compressed air is supplied from an air pump (not shown) to the air cylinder 333 through the air hose 336. Pressure of the compressed air can be adjusted in advance by the adjusting knob 335.

When the air is supplied to the air cylinder 333, the jaw spreader 13c is drawn on the air cylinder 333 side against the stretching force of the spring 13f, as shown in FIG. 74(a), and the extreme end of the pull pin 420, gripped by the jaw 13b, is pulled upwardly.

Thereby, the blind rivet 10 is pinched by the rivet contact portion 420b of the both pull pin 420, placed in contact with the body 11b, and the cutting blade 102, placed in pressure contact with the head 11c, and the knife edge 103 of the cutting blade 102 bites into the head 11c, along the boundary region A, in the axial direction of the body 11b, between the body 11b and the head 11c, as shown in FIG. 74(b). As a result, the head 11c is cut from the body 11b of the blind rivet 10 fastened to the base materials 1 and 2 to render the base materials 1, 2 and the blind rivet 10 separable.

Further, according to the dismounting device 100M, as shown in FIGS. 74(a) and 74(b), the head 11c is cut from the body 11b, in the state that the blind rivet 1, fastened to the base materials 1 and 2, is pinched, by the rivet contact portion 420b of the pull pin 420 and the knife edge 103 of the cutting blade 102 provided on the tool end 337a of the rivet fastening device 13. Therefore, the base materials 1 and 2 are not deformed by the cutting force when the knife edge 103 bites into the head 11c.

Further, according to the dismounting device 100M, since the pull pin 420, inserted into the axial hole 11a of the body 11b of the blind rivet 10 fastened to the base materials 1 and 2, is pulled by the jaw 13b, a positional relationship between the pull pin 420 and the cutting blade 102 is constantly maintained, and the knife edge 103 is accurately positioned with respect to the head 11c. Accordingly to the dismounting device 100M, since when the knife edge 103 bites into the head 11c, a generation of positional deviation between the knife edge 103 and the head 11c can be prevented, the head 11c can be cut at an accurate position and the base material 1 will not be damaged by the knife edge 103 biting into the base material 1.

Further, since when the blind rivet 10 is dismounted, the body 11b is held by the pull pin 420 and the cutting blade 102, a great cutting force can be applied by the cutting blade 102, and the body 11b and the head 11c can be cut positively.

Further, in the dismounting device 100M, merely by removing the nose piece 13a mounted on the tool end 337a of the existing rivet fastening device 13 and mounting the cutting blade 102 in the place thereof, the rivet fastening device 13 can be used as the dismounting device 100M, thus enabling the provision of the a dismounting device very inexpensively. Further, when the blind rivet 10 is fastened to the base materials 1 and 2 using the rivet fastening device 13, and the blind rivet 10 needs be cut from the base materials 1 and 2, the cutting operation and a re-fastening operation of the blind rivet 10 can be carried out very quickly. Furthermore, according to the dismounting device 100M, since the cutting blade 102 can be detachably mounted easily, and the cutting blade 102 is of a dimension suitable for the size of the rivet, being the object to be dismounted, the cutting blade 102 can be easily replaced.

Example 5

Dismounting Device Capable of Relieving the Shock Applied to the Cutting Blade 102'

FIGS. 75(a) and (b) show a dismounting device 100N capable of relieving the shock applied by the cutting blade 102', according to a twenty-first embodiment of the present invention. In FIGS. 75(a) and (b), the same reference numerals are give to the same elements as those of the dismounting device 100M, and a detailed description of which is omitted.

The dismounting device 100N can be used without removing the nose piece 13a, which is mounted on the tool end 337 of the blind rivet fastening device 13. That is, the rivet contact portion 420b of the pull pin 420 is formed with a cutting blade 102' for cutting the plastically deformed portion 11d in the axial direction of the body 11b.

The dismounting of the blind rivet 10 fastened to the base materials 1 and 2 using the dismounting device 100N will be described hereinafter. It is assumed that the mandrel 12 has already been removed from the axial hole 11a, and the pull pin 420 is inserted into the axial hole 11a, as shown in FIG. 75(a).

In this embodiment, the nose piece 13a, which is provided on the tool end 337a of the rivet fastening device 13, is placed in pressure contact with the blind rivet 10 fastened to the base materials 1 and 2, as shown in FIG. 75(a). The extreme end of the shaft portion 420a of the pull pin 420 is held by the jaw 13b so that the rivet contact portion 420b of the pull pin 420 comes into contact with the caulked portion 11d of the body 11b.

Thereafter, in the state shown in FIG. 75(a), the trigger 334 is pulled. Thereby, the blind rivet 10 is pinched by the cutting blade 102', formed in the rivet contact portion 420b, the nose piece 13a is placed in pressure contact with the head 11c, and the cutting blade 102' bites into the caulked portion 11d of the body 11b, along the boundary region A, in the axial direction of the body 11b, as shown in FIG. 75(b). As a result, the caulked portion 11d of the body 11b of the blind rivet 10, fastened to the base materials 1 and 2, is cut, and the base materials 1, 2 and the blind rivet 10 assume a separable state. Note that the term "head" in the appended claims includes the caulked portion 1d.

As described above, the dismounting device 100N has a configuration in which the shaft portion 420a of the pull pin 420 is pulled by the jaw 13b of the existing rivet fastening device 13. Therefore, it is not necessary to mount and dismount the nose piece 13a, which is provided on the tool end 337a, and a simpler and inexpensive dismounting device can be provided.

Example 6

Dismounting Device Capable of Relieving the Shock Applied to the Cutting Blade 102'

Figure 76A:
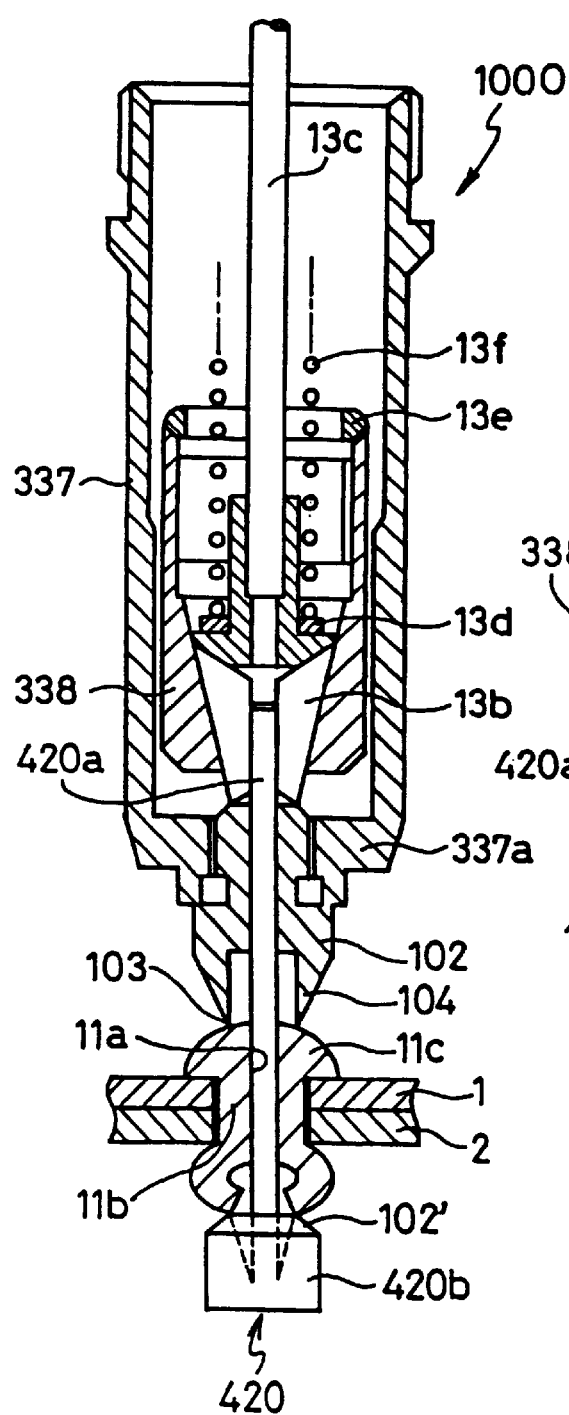

FIGS. 76(a) and (b) show a dismounting device 100O capable of relieving the shock applied by the cutting blade 102', according to a twenty-second embodiment of the present invention. In FIGS. 76(a) and (b), the same reference numerals represent the same elements as those of the dismounting devices 100M and 100N, and a detailed description of which is omitted here.

In the dismounting device 100O, the nose piece 13a, which is mounted on the tool end 337a, is removed, and the cutting blade 102', used for the dismounting device 100M, is mounted on the tool end 337a. A pull pin 420, similar to the one used in the dismounting device 100N, is used and the dismounting device 100O is thusly configured.

A dismounting operation using the dismounting device 100O will be described hereinafter.

That is, the cutting blade 102', which is provided on the tool end 337a, is placed in pressure contact with the head 11c, as shown in FIG. 76(a), and the extreme end of the shaft portion 420a of the pull pin 420 is held by the jaw 13b so that the rivet contact portion 420b comes in contact with the caulked portion 11d.

Figure 76B:
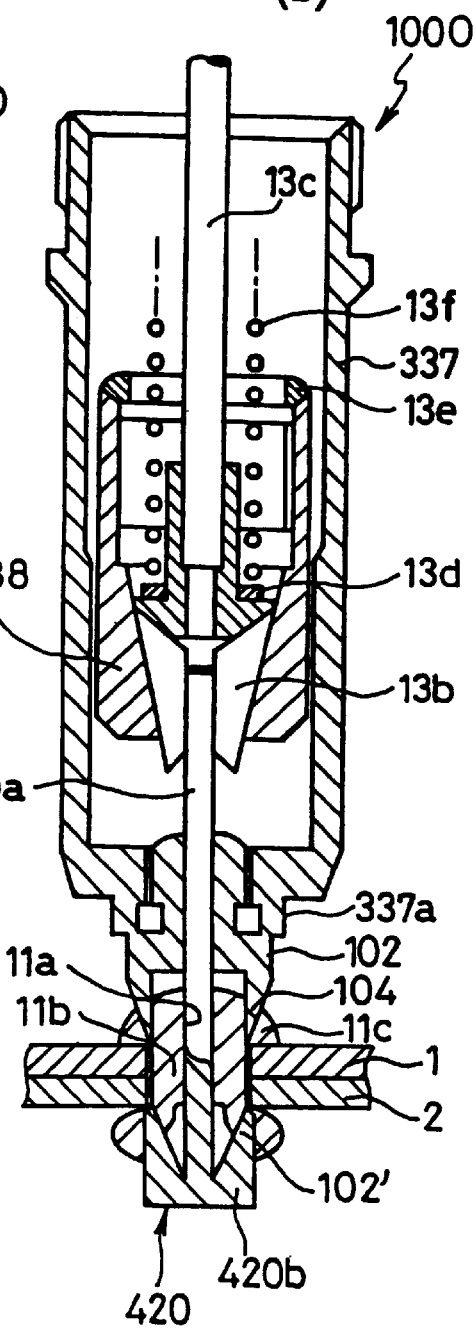

Then, in the state shown in FIG. 76(a), the trigger 334 is pulled. Thereby, the blind rivet 10 is pinched by the cutting blade 102' of the rivet contact portion 420b of the pull pin 420, which is stopped at the body 11b of the blind rivet 10, the cutting blade 102, which is provided on the tool end 337a, bites into the head 11c, along the boundary region A, in the direction of the body 11b, between the body 11b and the head 11c, and the cutting blade 102', which is provided on the rivet contact portion 420b, bites into the caulked portion 11d of the body 11b, as shown in FIG. 76(b). As a result, the head 11c is cut from the body 11b by the cutting blade 102 provided on the tool end 337a, and the caulked portion 11d is cut by the cutting blade 102' provided on the rivet contact portion 420b, so that the base materials 1, 2 and the blind rivet 10 assume a more positively separable state.

Method for Cutting a Boundary Region by a Plurality of Cutting Operations

Figure 77:
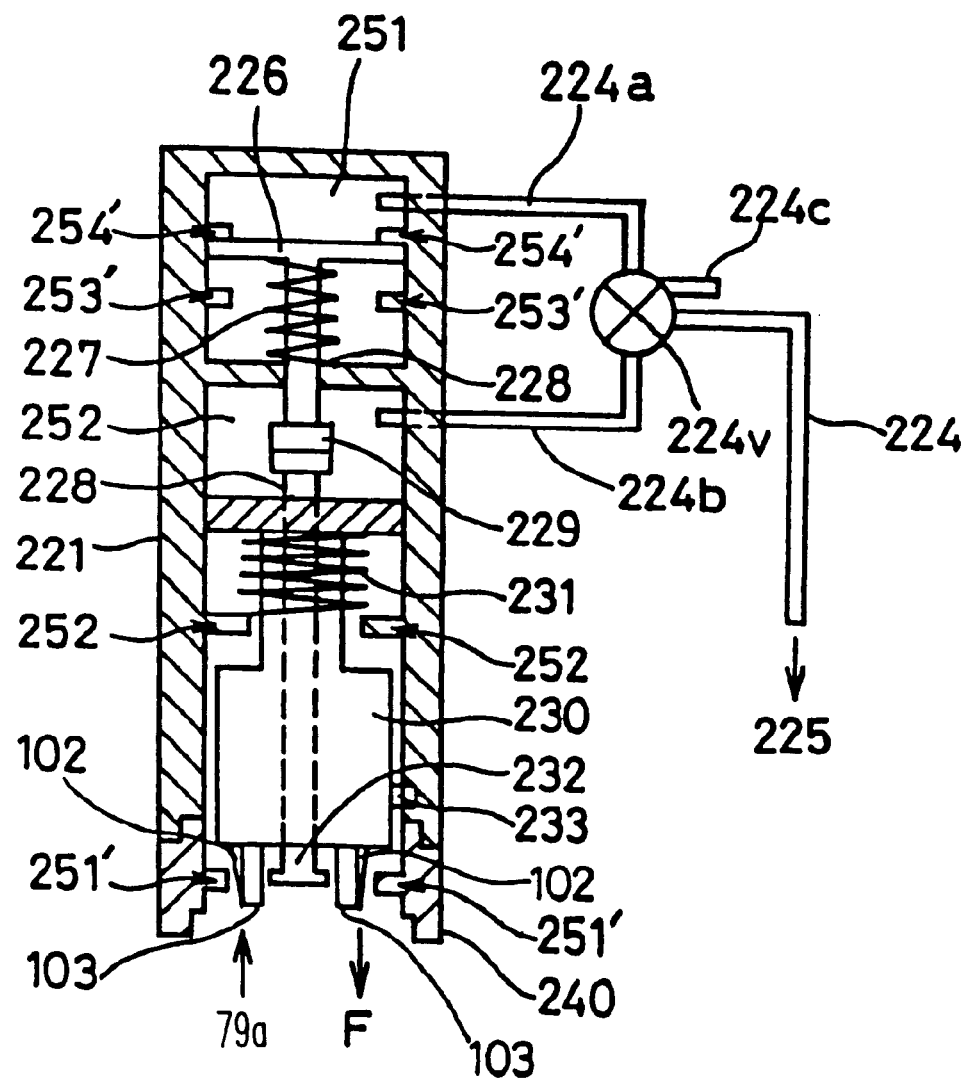
FIG. 77 is a cross-sectional view showing a cylindrical construction as a principal portion of a dismounting device for cutting a boundary region of a fastening member by a number of times of cutting operations, which is a modification of the dismounting device shown in FIG. 59.

FIG. 77 is a cross-sectional view of a cylindrical construction 221 forming a main part of a dismounting device, which is a modification of the dismounting device 100I shown in FIG. 59, for cutting a boundary region of a fastening member by a plurality of cutting operations. The external appearance of this dismounting device is the same as the dismounting device 100I shown in FIG. 59, and the constitution of the cylindrical construction 221 is also the same except that a cylindrical cutting blade 102, shown in FIGS. 78(a) and (b), is provided on a piston 230, a detailed description of which is omitted and only the difference will be explained using the same elements designated by the same reference numerals.

Figure 78A:
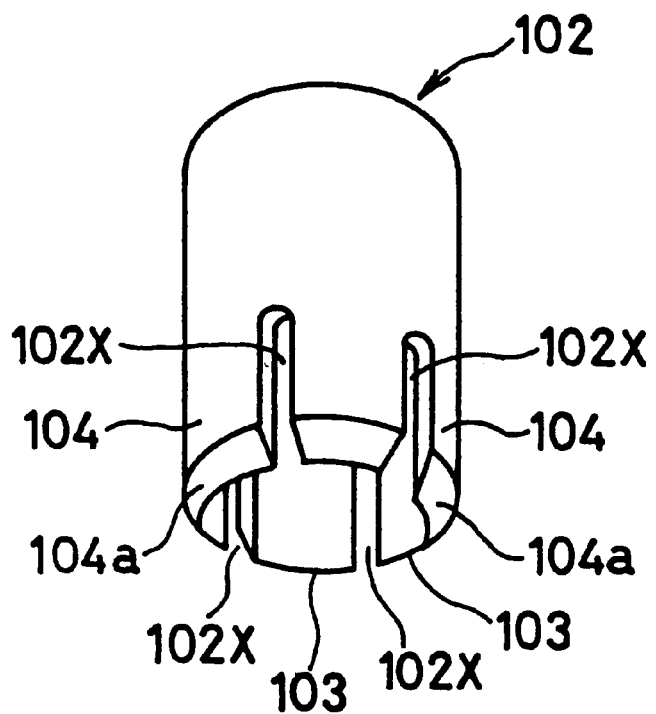
Figure 78B:
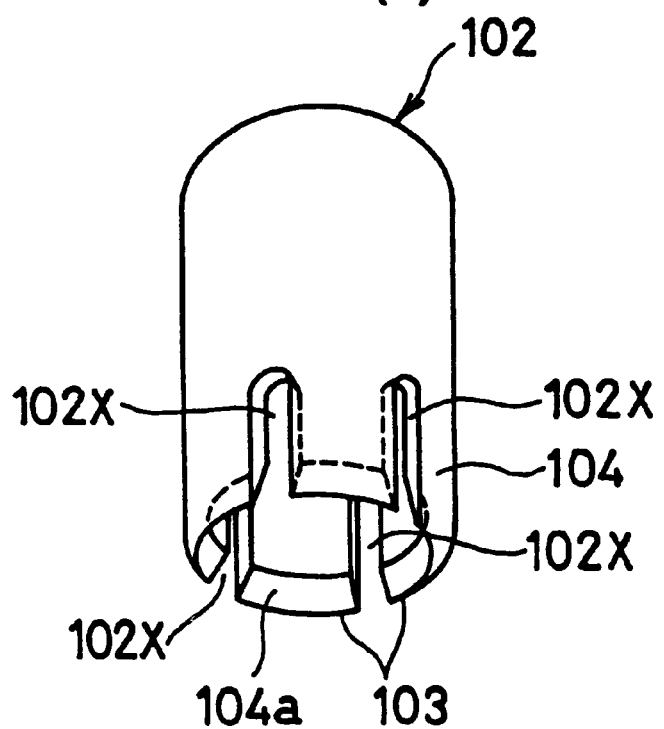

Referring to FIGS. 78(a) and (b), the cutting blade 102 is formed with four cut grooves 102X therein. The knife edge portion 104 is divided at equally spaced intervals (45 degrees) therearound to constitute a circular-arc knife edge (i.e., a circular-arc comb knife edge) 103. In FIG. 78(*a*), the cutting blade 102 is has a tapered surface 104*a* formed in the outer peripheral surface and in FIG. 78(*b*), the cutting blade 102 has a tapered surface 104*a* formed in the inner peripheral surface.

Figure 79A:
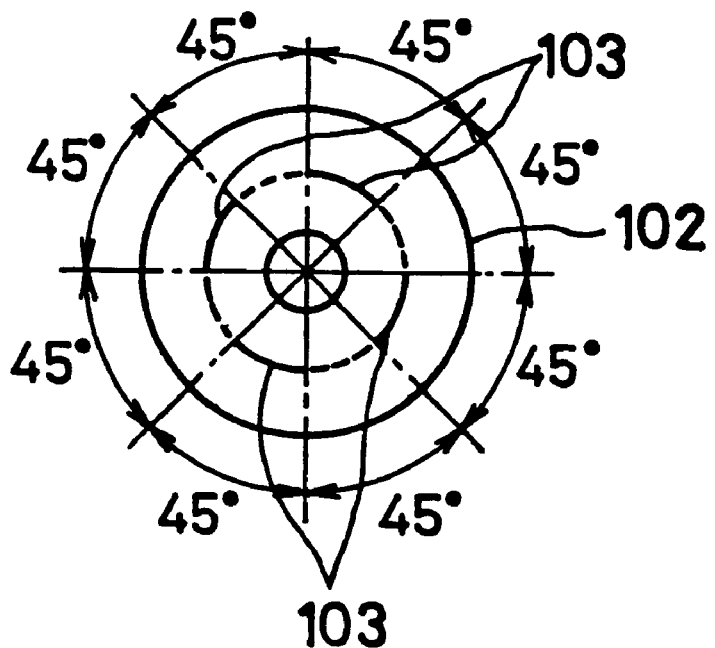
Figure 79B:
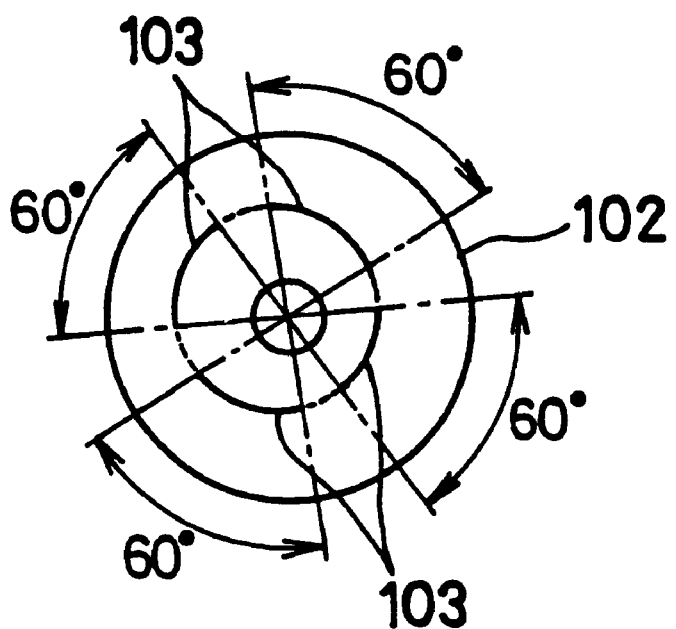

FIG. 79(*a*) shows a cross-section of a cutting blade 102 as viewed from the arrow 79(*a*) in FIG. 77. As shown in FIG. 79(*a*), four circular-arc knife edges 103 (i.e., solid line) are provided at spaced intervals of 45 degrees on the circumferential line (i.e., dashed line), which has, for example, a diameter of 4.8 mm. The diameter d1 of the fastening hole 1*a* is 4.9 mm, and since the diameter of the circumferential line is smaller than the diameter d1, the base material 1 is prevented from being damaged.

Figure 80:
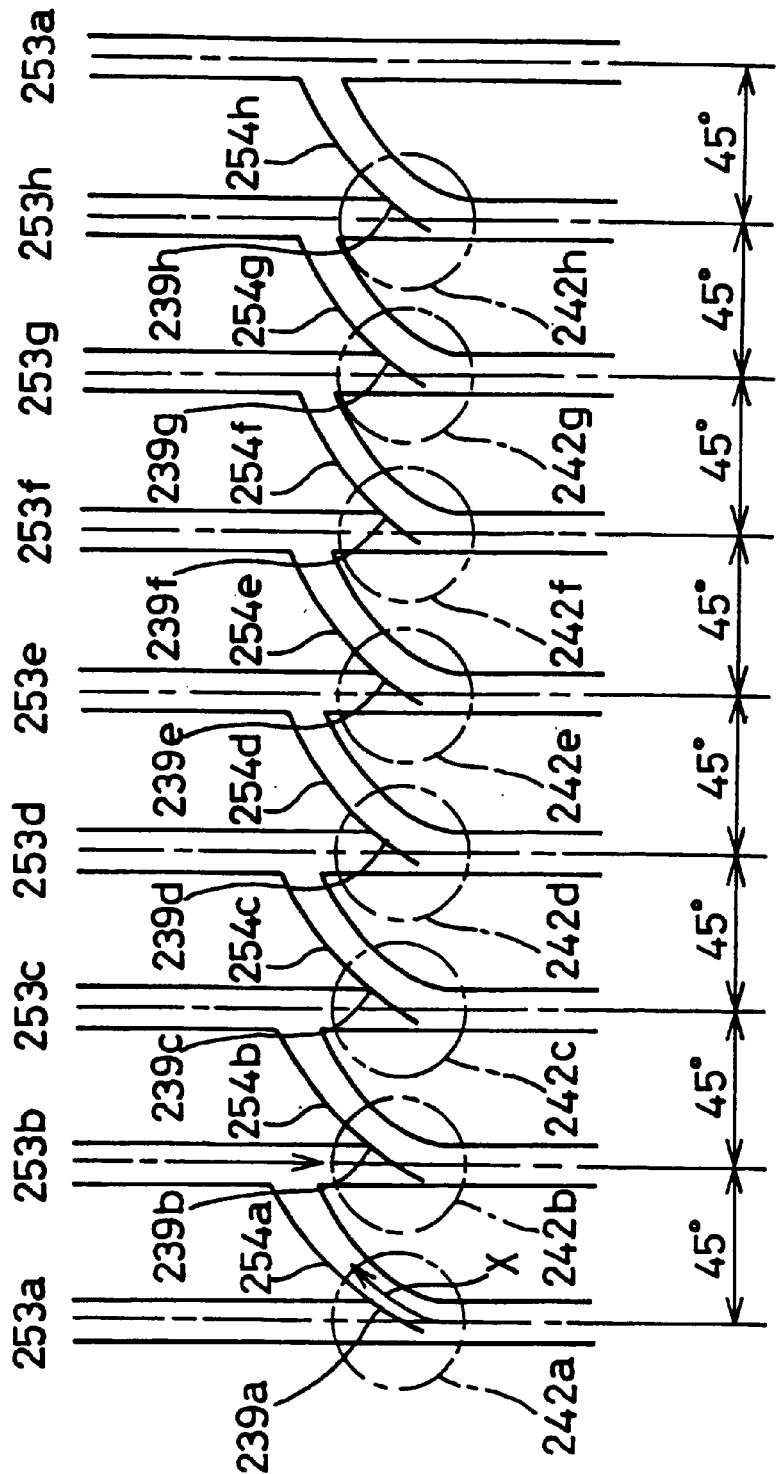
FIG. 80 is a cross-sectional view showing the internal surface development of a cylindrical construction, shown in FIG. 77.

FIG. 80 is a cross-sectional view of the inner surface of the cylindrical construction 221, showing eight (8) linear grooves 253*a*–253*h* and eight (8) spiral grooves 254*a*–254*h* formed in the inner surface of the cylindrical construction 221. The function of the linear grooves 253*a*–253*h* and spiral grooves 254*a*–254*h* is the same as that shown in FIG. 63, a detailed description of which is therefore omitted here. Leaf springs are indicated by reference numerals 239*a*–239*h*, and branch points are indicated by reference numerals 242*a*–242*h*.

FIG. 81 is a cross-sectional view showing the state of cutting the head 11*c* of the blind rivet 10, along the boundary region A, in the axial direction of the body 11*b*, between the head 11*c* and the body 11*b* of the blind rivet 10, using the cutting blade 102 of the dismounting device 219. The inside diameter of an opening of the attachment 240 of the dismounting device 219 is, for example, 9.7 mm, which is slightly larger than the outside diameter 9.6 mm of the head 11*c* of the blind rivet 10.

As shown in FIG. 81, the dismounting device 219 is set by holding it from the top so that the head 11*c* may move into the attachment 240. Thereafter, when the operating button 222 is depressed, the piston 230 is extruded by compressed air, and the circular-arc knife edge 103, mounted on the extreme end of the piston 230, partially cuts the head 11*c* at equal intervals. Since the stroke of the piston 230 is controlled by stoppers 251', 251', the base materials 1 and 2 are not damaged. After termination of the first cutting step, the operation of the operating button 222 is released. Then, the circular-arc knife edge 103 returns, while rotating 45 degrees. When the operating button 222 is further depressed, the circular-arc knife edge 103 cuts a part deviated by 45 degrees from the part cut first.

When the operation of the operating button 222 is repeated at least twice, a circumferential cut part 103*y*', as shown in FIG. 82(*b*) and associated with the circular-arc knife edge 103, is formed in the head 11*c*.

FIG. 82(*a*) shows the formation of four cut parts 103*y* on the circumference line of the head 11*c* by the single operation of the operating button 222 according to the dismounting device 219. An uncut part 103*z* is present between the cut parts 103*y*. FIG. 82(*b*) shows the formation of a continuous circumferential cut part 103*y*' in the head 11*c* by at least two operations of the operating button 222.

Figure 83:
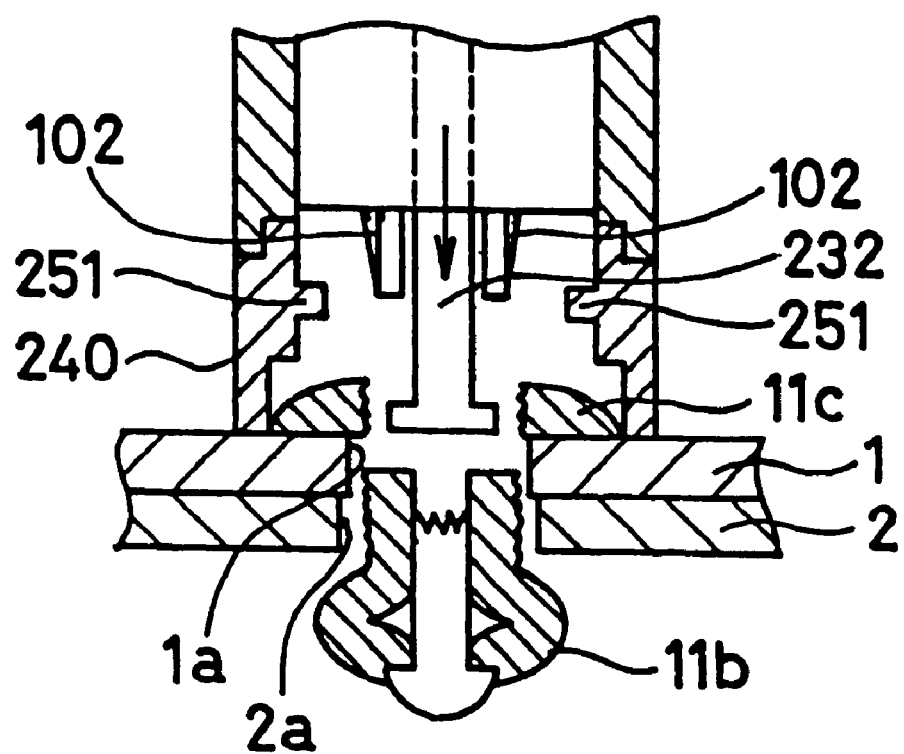
FIG. 83 is a partial cross-sectional view showing a state of removing the body from the fastening hole after cutting the boundary region by the cylindrical cutting blades, shown in FIGS. 78(a) and 78(b)

The circumferential cut parts 103*y* and 103*y*' are formed in the head 11*c*, whereby the head 11*c* and the body 11*b* are cut. However, it is necessary to forcibly remove the body 11*b* because it remains in the holes 1*a* and 2*a* of the base materials 1 and 2, respectively. FIG. 83 shows that the body 11*b* is removed by a push rod 232 as an extrusion means of the dismounting device 219.

When the operating button 222 is depressed after the circumferential cut parts 103*y* and 103*y*' have been formed in the head 11*c*, the push rod 232 is extended, and a force is applied to the body 11*b*. Then, a piston (not shown, but similar to piston 226 described above), as an extruding force urging means, is driven, and the body 11*b* and the mandrel 12 are removed by the pressing force of the push rod 232, leaving the head 11*c*. By the configuration and operation as described above, the blind rivet 10 is dismounted, and the base materials 1 and 2 are released from their fastened state.

According to this embodiment, the operation for cutting the uncut parts 103*z* (see FIG. 82(*a*) showing those parts not cut), by changing the contact position of the knife edge 103 to the head 11*c*, is necessary, but there is an advantage that the cutting force, when the boundary region A is cut, can be made small, and the load applied to the cutting force can be reduced.

Further, in the conventional dismounting methods, the dismounting was difficult, and the reuse of the fastening member and the recycling of the materials fastened were difficult. However, the above-mentioned dismounting device is used whereby the fastening member and the materials to be fastened can be easily dismounted, thus enabling the re-use of the fastening member and the recycling of the materials to be fastened. In addition, the above-mentioned dismounting device are useful for protection of the environment and the saving of resources.

It is noted that the cutting blade 102 and the attachment member 240 in this dismounting device can be exchanged. Accordingly, it is possible to change the shape of the cutting blade 102, the inside diameter of the opening at the end of the attachment member 240, and the position of the stopper portion. Thereby, it can be used for rivets of different sizes. Further, it can be used for fastening members of other fastening techniques, for example, such as pin caulking, burring caulking, etc.

Modification 1

A cutting blade 102 having 45 degrees of a circular-arc angle has been used as described above, but it is noted that cutting blades 102 having different circular-arc angles can be also used. FIG. 79(*b*) shows an example in which a circular-arc knife edge 103, having a circular-arc angle of the cutting blade 102 being 60 degrees, was used and the four (4) circular-arc knife edges 103 were disposed at equal intervals. Since a rotational angle per one rotation by a rotating means is 45 degrees (a fixed angle), a circular-arc angle of the circular-arc knife edge 103 is larger than the circular-arc angle of the cutting blade 102 of 60 degrees described above. That is, the circumferential length of the circular-arc knife edge 103 is longer than the circumferential length of the cut groove 102*x* (see FIGS. 78(*a*) and (*b*)).

Accordingly, at the time of the second cutting step, it is possible to process both ends of the cut part according to the first cutting step, while overlapping by approximately 7.5 degrees. As described above, by making the circular-arc angle of the cutting blade 102 larger than the rotational angle, it is possible to process both ends of the cut part 103*y* according to the first cutting step while being overlapped. Thereby, it is possible to prevent generation of inferior cutting in the end of the cut part 103*y* to perform a more positive cutting process. In this case, the rotational angle by the rotating means may be set to an angle obtained by dividing 360 degrees by twice of the number of circular-arc knife edges 103.

As described above, the rotational angle of the cutting blade 102 can be suitably selected by the circular-arc angle of the cutting blade 102 and the number of the circular-arc knife edges 103.

Modification 2

A description has been made of the configuration wherein a groove is formed in the inner peripheral surface of the cylindrical construction 221. However, it is possible to intermittently rotate the piston 230 by the configuration in which a similar groove is formed in the outer peripheral surface of the piston 230, a leaf spring is disposed in the branch point in the groove, and a projecting pin 233 is secured at the inner peripheral surface of the cylindrical construction 221. Thereby, it is not necessary to process the groove in the inner peripheral surface of the cylindrical construction 221, but the groove may be precessed in the outer peripheral surface of the piston 230, thus enabling reduction in cost of machining.

Attachment Construction of a Dismounting Device

Figure 84:
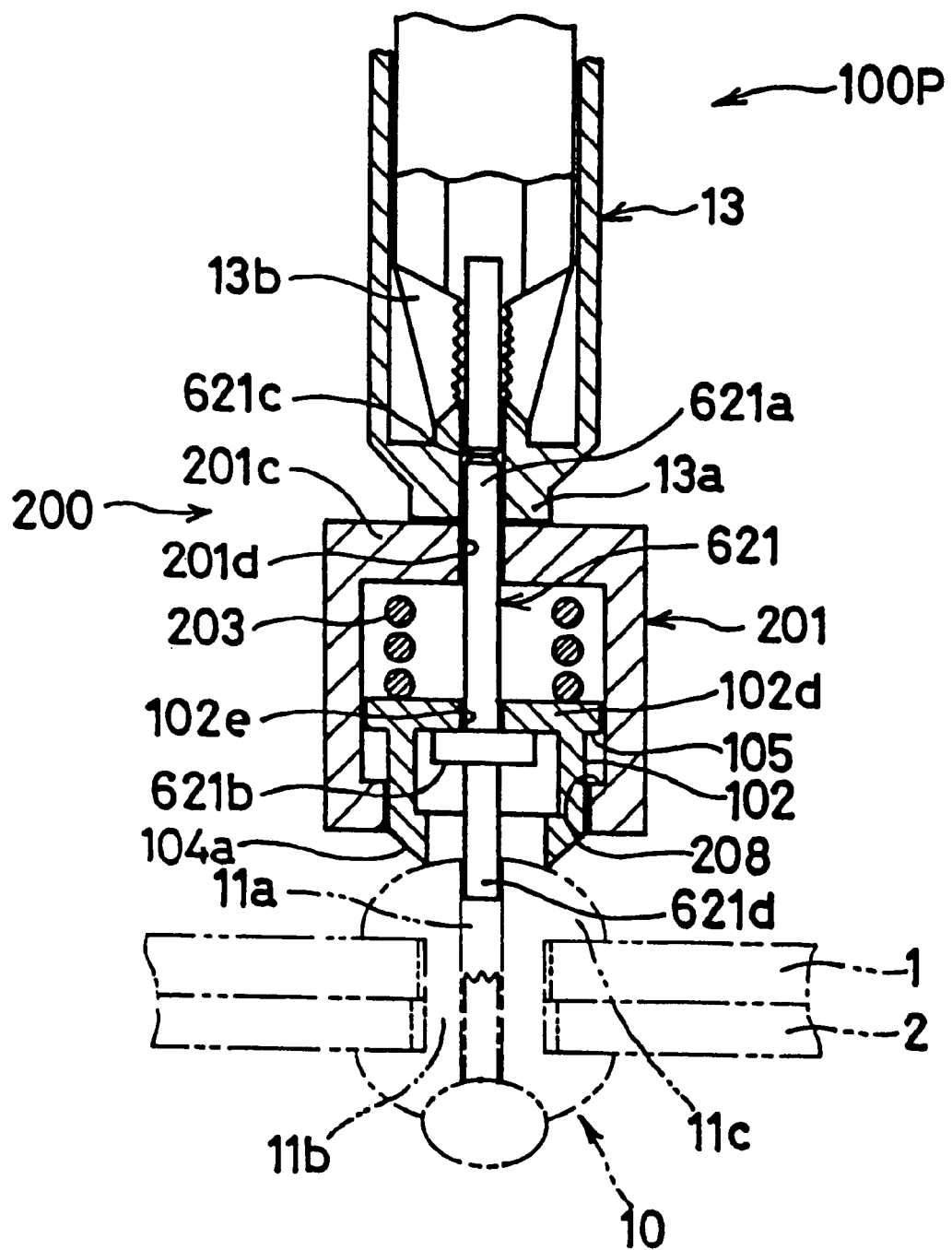
FIG. 84 is a partial cross-sectional view showing a main part of a dismounting device for an attachment construction according to a twenty-third embodiment of the present invention.

FIG. 84 shows a dismounting device 100P, as an attachment member, according to a twenty-third embodiment of the present invention.

The dismounting device 100P has a cutting blade 102 for cutting a boundary region A between the body 11b and the head 11c along the axial direction of the body 11b, and a cutting force applying means 200 for applying the cutting force for cutting the boundary region A by using the cutting blade 102.

The cutting force applying means 200 comprises a cutting blade support 201 as a body cover, a cutting force urging means 203 for accumulating the cutting force applied by the cutting blade 102 and releasing the accumulated cutting force to thereby applying the cutting force of the cutting blade 102 toward a fastening member (i.e., blind rivet 10), a cutting force accumulating means for accumulating the cutting force applied by the cutting blade 102 to the cutting force urging means 203, and a cutting force release means for releasing the cutting force accumulated in the cutting force urging means 203, when the cutting force accumulated in the cutting force urging means 203 by the cutting force accumulating means reaches the state capable of cutting the body 11b and the head 11c. The cutting blade 102 is formed in the outer peripheral surface thereof with a tapered surface 104a, and the size of the knife edge 103 is somewhat smaller than the outside diameter of the body 11b.

The cutting force urging means 203 is composed of a coil spring, and the cutting force applied by the cutting blade 102 is accumulated by compression thereof. The cutting force accumulating means has a pull shaft as a compressing member 621 for compressing the cutting force urging means 203, and a compressing member moving means for moving the compressing member 621 in the direction of compressing the cutting force urging means 203. For the compressing member moving means, a blind rivet fastening device 13 is used.

The cutting force release means comprises a rupture portion 621c formed in the compressing member 621. The rupture portion 621c is ruptured by the cutting force accumulated in the cutting force urging means 203 in the process in which the compressing member 621 is moved by the compressing member moving means 13 and the cutting force is accumulated in the cutting force urging means 203.

In other words, the dismounting device 100P has an attachment member fastened to the blind rivet fastening device 13.

The attachment member comprises: a hollow-shaped body cover or cutting blade support 201, one side of which is opened in the axial direction of the body 11b; a hollow-shaped knife edge 103 is provided with a dismounting device body 101 having an outside diameter smaller than a diameter of the fastening hole 1a and an inside diameter smaller than an outside diameter of the body 11b, one side of the dismounting device body 101 being opened in the axial direction of the body 11b and the other side of the dismounting device body 101 having a through-hole; a pull shaft or compression member 621 having the size smaller than the diameter of the through-hole 201d; an engaging portion 621b for engagement between a shaft portion 621a gripped by the blind rivet fastening device 13 and the back of the dismounting device body 101; and a resilient member 203 provided between the body cover 201 and the dismounting device body 101.

The method for dismounting the blind rivet 10 fastened to the base materials 1 and 2 using the dismounting device 100P will be described hereinafter.

First, the shaft portion 621a of the compression member 621 is inserted into the through-hole 102e formed in the end wall 102d of the cutting blade 102, and the through-hole 201d formed in the end wall 201c of the cutting blade support or body cover 201.

The upper end of the shaft portion 621a of the compression member 621 is inserted into the through-holes 102e and 201d and projects from the end wall 201c of the cutting blade support 201, which is inserted into the nose piece 13a of the blind rivet fastening device 13. At this time, the shaft portion 621a of the compression member 621 is set to the blind rivet fastening device 13 so that the extreme end of the nose piece 13a of the blind rivet fastening device 13 comes in close contact with the upper surface of the end wall 201c of the cutting blade support 201.

Figure 85A:
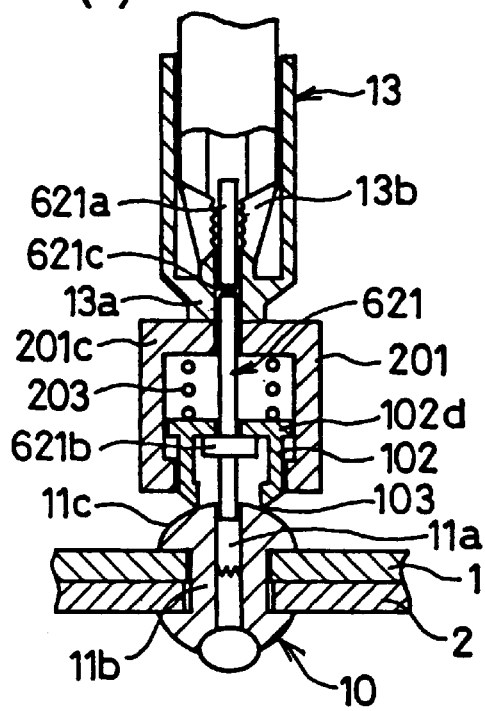
Figure 85B:
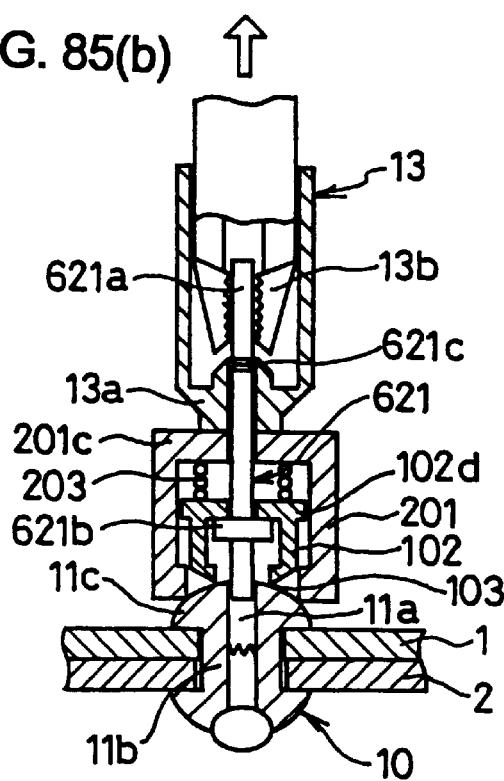

Next, as shown in FIG. 85(a), the knife edge 103 of the cutting blade 102 of the dismounting device 100P is placed so as to face the boundary region A between the body 11b and the head 11c of the blind rivet 10. In this state, a trigger of the blind rivet fastening device 13 is pulled. Thereby, the shaft portion 621a of the compression member 621 is gripped by the jaw 13b and raised (see arrow at top of FIG. 85(b)). The engaging portion 621b of the compression member 621 engages the lower surface of the end wall 102d of the cutting blade 102. The shaft portion 621a is further raised from that state, and as shown in FIG. 85(b), the coil spring 203 is compressed so that the cutting force is accumulated in the coil spring 203. At the same time, the cutting blade 102 is raised.

Figure 85C:
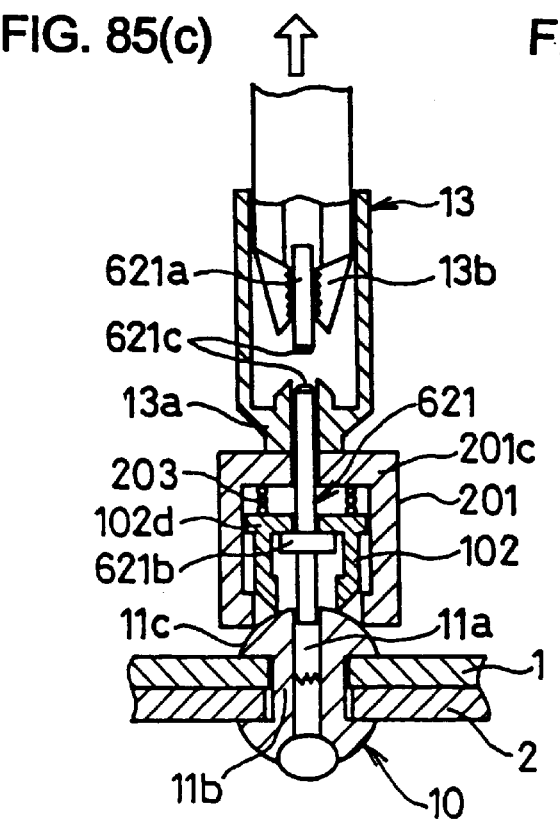

When the cutting force accumulated in the coil spring 203 reaches the state capable of cutting the body 11b and the head 11c of the blind rivet 10, the rupture portion 621c is ruptured, as shown in FIG. 85(c), conceding to the cutting force accumulated in the coil spring 203. Thereby, the cutting force, accumulated in the coil spring 203, is released.

Figure 85D:
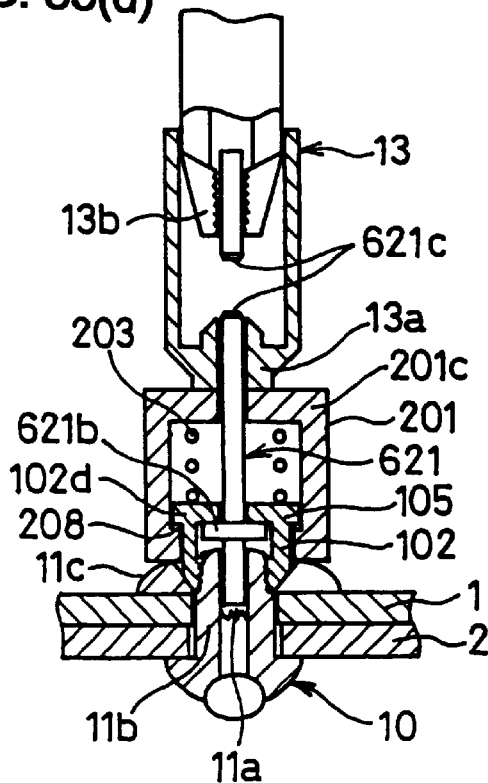

When the cutting force accumulated in the coil spring 203 is released, the cutting force is urged against the cutting blade 102 and toward the blind rivet 10 by the coil spring 203. Thereby, the cutting blade 102 bites into the head 11c in the direction of the body 11b, and the body 11b and the head 11c are cut by the cutting blade 102, as shown in FIG. 85(d).

According to the dismounting device 100P, when the existing blind rivet fastening device 13 is used, the coil spring 203 is compressed, and the cutting force, for urging the cutting blade 102, can be accumulated in the coil spring 203. Therefore, the configuration of the dismounting device 100P is simple.

Further, according to the dismounting device 100P, as shown in FIG. 85(b), in the state that the extreme end of the nose piece 13a of the blind rivet fastening device 13 is in close contact with the upper surface of the end wall 201c of the cutting blade support 201, the shaft portion 621a of the compression member 621 is gripped by the jaw 13b of the blind rivet fastening device 13 and raised, whereby the cutting blade support 201 is used in conjunction with the blind rivet fastening device 13.

Preferably, the compression member 621 is formed to have a plurality (four in the embodiment shown in FIG. 86) of rupture portions 621c in fixed spaced relation in the shaft portion 621a. In this case, the rupture limit force increases from the side near the jaw 13b of the rivet fastening device 13 toward the head 11c.

Figure 86:
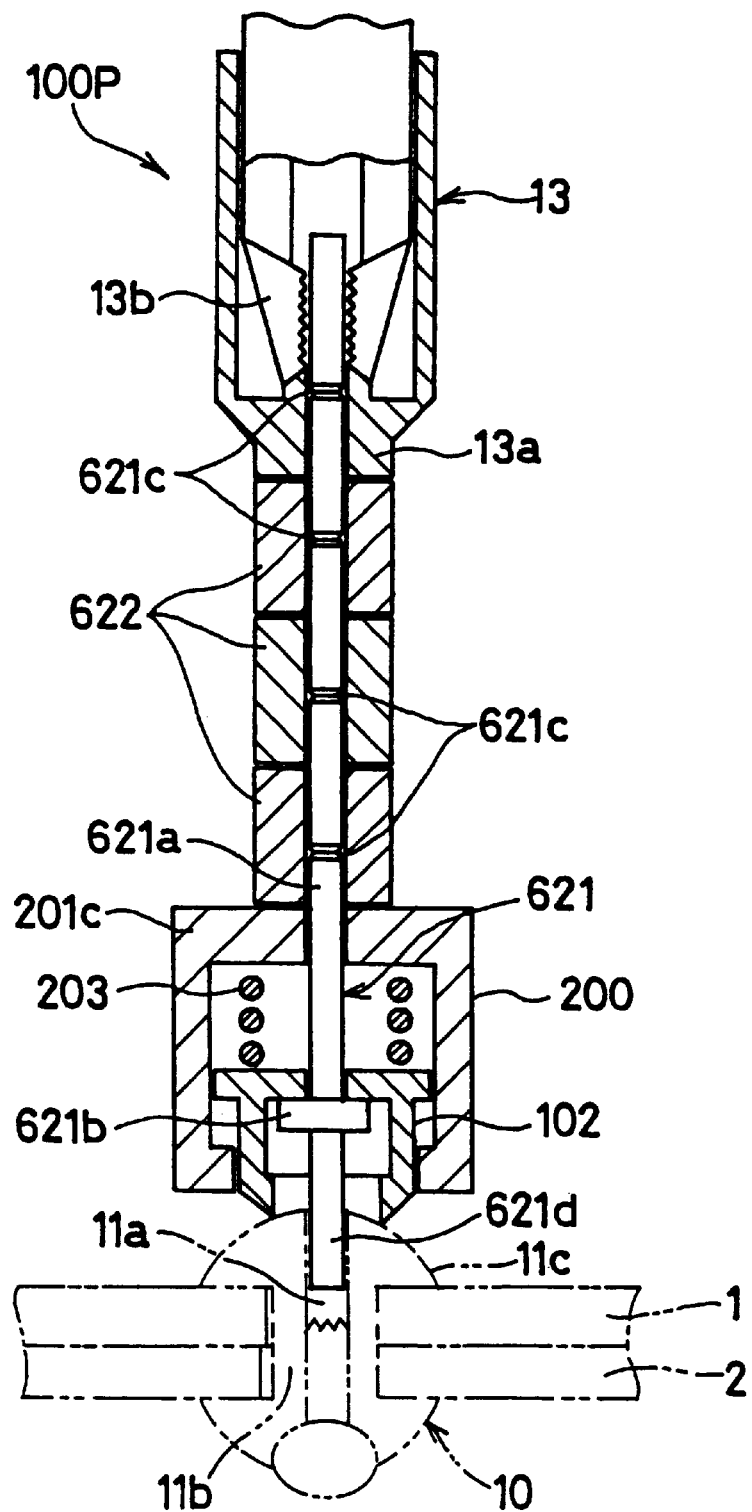
FIG. 86 is a cross-sectional view showing the dismounting device, shown in FIG. 84, formed with a plurality of rupture portions in a pull pin, acting as a compression member, in the axial direction thereof.

In the case of using the compression member 621 of FIG. 86, the fixed number of nose collars 622, having a height substantially equal to the spacing of the rupture portions 621c of the compression member 621, are disposed between the nose piece 13a of the blind rivet fastening device 13 and the upper surface of the end wall 201c of the cutting blade support 201. Thereby, the jaw 13b can select the gripping part of the shaft portion 621a of the compression member 621.

In the case of using the compression member 621, the shaft portion 621a of the compression member 621 is mounted on the jaw 13b of the rivet fastening device 13 to raise the shaft portion 621a, whereby the plurality of rupture portions 621c, formed in the shaft portion 621a of the compression member 621, can be ruptured in order of the one nearest the jaw 13b of the rivet fastening device 13 is ruptured first. Accordingly, the compression member 621 can be used repeatedly depending on the number of the rupture portions 621c, and so the compression member 621 can be reused.

According to the compression member 621, the plurality of rupture portions 621c of differing strengths are formed in the shaft portion 621a and are selectively gripped by the jaw 13b to rupture the rupture portions 621c, whereby the magnitude of the cutting force accumulated in the coil spring 203 can be changed. Thereby, the magnitude of the cutting force can be selected according to the strength of the body 11b and the head 11c.

Alternatively, the rupture portions 621c of the compression member 621 are formed between the engaging portion 621b, which engages the cutting blade 102 to raise the cutting blade 102, and the shaft portion 621a of the compression member 621, to rupture the rupture portions 621c, whereby the compression member 621 is separated from the cutting blade 102.

Further, alternatively, the extreme end of the compression member 621, made to have a diameter smaller than the diameter of the axial hole 11a and to project from the cutting blade 102, and a positioning portion 621d, fitted in the axial hole 11a to position the cutting position of the cutting blade 102 when the boundary region A of the blind rivet 10 is cut, are formed integrally, as shown in FIGS. 84 and 86.

Preferably, at the time of cutting with the cutting blade 102 of the dismounting device 100P, the moving stroke is set so that the movement of the cutting blade 102 is stopped, in the state that the knife edge 103 of the cutting blade 102 reaches at least the vicinity of the cutting and separating part between the head 11c and the base material 1, and the outer peripheral surface of the knife edge portion 104 of the cutting blade 102 is positioned in the vicinity of the edge of the fastening hole 1a of the base material 1.

So, in the dismounting device 100P as shown in FIG. 85(d), a shoulder 105 is provided in the outer peripheral surface of the cutting blade 102 as a control portion, and the shoulder 105 is pushed into engagement with a shoulder 208 in the inner peripheral portion of the cutting blade support 201 by the cutting force urging means or coil spring 203, whereby the movement of the cutting blade 102 is stopped at the fixed position as shown in FIG. 85(d). Thereby, the cutting blade 102 is prevented from slipping out of the cutting blade support 201.

The end wall 201c of the cutting blade support 201 of the dismounting device 100P performs the function of a carrying portion for carrying the nose piece 13a of the blind rivet fastening device 13 against the cutting force accumulated in the coil spring 203 when the shaft portion 621a is raised by the jaw 13b of the blind rivet fastening device 13, as shown in FIG. 84.

Figure 87:
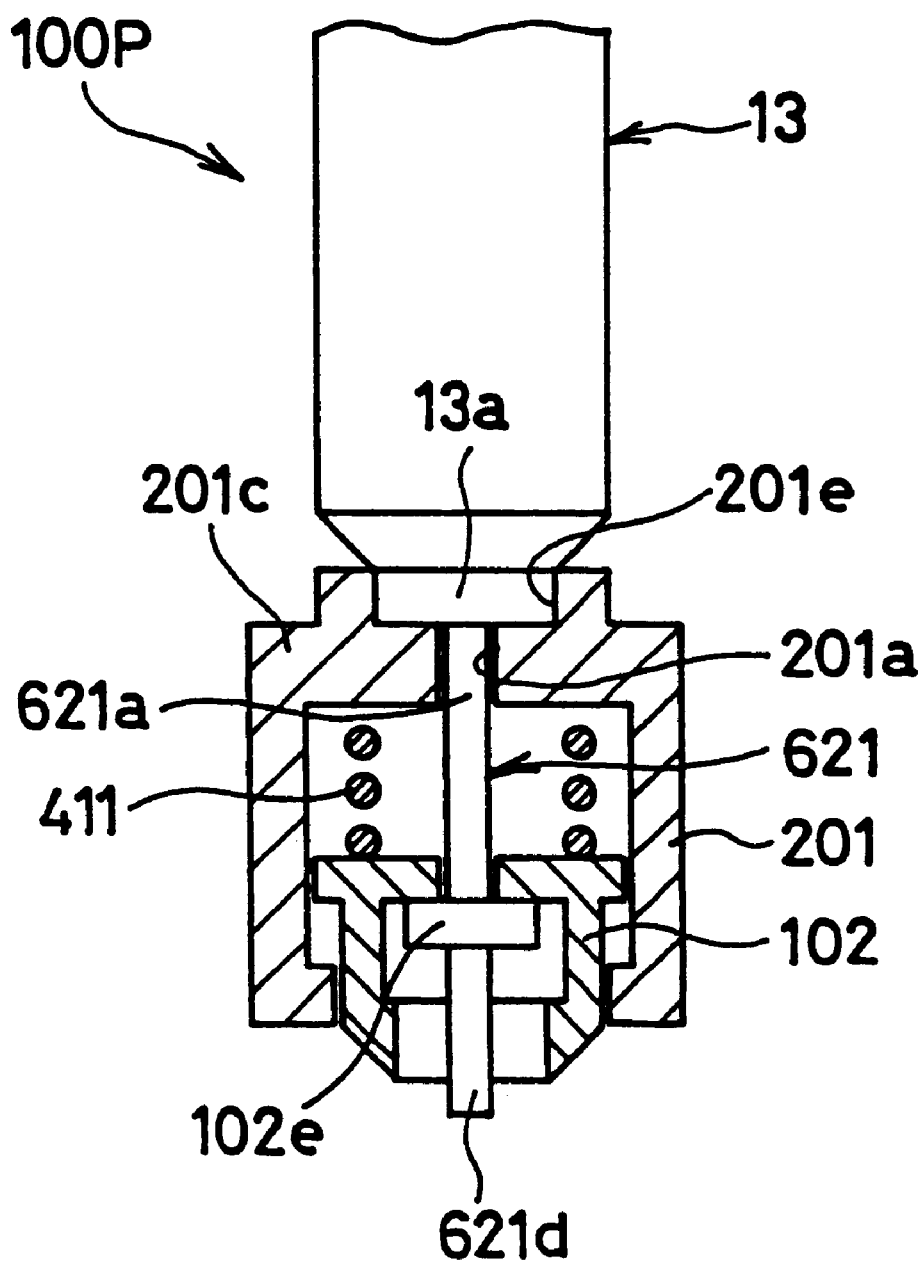
FIG. 87 is a partial cross-sectional view showing the dismounting device, shown in FIG. 84, formed with a fitting portion in an end wall of a cutting blade support.

As described above, when the shaft portion 621a is raised by the jaw 13b, the nose piece 13a is carried by the carrying portion, whereby the coil spring 203 can be compressed positively, and the cutting force of the coil spring 203 can be accumulated without waste. Preferably, the end wall 201c of the cutting blade support 201 is formed with a fitting hole 201e into which the nose piece 13a can be fitted, as shown in FIG. 87, for example.

As described above, by fitting the nose piece 13a in the fitting hole 201e to carry the former, when the shaft portion 621a of the compression member 621 is raised by the jaw 13b of the blind rivet fastening device 13, the nose piece 13a of the blind rivet fastening device 13 will not slip out of the end wall 201c to improve the operability of the dismounting device 100P.

Figure 88:
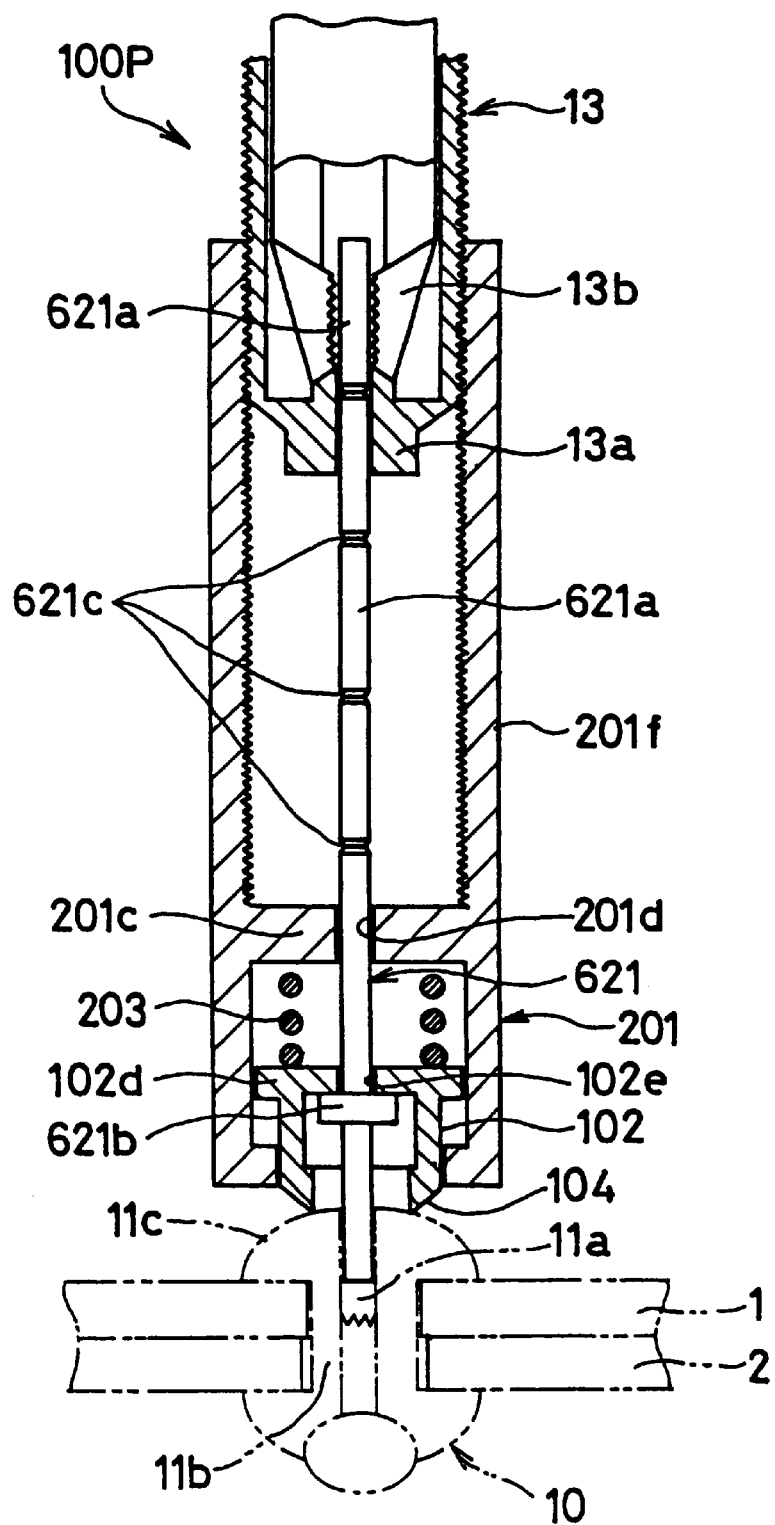
FIG. 88 is a partial cross-sectional view showing the dismounting device, shown in FIG. 84, formed with a pipe portion in the end wall of the cutting blade support.

A pipe portion 201f may be provided on the end wall 201c of the cutting blade support 201. The pipe portion 201f is screwed to the outer peripheral surface of the cylindrical case in which the jaw 13b is encased, as shown in FIG. 88, for example.

As described above, the pipe portion 201f is threadingly engaged with the outer peripheral surface of the cylindrical case of the blind rivet fastening device 13, whereby a positional relationship between the cylindrical case of the blind rivet fastening device 13 and the pipe portion 201f of the cutting blade support 201 can be adjusted. Thereby, it is possible to select a position for gripping the shaft portion 621a of the compression member 621, without using nose collars 622, as shown in FIG. 86.

Figure 89:
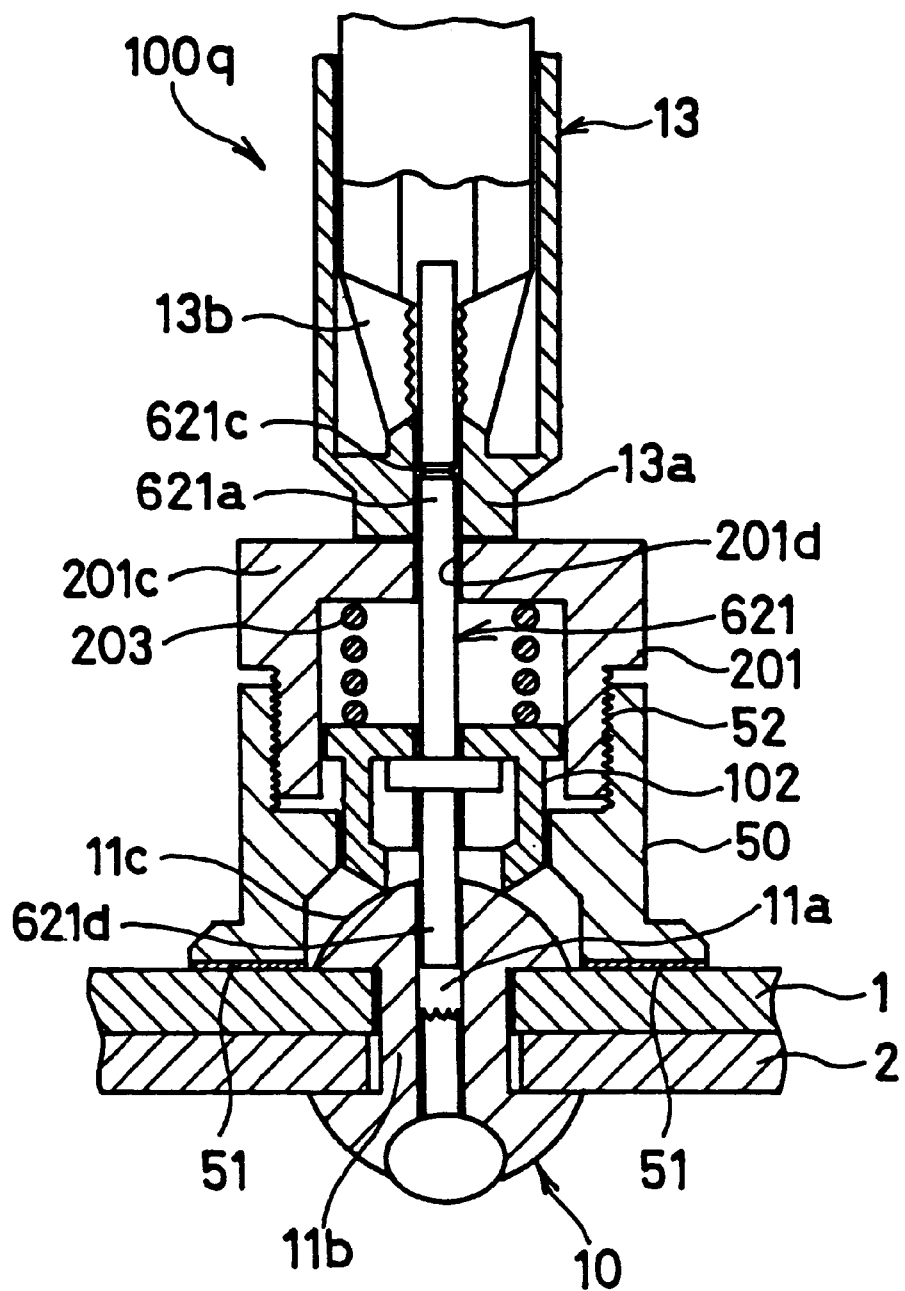
FIG. 89 is a partial cross-sectional view showing a dismounting device provided with a contact member in contact with a base material in the cutting blade support according to a twenty-fourth embodiment of the present invention.

FIG. 89 shows a dismounting device 100q of the attachment construction, according to a twenty-fourth embodiment of the present invention.

The dismounting device 100q has a contact member 50 in contact with the base materials 1 and 2, when the boundary region A of the blind rivet 10 is cut by the cutting blade 102. According to he dismounting device 100q, when the blind rivet 10 is cut, the contact member 50, provided on the cutting blade support 201, comes into contact with the base material 1.

Thereby, a positional relationship between the cutting blade support 201 and the base material 1, that is, a positional relationship between the base material 1 and the cutting blade 102 is always maintained constant.

This eliminates the situations that, depending on the way the operator holds the blind rivet fastening device 13 at the time of cutting, the position of the cutting blade support 201 is deviated by reaction of the cutting force applied by the cutting blade 102 to change the moving stroke of the cutting blade 102, the center of the cutting blade 102 is deviated from the center of the blind rivet 10, and the moving direction of the cutting blade 102 is inclined in the axial direction of the fastening holes 1*a* and 2*a* of the base materials 1 and 2.

Accordingly, according to the dismounting device 100*q*, the blind rivet 10 fastened to the base materials 1 and 2 can be removed form the base materials 1 and 2 smoothly and positively without damaging the base materials 1 and 2.

In the dismounting device 100*q*, preferably, the contact portion 51 of the contact member 50 in contact with the base material 1 has a magnetic force for attracting the base material 1. According to the dismounting device 100*q*, when the blind rivet 10 is cut, the contact portion 51 of the contact member 50 can attract the base material 1 by means of the magnetic force. Thereby, since the contacting state between the contact portion 51 of the contact member 102 and the base material 1 is enhanced, the positional accuracy, between the cutting blade 102 and the base materials 1 and 2 during the cutting, is improved. Further, since at the time of cutting, an operator can place the contact portion 51 of the contact member 50 in close contact with the base material 1 without holding the dismounting device 100*q*, the burden imposed on the operator at the time of cutting can be reduced.

The magnetic force may be applied to the contact portion 51 of the contact member 50 by forming the contact member 50 from a magnet (a permanent magnet), or by mixing a magnetic material into the material making up the contact member 50 to magnetize the contact portion 51.

Preferably, the magnetic force of the contact portion 51 of the contact member 50 has a magnitude greater than the force for placing the contact portion 51 of the contact member 50, which is provided on the cutting blade support 201, in contact with the base material 1 against the reaction of the cutting force applied to the cutting blade 102 by the coil spring 203. Further, preferably, the contact member 50 is configured so as to be detachably replaceable with respect to the cutting blade support 201.

That is, the contact member 50 is configured to be detachably replaceable with respect to the cutting blade support 201, whereby the moving stroke of the cutting blade 102 can be changed, while adjusting to the dimension of the fastening member, according to the dimension of the fastening member as the object to be dismounted, merely by replacing the contact member 50. Therefore, it is not necessary to prepare many exclusive-use dismounting devices having a different moving stroke of the cutting blade 102 for every different dimension of fastening members.

Further, preferably, the contact member 50 is configured so as to be movable forward and backward along the cutting direction of the cutting blade 102 with respect to the cutting blade support 201. That is, the contact member 50 is configured so as to be movable forward and backward along the cutting direction of the cutting blade 102 with respect to the cutting blade support 201, whereby, for example, even in the case where the dimension in the cutting direction of the knife edge portion 104 is changed due to the polishing of the knife edge 103 of the cutting blade 102, the contact portion 51 of the contact member 50 is moved forward and backward along the cutting direction of the cutting blade 102 with respect to the cutting blade support 201, whereby the position of the knife edge 103 can be adjusted so that the knife edge 103 of the cutting blade 102 always faces a fixed position.

Further, the contact portion 51 of the contact member 50 is moved forward and backward along the cutting direction of the cutting blade 102 with respect to the cutting blade support 201, whereby the moving stroke of the cutting blade 102 can be changed, while adjusting to the dimension of the fastening member, according to the dimension of the fastening member as the object to be dismounted, without replacing the contact member 50.

For the construction in which the contact portion 51 of the contact member 50 is moved forward and backward along the cutting direction of the cutting blade 102, the contact member 50 can be threadingly engaged with the cutting blade support 201 by threads 52.

Production Line for Dismounting a Mis-operated Rivet

A production system will be described hereinafter, wherein a fastening member comprising a head and a body, the body being inserted into a fastening hole formed in a base material, and the head being placed in contact with a peripheral edge of the fastening hole into a fastened state with the base material to thereby recover the base material.

Figure 90:
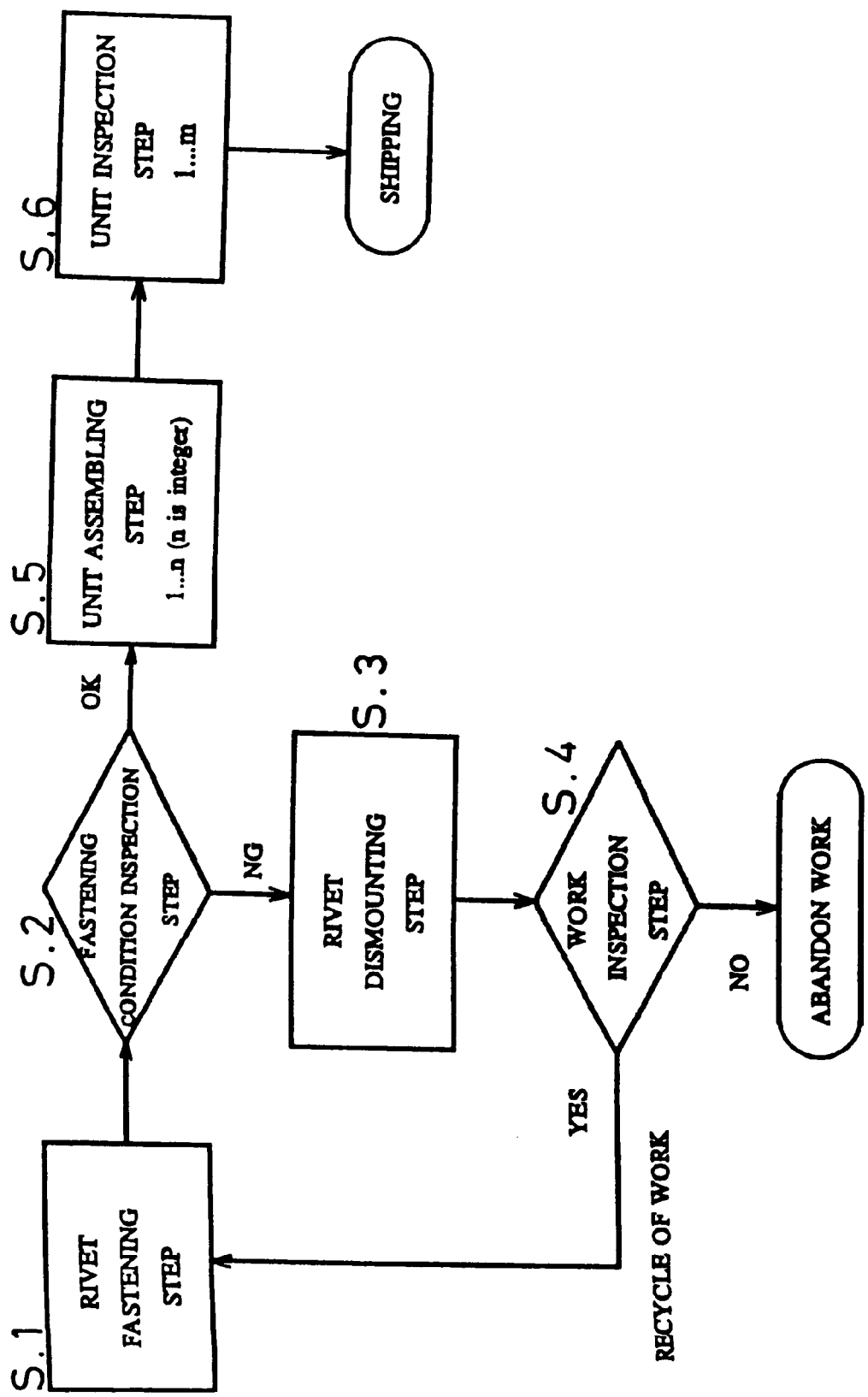
FIG. 90 is a flowchart for explaining the first embodiment of a production system, according to the present invention, for removing a fastening member from a base material to recover the base material.

Referring to FIG. 90, the production system for dismounting a rivet, according to a first embodiment of the production system of the present invention, include the steps of: inspecting a fastened condition of the fastening member with respect to the base material; cutting, when the fastened condition of the fastening member and the base material is deemed inadequate on the basis of the inspection, a boundary region between the head and the body to separate the body and the head from each other; and removing the fastening member from the base material to recover the base material.

S.1 (Rivet Fastening Step)

At least two base materials (workpieces) are fastened by a blind rivet using a commercially available blind rivet fastening device 13.

S.2 (Fastened Condition Inspecting Step)

Inspection will be made whether or not a clearance is generated between the fastened blind rivet 10 and the workpieces (base materials 1, 2), and whether or not the rivet 10 is oblique with respect to the surface of a fastening hole of the workpieces, in the rivet fastening step (S.1). The fastened condition inspection step (S.2) may be carried out simultaneously with the rivet fastening step (S.1).

S.3 (Rivet Dismounting Step)

When inadequacy of the rivet fastening is found in the fastened condition inspection step (S.2), the rivet 10 is removed from the workpieces using a rivet dismounting device (for example, a dismounting device 100P using an existing rivet fastening device 13). This rivet dismounting step (S.3) may be carried out simultaneously with the fastened condition inspection step (S.2). In the case where the rivet fastened condition inspection step (S.2) is carried out simultaneously with the rivet fastening step (S.1), this rivet dismounting step (S.3) may be carried out simultaneously with the fastened condition inspection step (S.2).

S.4 (Workpieces Inspection Step)

In the case where the workpieces, which have been dismounted in the rivet dismounting step (S.3), are to be recycled, the step shifts to the rivet fastening step (S.1) again to fasten two workpieces by means of a rivet.

In the case where the workpieces dismounted in the rivet dismounting step (S.3) are not recyclable, the work is abandoned.

That is, in the case where in the dismounting operation in the rivet dismounting step (S.3), the fastening holes 1*a* and 2a are bent, damaged or deformed, and in the case where the workpieces themselves are deformed, such workpieces are abandoned.

S.5 (Unit Assembling Step)

In the fastened condition inspection step (S.2), workpieces determined to be capable of being re-fastened are sent to the unit assembling step (S.5) in the production line. The number of steps is, for example, n (wherein, n is an integer).

S.6 (Unit Inspection Step)

The unit is sent to the unit inspection step (S.6). The number of steps is, for example, m (wherein, m is an integer). In the unit inspection step (S.6), inspection of excellency of assembly and performance are carried out. In all the unit inspection steps (S.6), when the inspection is satisfied, the unit is shipped.

In the production system, the respective steps may be carried out by manual operation by an operator, or may be carried out automatically by a robot in an automated line.

The production line of the rivet dismounting operation for the recycle, after recovery of products, is described as follows.

In the case where the products are recovered from the user, the workpieces (base materials 1, 2) in the rivet fastened state are dismounted by the dismounting device. When the dismounted workpieces are in the recyclable condition, the workpieces are recycled. When the dismounted workpieces are in the non-recyclable condition, the workpieces are abandoned. In the case where metal workpieces and resin workpieces are mixed, if these workpieces are recyclable after classifying operation has been done, the operability is improved.

Automatic Rivet Dismounting Device 100r Used in the Production Line

Figure 91:
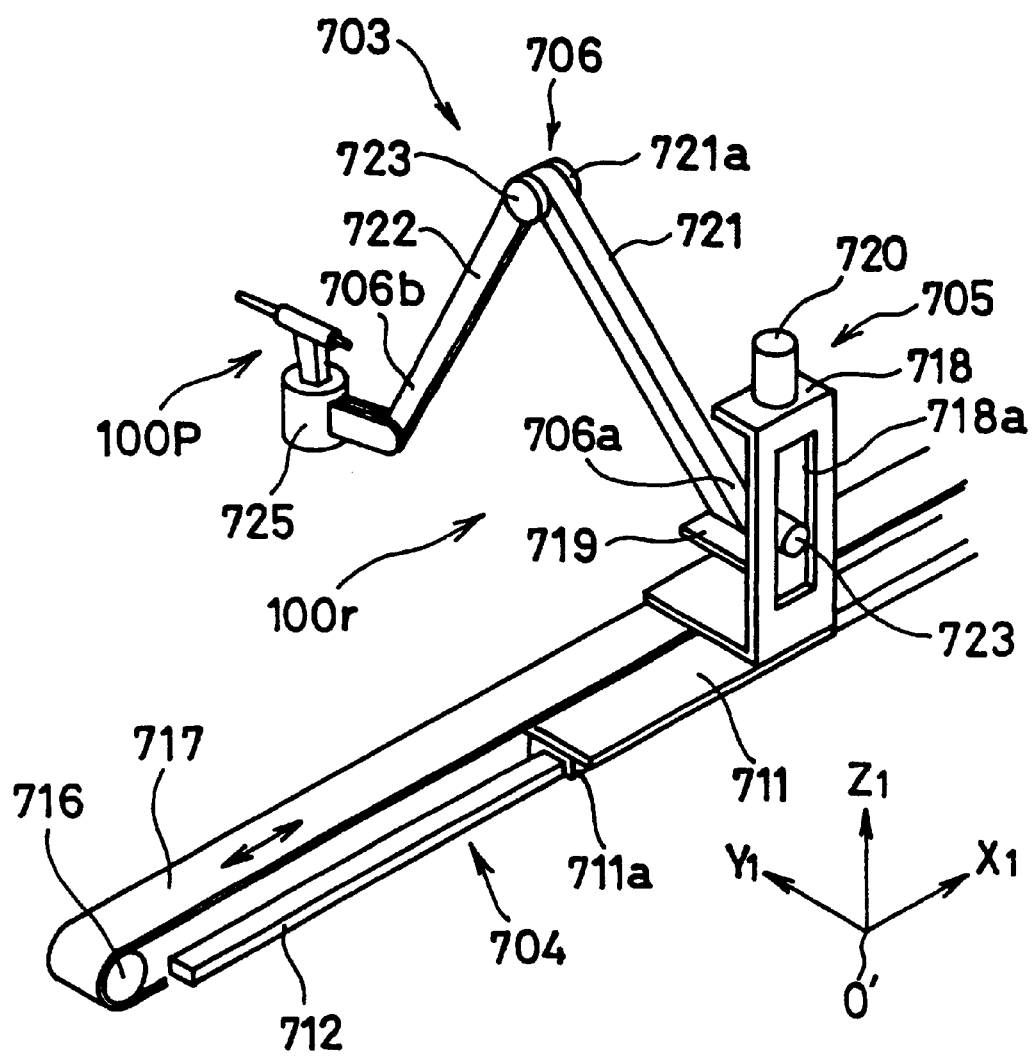
FIG. 91 is a perspective view showing a schematic constitution of an automatic rivet dismounting device used for the production system shown in FIG. 90.
Figure 92A:
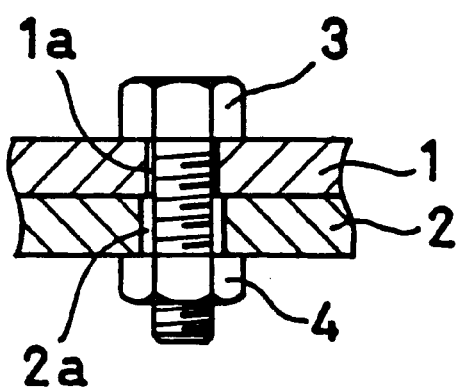
Figure 92B:
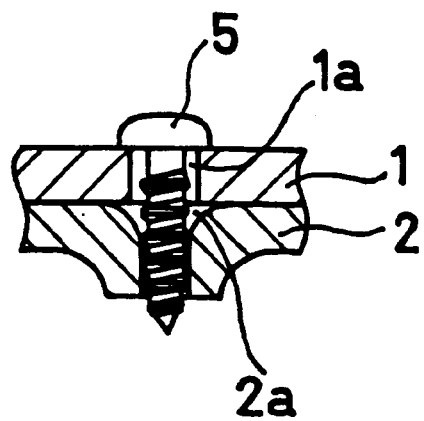
Figure 93A:
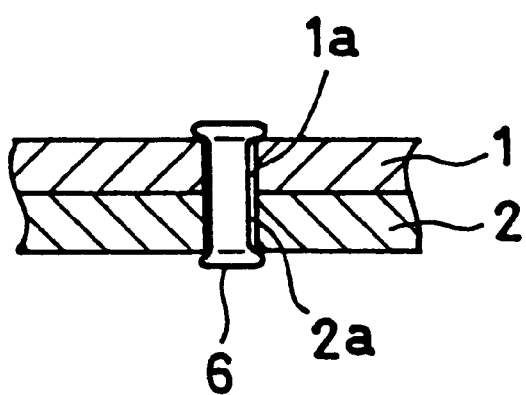
Figure 93B:
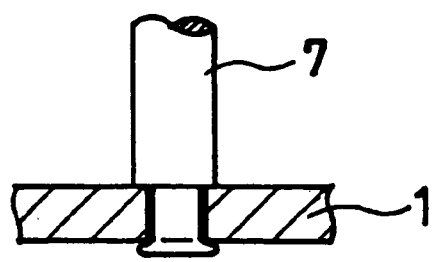
Figure 94A:
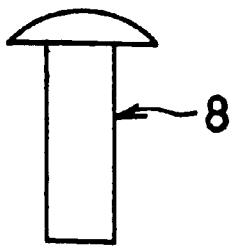
Figure 94B:
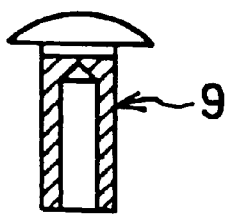
Figure 94C:
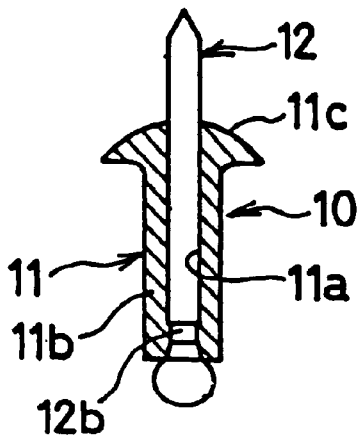
Figure 94D:
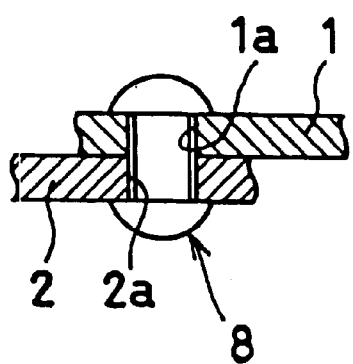
Figure 94E:
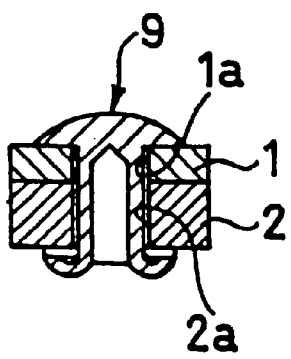
Figure 94F:
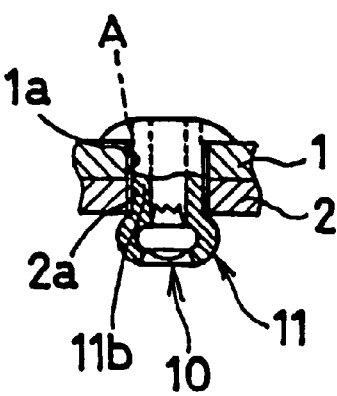

For the automatic rivet dismounting device 100r used in the production line, for example, a device configured, as shown in FIG. 91, is used. One example of the automatic rivet dismounting device 100r will be described hereinafter.

Reference numeral 703 designates a double-armed type robot device. This double-armed type robot device 703 has a pair of arm mechanisms. Each arm mechanism comprises a first arm 704, a second arm 705, and a third arm 706 connected in sequence. The first arm 704 comprises a base 711 moved by a belt drive unit (not shown), and a guide rail 712, engaged with a guide 711a formed on the base 711, to guide the base 711. The second arm 705 is placed on and connected to the base 711, and the second arm 705 is moved in the direction of a coordinate axis X1 out of fixed three coordinate axes X1, Z1, and Y1 perpendicular to one another at the original point 0'.

Reference numeral 716 designates a driven pulley of the belt drive unit, and numeral 717 designates a belt stretched between the drive pulley (not shown) and the driven pulley 716. Both ends of the belt drive unit are secured to the base 711. The drive pulley (not shown) is driven by a motor, the belt 717 travels by rotation of the drive pulley (not shown). At the same time, the base 711 is guided by the guide rail 712 to move the second arm 705, with high accuracy, in the direction of the coordinate axis X1.

Further, the second arm 705 comprises: a frame 718 secured onto the base 711 of the first arm 704; a moving base 719, in which a guide rod is inserted into a slit 718a formed in the frame 718, with a proximal end 706a of the third arm 706 being secured thereto; and a motor 720 for rotating a screw (not shown) threadingly engaged with the moving base 719 in order to move the moving base 719. The second arm 705 causes the third arm 706, together with the moving base 719, to move in the direction of the coordinate axis Z1 by rotation of the motor 720.

External threads of the moving base 719 are formed from a bowl screw encasing many bowls therein for smooth and high accurate movement of the moving base 719. The moving base 719 threadingly engages a screw driven by the motor 720. A guide rod is provided for detection of the moving base 719. The third arm 706 comprises: a first arm member 721 having a proximal end 706a, at a first end thereof, secured to the moving base 719 of the second arm 705 and connected to the second arm 705; a second arm member 722 having an extreme end 706b, at a first end thereof, opposed to the proximal end 706a of the first arm member 721; and a joint portion 723 for connecting the second end of the first arm member 721 to the second end of the second arm member 722, wherein the second arm member 722 is rotated with respect to the first arm member 721. The third arm 706 causes the extreme end 706b of the second arm member 705 to move in the direction of coordinate axis Y1 by means of the joint portion 723. Note that a hand portion 725, for holding the dismounting device 100P, is provided on the extreme end 706b of the second arm 722.

The double-arm type robot device 703 is subjected to automatic control by means of a computer so that in the production line, when inadequate fastening of the base materials 1 and 2 occurs, the fastening member is automatically dismounted in accordance with the flowchart shown in FIG. 90.

Although the present invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method for recovering a base material by removing a fastening member including a head and a body, the body of the fastening member being inserted into a fastening hole formed in a base material, the head of the fastening member being placed in contact with a peripheral edge of the fastening hole to assume a fastened state with the base material, the method comprising the steps of:

inspecting the fastened state of the fastening member with respect to the base material;

judging that the fastened state between the fastening member and the base material provides inadequate fastening on the basis of the inspecting; and cutting the fastening member from a boundary region between the head and the body to separate the body and the head from each other to remove the fastening member from the base material using a cutting blade having a knife edge, wherein the boundary region is a cylindrical region which is smaller in diameter than a diameter of the body of the fastening member and which is parallel to an outer peripheral surface of the body of the fastening member.

2. A method for recovering a base material by removing a fastening member comprising a head and a body, the body being inserted into a fastening hole formed in a base material, the head being placed in contact with a peripheral edge of the fastening hole to assume a fastened state with the base material, wherein the method comprises the step of:

cutting the fastening member, in the fastened state with the base material, from a boundary region between the body and the head to separate the body and the head from each other to remove the fastening member from the base material using a cutting blade having a knife edge, wherein the boundary region is a cylindrical region which is smaller in diameter than a diameter of the body of the fastening member and which is parallel to an outer peripheral surface of the body of the fastening member.

* * * * *